US007680784B2

(12) United States Patent
Furuya et al.

(10) Patent No.: US 7,680,784 B2
(45) Date of Patent: Mar. 16, 2010

(54) QUERY PROCESSING SYSTEM OF A DATABASE USING MULTI-OPERATION PROCESSING UTILIZING A SYNTHETIC RELATIONAL OPERATION IN CONSIDERATION OF IMPROVEMENT IN A PROCESSING CAPABILITY OF A JOIN OPERATION

(76) Inventors: Toru Furuya, 3-3 Miwa-cho, Houfu-shi, Yamaguchi (JP) 747-0025; Junji Furuya, 3-3 Miwa-cho, Houfu-shi, Yamaguchi (JP) 747-0025

( * ) Notice: Subject to any disclaimer, the term of this patent is extended or adjusted under 35 U.S.C. 154(b) by 0 days.

(21) Appl. No.: 12/149,059

(22) Filed: Apr. 25, 2008

(65) Prior Publication Data

US 2008/0294615 A1  Nov. 27, 2008

(30) Foreign Application Priority Data

Apr. 27, 2007  (JP) .............................. 2007-118557

(51) Int. Cl.
*G06F 17/30* (2006.01)
(52) U.S. Cl. ..................... 707/4; 707/5; 707/6; 707/7
(58) Field of Classification Search ................ 707/3–7, 707/104.1
See application file for complete search history.

(56) References Cited

U.S. PATENT DOCUMENTS

| | | | |
|---|---|---|---|
| 6,678,672 B1 * | 1/2004 | Ramasamy et al. ............ 707/2 |
| 7,447,686 B2 * | 11/2008 | Levine ........................ 707/4 |
| 2002/0038313 A1 * | 3/2002 | Klein et al. ................ 707/200 |
| 2002/0198872 A1 * | 12/2002 | MacNicol et al. .............. 707/3 |
| 2003/0187858 A1 * | 10/2003 | Kirk et al. .................. 707/100 |
| 2004/0073549 A1 * | 4/2004 | Turkel et al. ................... 707/5 |

(Continued)

FOREIGN PATENT DOCUMENTS

JP  03-288967 A  12/1991

(Continued)

OTHER PUBLICATIONS

Office Action mailed on Aug. 21, 2007 (Japan).

(Continued)

*Primary Examiner*—Hung T Vy
*Assistant Examiner*—Hanh B Thai
(74) *Attorney, Agent, or Firm*—Rader, Fishman & Grauer, PLLC

(57) ABSTRACT

A query processing system of a database using multi-operation processing includes a task retrieval unit for retrieving relational algebra as tasks from a query tree, a unit for dividing retrieved tasks into groups for each relation of database, a synthetic relational operation unit for creating a synthetic relational operation by collecting tasks having common sub-expression for the grouped tasks into sub-groups and creating a task of a synthetic relational operation for each sub-group, wherein when there is a plurality of tasks of join operation in the grouped tasks, the synthetic relational operation unit further divides the grouped tasks into sub-groups for each common sub-expression of join operation, collects a plurality of tasks of the join operation into a sub-group, and creates a single task of a synthetic join operation by using logical union to concatenate each task of the join operation collected in the sub-group.

7 Claims, 18 Drawing Sheets

U.S. PATENT DOCUMENTS

| | | | |
|---|---|---|---|
| 2004/0148420 A1* | 7/2004 | Hinshaw et al. | 709/231 |
| 2005/0091238 A1* | 4/2005 | Zane et al. | 707/100 |
| 2005/0097103 A1* | 5/2005 | Zane et al. | 707/6 |
| 2005/0177556 A1* | 8/2005 | Fang et al. | 707/3 |
| 2007/0294217 A1* | 12/2007 | Chen et al. | 707/2 |
| 2008/0114803 A1* | 5/2008 | Chinchwadkar et al. | 707/102 |

FOREIGN PATENT DOCUMENTS

| | | |
|---|---|---|
| JP | 05-266086 A | 10/1993 |
| JP | 10-301822 A | 11/1998 |
| JP | 2000-076288 A | 3/2000 |
| JP | 2007-34414 A | 2/2007 |
| JP | 4071816 B1 | 1/2008 |
| JP | 4073033 B1 | 2/2008 |
| JP | 4109305 B1 | 4/2008 |

OTHER PUBLICATIONS

Yigal Arens et al., "Intelligent Caching: Selecting, Representing and Reusing Data in an Information Server", AMC, pp. 433-438 (1994).

Michael J. Carey et al., "Data Caching Tradeoffs in Client-Server DBMS Architectures", AMC, pp. 357-366 (1991).

Zhifeng Chen et al., "Empirical Evaluation of Multi-level Buffer Cache Collaboration for Storage Systems", SIGMETRICS' 05, AMC, pp. 145-156 (Jun. 6-10, 2005).

Hong Tai Chou et al., "An Evaluation of Buffer Management Strategies for Relational Database Systems", Proceedings of VLDB 85, Stockholm, pp. 127-141.

David J. DeWitt et al., "Parallel Database Systems: The Future of High Performance Database Processing", Communications of the ACM, vol. 36, No. 6, pp. 1-26 (Jun. 1992).

Sheldon Finkelstein, "Common Expression Analysis in Database Applications", ACM, pp. 235-245 (1982).

Hyunchul Kang et al., "Schemes of Storing XML Query Cache", the 16th Australasian Database Conference, Australian Computer Society, Inc., Conferences in Research and Practice in Information Technology, vol. 39. H.E., pp. 55-64 (2005).

Bhushan Mandhani et al., "Query Caching and View Selection for XML Databases", Proceedings of the 31st VLDB Conference, Trondheim, Norway, pp. 469-480 (2005).

Elizabeth J. O'Neil et al., "The LRU-K Page Replacement Algorithm for Database Disk Buffering", AMC, pp. 297-306 (1993).

Giovanni Maria Sacco et al., "Buffer Management in Relational Database Systems", ACM Transactions on Database Systems, vol. 11, No. 4, pp. 473-498 (Dec. 4, 1986).

Timos K. Sellis "Multiple-Query Optimization", ACM Transactions on Database Systems, vol. 13, No. 1, pp. 23-52 (Mar. 1988).

Michael Stonebraker "Operating System Support for Database Management", Communications of the ACM, vol. 24, No. 7, pp. 412-418 (Jul. 1981).

* cited by examiner

| WORKS_ON₀ | ESSN | PNO | HOURS |
|---|---|---|---|
| b₁ | 1123343444 | 1 | 30 |
|  | 1223445455 | 2 | 40 |
|  | 2311111132 | 12 | 26 |
|  | 2411111133 | 11 | 28 |
|  | 1534323343 | 5 | 24 |
|  | BLOCK POINTER | | →256 |
| b₂ | 1534323343 | 1 | 18 |
|  | 1645455566 | 2 | 34 |
|  | 1756677888 | 3 | 16 |
|  | 1876767888 | 4 | 35 |
|  | 1967788888 | 5 | 18 |
|  | BLOCK POINTER | | →512 |
| b₃ | 2066567788 | 15 | 22 |
|  | 2111111124 | 14 | 21 |
|  | 2211111125 | 13 | 24 |
|  | 1345334543 | 3 | 20 |
|  | 1411111114 | 4 | 12 |
|  | BLOCK POINTER | | →768 |
| b₄ | 2511111134 | 10 | 19 |
|  | 2611111135 | 9 | 16 |
|  | 2734567893 | 8 | 14 |
|  | 2834567894 | 9 | 26 |
|  | 2934567895 | 10 | 28 |
|  | BLOCK POINTER | | →1024 |
| b₅ | 3034567896 | 1 | 32 |
|  | 1123345444 | 2 | 25 |
|  | 1223445455 | 3 | 28 |
|  | 1345334543 | 11 | 31 |
|  | 22111111125 | 12 | 19 |
|  | BLOCK POINTER | | →204 |

FIG. 3-4

(a) PROCESSING PLAN $P_1$ (b) PROCESSING PLAN $P_2$ $\sigma$ : SELECT OPERATION
$\pi$ : PROJECT OPERATION
⋈ : JOIN OPERATION (c) PROCESSING PLAN $P_3$ (d) PROCESSING PLAN $P_4$ $\sigma$: SELECT OPERATION
$\pi$: PROJECT OPERATION
⋈: JOIN OPERATION (e) PROCESSING PLAN $P_5$ (f) PROCESSING PLAN $P_6$ $\sigma$ : SELECT OPERATION
$\pi$ : PROJECT OPERATION
$\bowtie$ : JOIN OPERATION (a) TABLE SHOWING RELATIONSHIP BETWEEN
NUMBER OF QUERIES AND PROCESSING TIME

| NUMBER OF QUERIES | 100 | 200 | 300 | 400 | 500 | 600 | 700 | 800 | 900 | 1000 |
|---|---|---|---|---|---|---|---|---|---|---|
| MYSQL | 279.33 | 548.92 | 833.11 | 1113.5 | 1394.6 | 1674.3 | 1950.1 | 2229.7 | 2502.7 | 2792.8 |
| MULTI-OPERATION PROCESSING | 78.83 | 157.80 | 228.53 | 303.98 | 383.44 | 466.67 | 539.09 | 613.31 | 694.66 | 764.58 |
| MULTI-OPERATION PROCESSING UTILIZING SYNTHETIC RELATIONAL OPERAIOTN OF PREVIOUS VERSION | 44.13 | 89.30 | 131.59 | 171.91 | 217.25 | 260.20 | 299.22 | 345.30 | 392.23 | 424.34 |
| MULTI-OPERATION PROCESSING UTILIZING SYNTHETIC RELATIONAL OPERAIOTN OF THE PRESENT INVENTION | 24.55 | 41.63 | 63.77 | 78.59 | 101.44 | 119.24 | 142.17 | 157.02 | 178.26 | 196.52 |

PROCESSING TIME [SECOND]

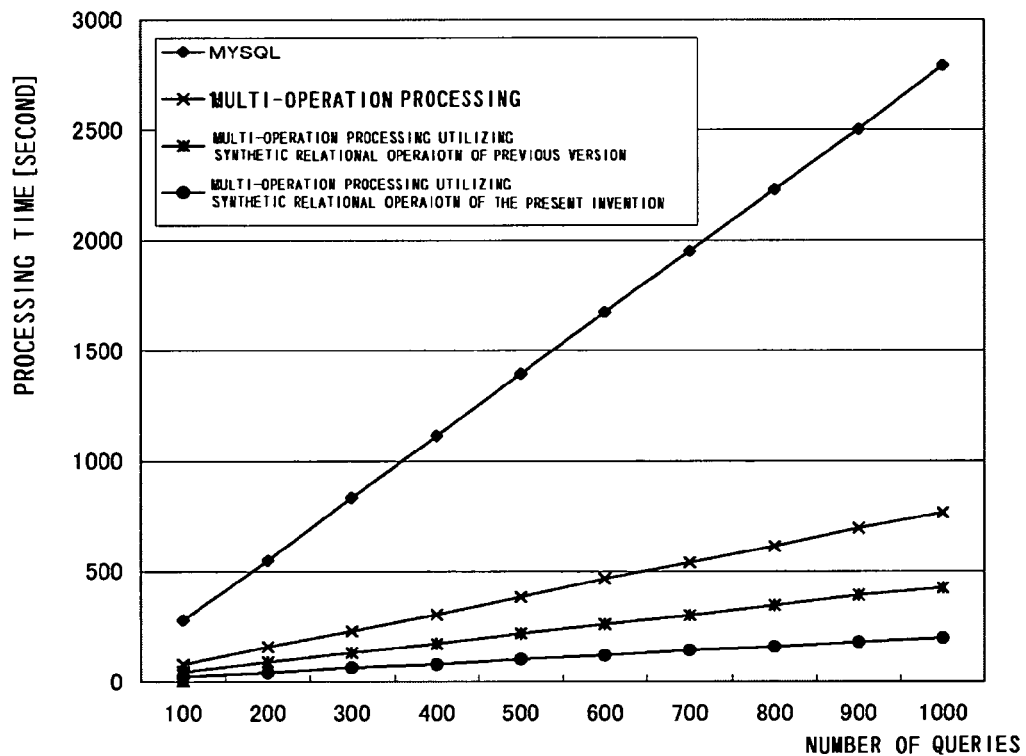

(b) GRAPH SHOWING RELATIONSHIP BETWEEN
NUMBER OF QUERIES AND PROCESSING TIME

FIG. 12

QUERY PROCESSING SYSTEM OF A DATABASE USING MULTI-OPERATION PROCESSING UTILIZING A SYNTHETIC RELATIONAL OPERATION IN CONSIDERATION OF IMPROVEMENT IN A PROCESSING CAPABILITY OF A JOIN OPERATION

CROSS-REFERENCE TO RELATED APPLICATIONS

JP2006-356406 (U.S. Pat. No. 4,109,305)
JP2007-075670 (U.S. Pat. No. 4,071,816)

FIELD OF INVENTION

This invention relates to query processing system of database, specifically relates to query processing system using multi-operation processing system utilizing a synthetic relational operation.

BACKGROUND OF THE INVENTION

When a large number of queries are sent to a database management system (DBMS) simultaneously, a database management system uses a concurrency control to process each query. The search only transactions are called queries and each query is processed separately. Therefore query processing in a conventional database management system has the following problems for processing a large number of queries.

Problem (1):

For processing queries, data of a database is accessed, and when a large number of queries perform operations on a common relation of the database, same data is accessed from disk and loaded into main memory to be processed repeatedly. Therefore it is not efficient, and the query processing speed decreases.

Problem (2):

In query processing of a conventional database management system, when a task (operation) in a query is processed, a processing result of the task is created on disk every time as an intermediate result of the query. However since the processing result of each task has overlapped selections of records and attributes, many processing results having overlapped selections are created on disk. As a result, the number of disk access increases and the query processing speed decrease.

Problem (3):

For processing join operations in a query, the query processing of a conventional database management system uses the join method such as hash join to process each join operation.

However every time the join operation is processed, records in a relation used for retrievals of the join operation are accessed from disk, and a hash table which is used as an index to each record in the relation is created in main memory. Since each join operation uses a different relation for its retrievals, a separate hash table is created for each join operation. Therefore if many hash tables are created in main memory, there is not enough main memory space to process many queries, so the query processing speed decreases.

(Problems of Cashing Operations and Operation Results)

In order to reduce the number of disk accesses and to improve the query processing speed, the method of temporary storing (caching) frequently requested queries and query processing results, and operations in a query (relational algebra such as select operation, project operation, and join operation) and operation results (intermediate result of query) on disk is used.

When a query is requested from a user, a database management system checks whether a processing result of the query is already stored on disk. If it is stored, the stored query processing result is returned to the user as it is, instead of processing the query.

Also, even if the query is different, an operation in the query is same as the one already stored on disk, then the stored result of the operation is used to process the query instead of processing the operation.

The purpose of this method is to improve the query processing speed by increasing the number of query processing results and operations results to be stored, so that same queries and same operations are not processed repeatedly. However, this method requires that the queries and the operations must be same as the ones stored on disk, and it cannot utilize the stored results if the queries and the operations are different from the ones stored on disk.

Also in this method, if new records are added into the database and the database is updated, some stored processing results become old, so the database management system must dispose the processing results that became old. Therefore if database updates are performed frequently, the stored processing results that become old must be disposed every time, so that this method becomes no longer effective.

A database management system such as Microsoft SQL server does not immediately dispose the query processing results that become old in order to maintain the query processing speed; instead it returns old processing results to users for a while.

(Problems of Caching to Main Memory)

Another method for reducing the number of disk accesses and improving the query processing speed is the method of caching frequently accessed blocks from disk in main memory. In this method, when a query is requested from a user, it checks to see if the blocks to be accessed from disk for processing the query are already cached in main memory. If they are cached, the cached blocks are used.

The purpose of this method is to reduce the number of disk accesses and to improve the query processing speed by increasing the number of blocks to be cached in main memory.

However, this method requires that the block on disk and the cached block in main memory need be synchronized, so when a content of the block is changed, both the block on disk and the cached block in main memory need to be updated.

Also, when a linear search is performed for a relation of database having gigabytes of data to process a query, almost all blocks, except the blocks that are cached in main memory, need to be accessed from disk, so this method is no longer effective.

Also an operating system itself performs such memory management; so if a database management system increases the amount of blocks to be cached in main memory, the blocks that are cached in main memory are transferred to virtual memory (disk) by the operation system, so the query processing speed decreases.

(Problems of Pipelining Queries)

The method of pipelining queries is used as a method of reducing the number of disk accesses and improving the query processing speed by not creating intermediate results of queries on disk.

This method pipelines the operations in a query by using multiple microprocessors to process these operations in parallel on a computer system with multiple microprocessors.

In this method, the processing result of each operation in the query is streamed to the next operation in the query, so that the next operation does not wait for the previous operation to complete, and performs its operation on the partially finished result.

However, the operations that can be pipelined are limited to operations such as a select operation and a project operation, and cannot pipeline a join operation, because the join operation requires its previous operations to complete before processing.

This method also requires that the computer system have multiple microprocessors, so the computer system with a single processor is not effective.

(Problem of Multiple-Query Optimizations)

Multiple-query optimization is another method of processing queries which is different from a conventional method of processing queries where each query is processed separately. This method combines multiple queries to create a single query graph (for obtaining multiple query processing results, a query graph is used instead of a query tree), and executes the query graph to process multiple queries simultaneously. In order to do this, if multiple queries have same operations, a query graph is created to replace these same operations by a single operation, and the processing result of the single operation is shared.

Also, even if multiple queries have different operations, if one operation is a subset of another operation, a query graph is created to perform one operation on the processing result of another operation. The purpose of this method is to reduce the number of disk accesses and improve the query processing speed by utilizing processing results of the other operations.

However, if one operation is processed on the processing result of another operation, the indices of the relation in the database are not utilized, and records are searched linearly from the processing result of another operation. Therefore it rather increases the number of disk accesses and decreases the query processing speed.

Also there is a problem that when a number of queries increase, many different query graphs are created, and it takes time to find the best query graph with the lowest processing cost from these query graphs that are created.

In addition, Multiple-query optimizations does not immediately process a query requested from a user. Instead, queries which were given for a certain period of time are processed simultaneously. Therefore it cannot respond to each query quickly.

REFERENCES THAT THE PRESENT INVENTOR CITED ARE THE FOLLOWINGS

The literatures describing the storing frequently requested queries and query result, and operations in a query and operation results are the following non-patent literatures 1~5.

The literatures describing the method of temporally storing (cache) the frequently accessed blocks from disk in main memory for processing queries are non-patent literatures 6~10.

The literature describing the method of pipelining queries is the following non-patent literature 11. Also, the literature describing multiple-query optimization is the non-patent literature 12.

[Non Patent Literature Cited 1]

Finkelstein, S. Common Expression Analysis in Database Applications. In Proceedings of the International Conference of the Management of Data (SIGMOD'82, Orlando, Fla., Jun. 2-4), 1982

[Non Patent Literature Cited 2]

Yigal Arens and Craig A. Knoblock. Intelligent Cashing: Selecting, Representing and Reusing Data in an Information Server. ACM Press, Proceedings of the third international conference on Information and knowledge management, November 1994

[Non Patent Literature Cited 3]

Hyunchul Kang, Seungchul Han, Younghyum Kim. Schemes of Storing XML Query Cache. Proceedings of the sixteenth Australasian database conference, Volume 39 ADC 2005

[Non Patent Literature Cited 4]

Bhushan Mandhani, Dan Suciu, Query Caching and View Selection for XML Databases, Proceedings of the 31st international conference on Very large data bases, VLDB 2005

[Non Patent Literature Cited 5]

Michael J. Carey, Michael J. Franklin, Miron Livny, and Eugene J. Shekita. Data caching tradeoffs in client-server DBMS architectures. In Proceedings of the ACM SIGMOD, pages 357-366, 1991

[Non Patent Literature Cited 6]

Giovanni Mario Sacco and Mario Schkolnick. Buffer Management in Relational Database Systems. ACM Transactions on Database Systems, Volume 11, no. 4, pp. 473-498, December 1986

[Non Patent Literature Cited 7]

Chou, H. And DeWitt, D. An Evaluation of Buffer Management Strategies for Relational Database Systems. Proceedings of VLDB, 1985

[Non Patent Literature Cited 8]

O'Neil E J, O'Neil P E, Weikum G. The LRU-K Page Replacement Algorithm For Database Disk Buffering. In ACM SIGMOD Conf., 1993, Washington, D.C., pp 297-306

[Non Patent Literature Cited 9]

Zhifeng Chen, Yan Zhang, Yuanyuan Zhou. Empirical Evaluation of Multi-level Buffer Cache Collaboration for Storage systems. ACM SIGMETRICS international conference on Measurement and modeling of computer systems SIGMETRICS 2005, Volume 33 Issue 1

[Non Patent Literature Cited 10]

Michael Stonebraker. Operating System Support for Database Management. Communications of The ACM, 24(7): 412-18, July 1981

[Non Patent Literature Cited 11]

David J. DeWitt and Jim Gray. Parallel Database Systems: The Future of High Performance Database Processing. Communications of The ACM, Vol. 36, No. 6, June

[Non Patent Literature Cited 12]

TIMOS K. SELLIS. Multiple-Query Optimization. ACM Transactions on Database Systems, Vol. 13, No. 1, Pages 23-52, March 1988.

SUMMARY

Object of the Invention

Although the solutions described above are widely used in many database management systems, they also have problems and not necessarily effective solutions.

The present invention proposes new unique solutions, which are different from the conventional solutions, to reduce the number of disk accesses and improve the query processing speed.

The solution of the Invention

In order to accomplish the purpose of the invention, we propose a query processing system of a database using multi-operation processing utilizing a synthetic relational operation for improvement in processing capability of a join operation; said query processing system comprising:

query tree conversion means for converting a query to a query tree based on relational algebra, task retrieval means for retrieving relational algebra as tasks, which can be processed directly and are not dependent on other relational algebra, from the query tree in an order of topological sort, grouping means for dividing the retrieved tasks into groups for each relation of the database, synthetic relational operation creating means for further collecting the tasks having common sub-expression for the grouped tasks into sub-groups, and creating tasks of a synthetic relational operation, multi-operation processing means performing multi-operation processing each of the grouped tasks for the created tasks of the synthetic relational operation and for tasks not collected into a sub-group, and virtual relation creating means for creating a virtual relation based on stored locations so as for each task included in the synthetic relational operation to share a part of records and/or attributes in a processing result of the task of the synthetic relational operation; wherein the task retrieval means retrieves either a task of the select operation or a task of the join operation with the task of the project operation simultaneously, and creates a task that combined either the select operation or the join operation with the project operation, when the task to be added into a group is either a select operation or a join operation, and the next task performing operation on a processing result of the task of either the select operation or the project operation is a project operation;

the synthetic relational operation creating means further divides the grouped tasks into sub-groups for each common sub-expression of join operation, when there is a plurality of tasks of the join operation in the grouped tasks, collect a plurality of tasks of the join operation into a sub-group, and creates a single task of a synthetic join operation by using logical union to concatenate each task of the join operation collected in the sub-group; and the virtual relation creating means creates a virtual relation for each task of the join operation in the sub-group.

In the query processing system, a process of executing the single task of the synthetic join operation by using the logical union in the synthetic relational operation creating means may be realized by finding blocks that need to be accessed to a common relation of source search for each join operation contained in the single task of the synthetic join operation, and collects the blocks into a block set by obtaining a union of the blocks, accessing disk to read a block in the block set, and for each record in the block, retrieves a record from a common relation of destination search satisfying a join relationship with the record in the block, and joining the retrieved record and the record in the block to create a joined record and adds the joined record into a processing result of the task of the synthetic join operation, if the retrieved record is found and the retrieved record and the record in the block satisfy a join relationship of at least one join operation contained in the single task of the synthetic join operation.

The query processing system, the synthetic relational operation creating means, when there is a plurality of tasks that combined a select operation and a project operation in a group, further divides the plurality of the tasks that combined the select operation and the project operation into subgroups for each common sub-expression of the select operation based on select operations of these tasks in the group, collects a plurality of tasks that combined the select operation and the project operation into a sub-group, creates a synthetic select operation satisfying all select conditions of the select operations of these tasks in the sub-group, creates a synthetic project operation including all attributes of project operations of these tasks in the sub-group, and creates a single task that combined the synthetic select operation and the synthetic project operation, or when there is a plurality of tasks that combined a join operation and a project operation in a group, divides the plurality of the tasks that combined the join operation and the project operation into sub-groups for each common sub-expressions of the join operation based on join operations of these tasks in the group, collects a plurality of tasks that combined the join operation and the project operation into a subgroup, creates a synthetic join operation satisfying all join conditions of the join operations of these tasks in the sub-group, creates a synthetic project operation including all attributes of project operations of these tasks in the sub-group, creates a single task that combined the synthetic join operation and the synthetic project operation; and the virtual relation creating means creates virtual relations for the tasks that combined the select operation and the project operation, and the tasks that combined the join operation and the project operation.

The query processing system, the multi-operation processing means simultaneously may perform process of retrieving records and process of joining records that a plurality of tasks of join operation in a group require, if the plurality of the tasks of the join operation in the group perform their join operations on their virtual relations of source search and their virtual relation of destination search using same attributes in their join condition, where these virtual relations of source search belong to a single common relation of source search and these virtual relations of destination search belong to a single common relation of destination search.

The query processing system, wherein multi-operation processing means, when simultaneously performing the process of retrieving the records and the process of joining records that the plurality of the tasks of the join operation in the group require, for each record in a common block, retrieves a record to a common relation of destination search satisfying a join relationship with the record in the common block, joins the retrieved record and the record of the common block to create a joined record and adds the joined record into a processing result of each task of the join operation in the group requiring to be processed at the common block, if each task of the join operation includes the retrieved record in its virtual relation of destination search and includes the record of the common block in its virtual relation of source search.

The program corresponding to respective functions of the above query processing system, which is executed by a computer system is also our proposed invention.

Advantages of the Invention

By applying the present invention "query processing system of database using multi-operation processing utilizing a synthetic relational operation in consideration of improvement in a processing capability of a join operation", the query processing speed is improved compared to the previous patent "query processing system of a database using multi-operation processing utilizing a synthetic relational operation" (JP2007-075670) without the improved methods.

As the improved method 1, by adding the method of retrieving a task that combined relational operations into the query processing system of database using multi-operation processing utilizing a synthetic relational operation, a processing result of a select operation and a processing result of a join operation are not created on disk. Therefore it reduced the number of disk accesses and improved the query processing speed.

Furthermore, by creating a task that combined relational operations, it became possible to apply the improved method 3 to create a single task that combined synthetic relational operations from multiple tasks that combined relational operations.

As the improved method 2, by adding the method of processing a task of a synthetic join operation into the query processing system of database using multi-operation processing utilizing a synthetic relational operation, the multiple tasks of a join operation having common sub-expression of join operation are collected into sub-groups, then the multiple tasks of the join operation collected into a sub-group are replaced by a single task of a synthetic join operation to be processed. As result, a join operation is not processed separately for each task of the join operation in the sub-group.

Also, each task of the join operation in the sub-group is able to share a part of the processing result of the task of the synthetic join operation by using a virtual relation. As a result, a separate processing result having overlapped join selections is not created for each task of the join operation in the sub-group. Therefore it reduced the number of disk accesses and improved the query processing speed.

In addition, by processing the task of the synthetic join operation, it became possible to apply the improved method 4 to process multiple tasks of a join operation using multi-operation processing on the processing result of the task of the synthetic join operation.

As the improved method 3, by adding the method of processing a task that combined synthetic relational operations into the query processing system using multi-operation processing utilizing a synthetic relational operation, it became possible to replace multiple tasks that combined relational operations collected in a sub-group by a single task that combined synthetic relational operations.

As a result, each task that combined relational operations collected in the sub-group is able to share a part of the processing result of the task that combined synthetic relational operations by using a virtual relation. As a result, a separate processing result having overlapped selections, join selections, and attributes (columns) is not created on disk for each task that combined relational operations collected in the sub-group. Therefore it reduced the number of disk accesses and improved the query processing speed.

In addition, by processing the task that combined synthetic relational operations, it enabled processing of the task that combined the synthetic join operation and the synthetic project operation on the processing result of the task that combined the synthetic select operation and the synthetic project operation repeatedly.

As the improved method 4, by adding the method of processing multiple tasks of a join operation using multi-operation processing into the query processing system of a database using multi-operation processing utilizing a synthetic relational operation, the processing of finding records and the processing of joining records that the tasks of the join operation in the group require are processed simultaneously. As a result, the processing of finding records and the processing of joining records are not processed separately for each task of the join operation in the group. Therefore it reduced the number of disk accesses and improved the query processing speed.

As discussed above, in the present invention "query processing system of a database using multi-operation processing utilizing a synthetic relational operation in consideration of improvement in a processing capability of a join operation", the four improved methods, the method of retrieving a task that combined relational operations, the method of processing a task of a synthetic join operation, the method of processing a task that combined synthetic relational operations, and the method of processing multiple tasks of a join operation using multi-operation processing are newly added; especially the improvements in a processing capability of a join operation are considered. As a result, the present invention enabled the processing of a large number of queries requested from users more efficiently and quickly.

DESCRIPTION OF DRAWING FIGURES

FIG. 3-1 is a diagram showing the relation EMPLOYEE of a database.

FIG. 3-2 is a diagram showing the relation DEPARTMENT of a database.

FIG. 3-3 is a diagram showing the relation PROJECT of a database.

FIG. 3-4 is a diagram showing the relation WORKS_ON of a database.

FIG. 4-1 is a diagram showing the query tree (a) of the processing plan $P_1$ and the query tree (b) of the processing plan $P_2$.

FIG. 4-2 is a diagram showing the query tree (c) of the processing plan $P_3$ and the query tree (d) of the processing plan $P_4$.

FIG. 4-3 is a diagram showing the query tree (e) of the processing plan $P_4$ and the query tree (f) of the processing plan $P_6$.

FIG. 11-1 is a diagram showing the relations of the database used in the implementation.

FIG. 11-2 is a diagram showing the relations of the database used in the implementation.

FIG. 12 is a diagram showing the table (a) and the graph (b) of the implementation.

DESCRIPTION OF EMBODIMENTS OF THE INVENTION

Figure 1:
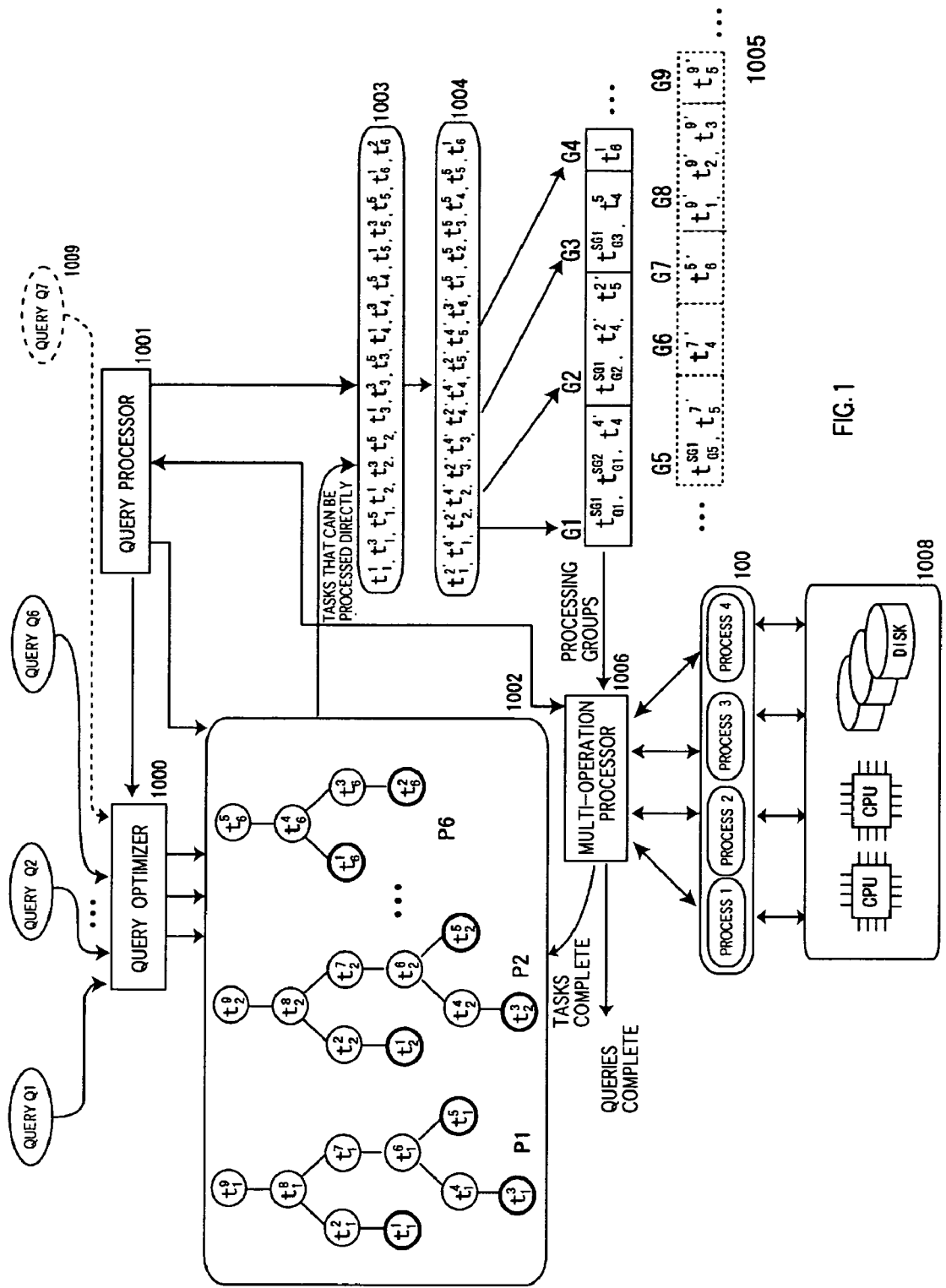
FIG. 1 is a diagram showing the architecture of the database management system.

As solution to the problem (1), the inventors of the present invention proposed "query processing system of database using multi-operation processing" (JP2006-356406) to reduce the number of accesses to secondary storage device such as disk and improved the query processing speed.

In the proposed multi-operation processing, when multiple tasks from query trees perform operations on a common relation of a database, the proposed multi-operation processing
  collects these tasks into a group for each relation,
  creates an access plan for each task in the group,
  calculates a processing cost of each task in the group based on the access plan,
  sorts the tasks in the group based on the processing cost,
  finds blocks (address of the blocks) that need to be accessed in the common relation for processing these tasks in the group,
  determines a block access order of the blocks based on the sorted order of the tasks,
  reads a block from disk as a common block based on the block access order,
  retrieves the tasks in the group requiring to be processed at the common block,
  and performs processing of the tasks at the common block simultaneously.

The objective of this method is to improve the query processing speed by processing multiple tasks at each common block simultaneously instead of each task accessing the blocks on disk to perform its operations.

Also, for the further improvement of the solution to the problem (1), and as solutions to the problems (2), (3), the inventors of the present invention proposed "Query processing system of database using a multi-operation processing utilizing a synthetic relational operation" (JP2007-075670).

In order to improve the solution to the problem (1), when multiple tasks from query trees perform operations on a common relation, the proposed multi-operation processing utilizing a synthetic relational operation (JP2007-075670) collects these tasks into a group, further collects these tasks in the group into sub-groups for each common sub-expression, creates a single task of a synthetic relational operation for each sub-group in the group, and uses multi-operation processing to process each task of the synthetic relational operation and other tasks not collected into a sub-group in the group simultaneously. As a result, the queries are processed more efficiently.

In addition, this method also collects tasks performing operations on the processing result of the task of the synthetic relational operation into a group, and uses multi-operation processing to process these tasks simultaneously. As a result, each block in the processing result of the task of the synthetic relational operation was not accessed multiple times. Therefore the query processing speed was improved.

In order to solve the problem (2), the multi-operation processing utilizing a synthetic relational operation (JP2007-075670) create a virtual relation for each task in the sub-group to share the processing result of the single task of the synthetic relational operation. As a result, a separate processing result having overlapped selection is not created on disk for each task in the sub-group. Therefore this method reduced the number of disk access and improved the query processing speed.

Furthermore, in order to solve the problem (3), when multiple tasks of a join operation retrieve records from the processing result of the single task of synthetic relational operation, the multi-operation processing utilizing a synthetic relational operation (JP2007-075670) creates indices for attributes used for retrievals in the processing result of the single task of synthetic relational operation. As a result, the multiple tasks of the join operation were able to share the indices to retrieve records from the processing result of the task of the synthetic relational operation. Therefore a separate hash table is not created in main memory for each task of the join operation. Therefore it reduced the number of disk accesses and improved the query processing speed.

This time, in order to improve the query processing using multi-operation processing utilizing a synthetic relational operations further, the 4 new improved methods are considered: the method of retrieving a task that combined relational operations; the method of processing a task of a synthetic join operation; the method of processing a task that combined synthetic relational operations; and a method of processing multiple tasks of a join operation using multi-operation processing.

These 4 new methods are added into the query processing system using multi-operation processing utilizing a synthetic relational operation.

By adding these 4 improved methods, especially a processing of a join operation is improved, and much more tasks are processed simultaneously than the query processing system using multi-operation processing utilizing a synthetic relational operation without these 4 improved methods. Therefore it further reduced the number of disk accesses, and improved the query processing speed.

Next, in the followings, these 4 improved methods are explained in detail.

[Improved Method 1: Method of Retrieving a Task that Combined Relational Operations]

For processing a large number of queries, when collecting tasks that can be processed directly from query trees, which are created by the query optimizer, into groups based on a relation of a database that each task accesses, if a task to be added into a group is a select operation, and a next task performing operations on a processing result of the task of a select operation is a project operation, the improved method 1, which is the method of retrieving a task that combined relational operations, retrieves the task of the select operation and the task of the project operation simultaneously, and creates a task that combined the select operation and the project operation, and adds this task into the group.

Also if a task to be added into a group is a join operation and a next task performing operations on a processing result of the task of the join operation is a project operation, The improved method 1 retrieves the task of the join operation and the task of the project operation simultaneously, and creates a task that combined the join operation and the project operation, and adds this task into a group.

The improved method 1 performs processing of the select operation and the project operation simultaneously by processing the project operation for each record being processed by the select operation, and adding the projected record into a processing result of the task that combined the select operation and the project operation directly.

The improved method 1 performs the processing of the join operation and the project operation simultaneously by processing the project operation for each record being processed by the join operation, and adding the projected record into a processing result of the task that combined the join operation and the project operation directly.

Therefore the improved method 1 has the objective of improving the query processing speed by processing the task that combined the select operation and the project operation, and the task that combined the join operation and the project operation, instead of creating a relation which is the processing result of the select operation or the join operation, and performing the project operation on the processing result as the next task.

[Improved Method 2: Method of Processing a Task of a Synthetic Join Operation]

For processing tasks from a large number of queries, when there are tasks of a join operation in a group, the improved method 2, which is the method of processing a task of a synthetic join operation, divides these tasks of the join operation into sub-groups for each common sub-expression of join operation, collects some tasks of the join operation having common expression into a sub-group, concatenates the tasks of the join operation collected in the sub-group by using logical union to create a single task of a synthetic join operation satisfying all join conditions of these tasks of the join operation in the sub-group.

In order to process the single task of the synthetic join operation created, the improved method 2 finds blocks that need to be accessed to a common relation of source search for each join operation contained in the single task of the synthetic join operation, and collects the blocks into a block set corresponding to each join operation.

Then, the improved method 2 finds the union of each block set to obtain a block set corresponding to the task of the synthetic join operation.

Then, the improved method 2 accesses disk to read a block in the block set corresponding to the task of the synthetic join operation, and for each record in the block, the improved method 2 retrieves a record satisfying a join relationship with the record in the block. Satisfying the join relationship with the record in the block means that a join relationship of at least one join operation contained in the single task of the synthetic join operation is satisfied.

If the join relationship is satisfied, the improved method 2 joins the retrieved record and the record in the block to create a joined record, and adds the joined record into a processing result of the single task of the synthetic join operation.

Therefore by processing the single task of the synthetic join operation in this way, each join operation contained in the single task of the synthetic join operation is not processed separately. Therefore it reduces the number of disk accesses and improves the query processing speed.

After processing the single task of the synthetic join operation and creating a processing result, each task of the join operation in the sub-group shares a part of the processing result of the single task of the synthetic join operation. In order to clarify sharing of the processing result, the improved method 2 creates a virtual relation for each task of the join operation in the sub-group, and in the virtual relation, the improved method 2 writes a name of the processing result that the virtual relation shares, stored locations of the records shared in the processing result, column numbers of the attributes, and numbers and address of the blocks where the records are stored.

By having each task of the join operation in the sub-group shared a part of the processing result of the single task of the synthetic join operation using the virtual relation in this way, a separate processing result having overlapped join selection is not created on disk for each task of the join operation in the sub-group. Therefore this method reduces the number of disk access and improves the query processing speed.

In addition, another purpose of sharing the processing result of the single task of the synthetic join operation using the virtual relation is to perform processing of multiple tasks of join operation on the processing result of the single task of the synthetic join operation by applying the improved method 4.

[Improved Method 3: Method of Processing a Task that Combined Synthetic Relational Operations]

For processing tasks from a large number of queries, when there are tasks that combined a select operation and a project operation in a group, the improved method 3, which is the method of processing a task that combined synthetic relational operations, divides these tasks into sub-groups for each common sub-expression of select operation based on select operations contained in these tasks, and collects some tasks that combined a select operation and a project operation into a sub-group. Then the improved method 3 creates a synthetic select operation satisfying all select conditions of these tasks in the sub-group, and also creates a synthetic project operation including all attributes of the project operations of these tasks in the sub-group. Then the improved method 3 creates a single task that combined the synthetic select operation and the synthetic project operation, and processes this task.

Also for processing tasks from a large number of queries, when there are tasks that combined a join operation and a project operation in a group, the improved method 3 divides these tasks into sub-groups for each common sub-expression of join operation based on join operations of these tasks, and collects some tasks that combined the join operation and the project operation into a sub-group. Then the improved method 3 creates a synthetic join operation satisfying all join conditions of join operations of these tasks in the sub-group, and also creates a synthetic project operation including all attributes of project operations of these tasks in the sub-group. Then the improved method 3 creates a single task that combined the synthetic join operation and the synthetic project operation, and processes this task.

By having the multiple tasks that combined relational operations in the sub-group replaced with the single task that combined synthetic relational operations, the query processing speed is improved.

After processing the single task that combined synthetic relational operations and creating a processing result, each task that combined relational operations in the sub-group shares a part of the processing result of the task that combined synthetic relational operations. In order to clarify the sharing, the improved method 3 creates a virtual relation for each task in the sub-group, and in the virtual relation, a relation name of the processing result that the virtual relation shares, stored location (row range) of the records shared in the processing result, stored locations (column numbers) of the attributes, and numbers and address of the blocks where the records are stored, are written.

Thus, by having each task that combined relational operations in the sub-group shared a part of the processing result of the single task that combined synthetic relational operations as the virtual relation in this way, a separate processing result having overlapped selection, join selection, and attributes (columns) is not created on disk for each task that combined relational operations in the sub-group. Therefore it improves the query processing speed.

In addition, another reason for creating the virtual relations to share the processing result of the single task that combined synthetic relational operations is to perform processing of other tasks that combined a synthetic join operation and a synthetic project operation on the processing result of the single task that combined the synthetic select operation and the synthetic project operation.

[Improved Method 4: Method of Processing Multiple Tasks of a Join Operation Using Multi-Operation Processing]

For processing tasks from a large number of queries, when there are multiple tasks of a join operation in a group, the improved method 4, which is the method of processing multiple tasks of a join operation using multi-operation processing, performs processing of retrieving records and processing of joining records simultaneously that the multiple tasks of join operation in the group require, if the multiple tasks of the join operation in the group perform their join operations on their virtual relations of source search and their virtual relation of destination search using same attributes in their join condition, where these virtual relations of source search belong to a single common relation of source search and these virtual relations of destination search belong to a single common relation of destination search.

In order to perform the processing of retrieving records and the processing of joining records simultaneously, the improved method 4 reads a block that needs to be accessed in the common relation of source search as a common block. Then for the first record in the common block, the improved method 4 retrieves a record from the common relation of destination search satisfying a join relationship with the record in the common block. If the retrieved record is found, this method joins the retrieved record and the record in the common block to create a joined record. Then, for the first task of the join operation in the group requiring to be processed at the common block, if the first task includes the retrieved record in its virtual relation of destination search and includes the record of the common block in its virtual relation of source search (satisfying a join relationship of the first task of a join operation), then the improved method 4 adds the joined record into a processing result of the first task of a join operation.

Next, also for the second task of the join operation in the group requiring to be processed at the common block, if the second task includes the retrieved record in its virtual relation of destination search and includes the record of the common block in its virtual relation of source search (satisfying a join relationship of the second task of the join operation), then the improved method 4 adds the joined record into a processing result of the second task of the join operation.

Likewise, for the rest of the tasks of the join operation in the group, if these tasks include the retrieved record in their virtual relations of destination search, and include the record of the common block in their virtual relations of source search, then the improved method 4 adds the joined record into processing results of these tasks of the join operation.

After processing all tasks of the join operation in the group for the first record in the common block, this method continuously performs the processing of the tasks of the join operation described above repeatedly for the rest of the records in the common block.

Thus, the improved method 4 improves the query processing speed by utilizing the record in the common block of the relation of source search, the record retrieved from the common relation of destination search, and the record that joined these two records for each task of the join operation in the group, so that the operations of finding records and the processing of joining two records are not performed separately for each task of the join operation in the group. Therefore it improves the query processing speed.

In the following, we explain a summary of the query processing system using the multi-operation processing utilizing a synthetic relational operation, where 4 improved methods are added.

[The Architecture of Database System]

FIG. 1 shows architecture of a database system showing the embodiment of the query processing system. The architecture shown in FIG. 1 is similar to the architecture described in the patents JP2006-356406 and the patent JP2007-075670 that the present inventor previously filed. In the followings, the queries $Q_1 \sim Q_6$ are treated as queries requested from users, and the architecture of the database system is explained in detail.

The queries $Q_1 \sim Q_6$ are optimized by the query optimizer (1000), and converted into the query trees $P_1 \sim P_6$ (1002) consisting of relational algebra. The query processor (1001) controlling the query optimizer (1000) and the multi-operation processor (1006), and managing a series of processing queries, retrieves the tasks $t_1^{\,1}, t_1^{\,3}, t_1^{\,5}, t_2^{\,1}, t_2^{\,3}, t_2^{\,5}, t_3^{\,1}, t_3^{\,3}, t_3^{\,5}, t_4^{\,1}, t_4^{\,3}, t_4^{\,5}, t_5^{\,1}, t_5^{\,3}, t_5^{\,5}, t_6^{\,1}, t_6^{\,2}$ (1003) that can be processed directly and not dependent on other tasks in the order of topological sort from the query trees $P_1 \sim P_6$.

Next, applying the improved method 1 as mentioned above, since the tasks $t_1^{\,2}, t_1^{\,4}, t_2^{\,2}, t_2^{\,4}, t_3^{\,2}, t_3^{\,4}, t_4^{\,2}, t_4^{\,4}, t_5^{\,2}, t_5^{\,4}, t_6^{\,3}$ performing operations on the processing results of the tasks $t_1^{\,1}, t_1^{\,3}, t_2^{\,1}, t_2^{\,3}, t_3^{\,1}, t_3^{\,3}, t_4^{\,1}, t_4^{\,3}, t_5^{\,1}, t_5^{\,3}, t_6^{\,2}$ of the select operations are project operations, so the query processor retrieves the tasks of the selection operation and the tasks of the project operation simultaneously and creates the tasks $t_1^{\,2'}, t_1^{\,4'}, t_2^{\,2'}, t_2^{\,4'}, t_3^{\,2'}, t_3^{\,4'}, t_4^{\,2'}, t_4^{\,4'}, t_5^{\,2'}, t_5^{\,4'}, t_6^{\,3'}$ that combined the select operation and the project operation.

The query processor retrieves the tasks $t_1^{\,2'}, t_1^{\,4'}, t_2^{\,2'}, t_2^{\,4'}, t_3^{\,2'}, t_3^{\,4'}, t_4^{\,2'}, t_4^{\,4'}, t_5^{\,2'}, t_5^{\,4'}, t_6^{\,3'}$ that combined the select operation and the project operation, and tasks $t_1^{\,5}, t_2^{\,5}, t_3^{\,5}, t_4^{\,5}, t_5^{\,5}, t_6^{\,1}$ (1004) that can be processed directly, and divides these tasks into the groups G1~G4 based on the relation of the database that each task accesses; so the tasks $t_1^{\,4'}, t_2^{\,4'}, t_3^{\,4'}, t_4^{\,4'}, t_5^{\,4'}, t_6^{\,3'}$ are collected into the group G1, the tasks $t_1^{\,2'}, t_2^{\,2'}, t_3^{\,2'}, t_4^{\,2'}, t_5^{\,2'}$ are collected into the group G2, the tasks $t_1^{\,5}, t_2^{\,5}, t_3^{\,5}, t_4^{\,5}, t_5^{\,5}$ are collected into the group G3, and the task $t_6^{\,1}$ are collected into the group G4.

After collecting these tasks into the groups, the query processor further collects the tasks having common sub-expression into sub-groups. As tasks having common sub-expressions of a select operation and a project operation, the tasks $t_1^{\,4'}, t_2^{\,4'}, t_3^{\,4'}$ are collected into the sub-group $SG1_{G1}$, the tasks $t_5^{4'}$, $t_6^{3'}$ are collected into the sub-group $SG2_{G1}$, the tasks $t_1^{2'}$, $t_2^{2'}$, $t_3^{2'}$ are collected into the sub-group $SG1_{G2}$, and the tasks $t_1^5$, $t_2^5$, $t_3^5$, $t_5^5$ are collected into the sub-group $SG1_{G3}$. After collecting these tasks into the sub-groups, the query processor creates a task of a synthetic relational operation or a task that combined synthetic relational operations for each sub-group in the groups by applying the improved method 2 and the improved method 3; then the task $t_{G1}^{SG1}$ that combined the synthetic select operation and the synthetic project operation is created for the sub-group $SG1_{G1}$, the task $t_{G1}^{SG2}$ that combined the synthetic select operation and the synthetic project operation is created for the sub-group $SG2_{G1}$, and the task $t_{G3}^{SG1}$ of a synthetic project operation is created for the sub-group $SG1_{G3}$. After creating a task of a synthetic relational operation or a task that combined synthetic relational operations for each sub-group in the groups, the query processor inserts these groups G1~G4 into the group queue (1005).

The multi-operation processor (1006) executing the groups from the group queue retrieves the groups G1~G4 (4 groups) from the group queue (1005) for the number of available processes that the multi-operation processor can utilize (4 processes are used as the example here) and starts processing these groups by having each process execute each group using multi-operation processing. In this case, the process 1 executes the group G1, the process 2 executes the group G2, the process 3 executes the group G3, and the process 4 executes the group G4. The executions of these processes are managed by the process scheduling of an operation system (OS). In each execution of the group by the process, the improved method 4 is applied.

Also if the database server has multiple CPUs (1008), the execution of each group by the process is performed in parallel on different CPUs.

First, the process 1 executes the tasks $t_{G1}^{SG1}$, $t_{G1}^{SG2}$ that combined the synthetic select operation and the synthetic project operation, and the task $t_4^{4'}$, which is not collected into a sub-group, in the order of $t_4^{4'}$, $t_{G1}^{SG2}$, $t_{G1}^{SG1}$. After processing these tasks, the query processor finds new tasks to be processed from the query trees. If new tasks are not found, the process 1 waits until a new group is inserted into the group queue.

The process 2 executes the task $t_{G2}^{SG1}$ that combined the synthetic select operation and the synthetic project operation, and the tasks $t_4^{2'}$, $t_5^{2'}$, which are not collected into a sub-group, in the order of $t_4^{2'}$, $t_{G2}^{SG1}$, $t_5^{2'}$. After processing these tasks, the query processor finds new tasks to be processed from the query trees. If new tasks are not found, the process 2 waits until a new group is inserted into the group queue.

The process 3 executes the task $t_{G3}^{SG1}$ of the synthetic project operation, and the task $t_4^5$, which is not collected into a sub-group, in the order of tasks $t_{G3}^{SG1}$, $t_4^5$.

After processing these tasks, the query processor finds new tasks to be processed from the query trees. If the processing of the task $t_{G3}^{SG1}$ of synthetic project operation finishes, the tasks $t_1^6$, $t_2^6$, $t_3^6$, $t_5^6$ of the join operation become newly available to be processed. Also the tasks $t_1^7$, $t_2^7$, $t_3^7$, $t_5^7$ of the project operation performing operations on the processing results of the tasks $t_1^6$, $t_2^6$, $t_3^6$, $t_5^6$ are project operations, so the query processor retrieves the tasks of the join operation and the tasks of the project operation simultaneously, and combines the tasks $t_1^7$, $t_2^7$, $t_3^7$, $t_5^7$ of the project operation and the tasks $t_1^6$, $t_2^6$, $t_3^6$, $t_5^6$ of the join operation to create the tasks $t_1^{7'}$, $t_2^{7'}$, $t_3^{7'}$, $t_5^{7'}$. Then the query processor creates a new group G5 for the tasks $t_1^{7'}$, $t_2^{7'}$, $t_3^{7'}$, $t_5^{7'}$, and adds the tasks $t_1^{7'}$, $t_2^{7'}$, $t_3^{7'}$, $t_5^{7'}$ into the group G5, and inserts the group G5 into the group queue.

Furthermore, the tasks $t_1^{7'}$, $t_2^{7'}$, $t_3^{7'}$ have common sub-expression of join operation, so the query processor creates the sub-group $SG1_{G5}$ in the group G5, adds the tasks $t_1^{7'}$, $t_2^{7'}$, $t_3^{7'}$ that combined a join operation and a project operation into the sub-group $SG1_{G5}$, and creates the task $t_{G5}^{SG1}$ that combined the synthetic join operation and the synthetic project operation for the sub-group $SG1_{G5}$.

After creating the task $t_{G5}^{SG1}$ that combined the synthetic join operation and the synthetic project operation, and the task $t_5^7$ that combined the join operation and the project operation, the query processor inserts the group G5 into the group queue. At this time, among the process 1 and process 2 waiting for a new group to be inserted into the group queue, the process 1 retrieves the group G5 from the group queue and starts processing the group G5. Likewise, if the processing of the task $t_4^5$ in the group G3 finishes, the processing of the task $t_4^6$ of the join operation becomes newly available to be processed, and the task $t_4^7$ performing operations on the processing result of the task $t_4^6$ is a project operation, so the query processor retrieves both the task $t_4^6$ of the join operation and the task $t_4^7$ of the project operation from the query tree $P_4$, and combines these tasks to create a task $t_4^{7'}$, and creates a new group G6 for the task $t_4^{7'}$ and add the task $t_4^{7'}$ into the group G6, and inserts the group G6 into the group queue. After finish inserting, the process 2 waiting on the group queue until a new group is inserted retrieves the group G6 from the group queue, and starts processing the group G6. Then the process 3 will wait for the group queue until a new group is inserted, because the group queue became empty.

If the process 4 finishes the processing of the task $t_6^1$ in the group G4, the query processor finds new tasks to be processed from the query trees. If the processing of the task $t_6^1$ finishes, the task $t_6^4$ of the join operation becomes newly available to be processed. Also the task $t_6^5$ performing operations on the processing result of the task $t_6^4$ is a project operation, so the query processor retrieves the task $t_6^4$ of the join operation and the task $t_6^5$ of the project operation simultaneously and combines the task $t_6^4$ of the join operation and the task $t_6^5$ of the project operation to create the task $t_6^{5'}$, and creates the new group G7 for the task $t_6^{5'}$, and adds the task $t_6^{5'}$ into the group G7, and insert the group G7 into the group queue. After finish inserting, the process 3 waiting for the group queue until a new group is inserted retrieves the group G7 from the group queue, and starts processing the group G7. Then the process 4 will wait for the group queue until a new group is inserted.

If the process 1 finishes the processing of the task $t_{G5}^{SG1}$ that combined the synthetic join operation and the synthetic project operation, and the task $t_5^{7'}$, which is not collected in a sub-group, in the order of $t_{G5}^{SG1}$, $t_5^{7'}$, the query processor finds new tasks to be processed from the query trees. If the processing of the task $t_{G5}^{SG1}$ finishes, the processing of the tasks $t_1^8$, $t_2^8$, $t_3^8$ of the join operation become newly available to be processed. Since the tasks $t_1^9$, $t_2^9$, $t_3^9$ performing operations on the processing results of the tasks $t_1^8$, $t_2^8$, $t_3^8$ are project operations, the query processor retrieves the tasks $t_1^8$, $t_2^8$, $t_3^8$ of the join operation and the tasks $t_1^9$, $t_2^9$, $t_3^9$ of the project operation simultaneously, and combines these tasks to create the tasks $t_1^{9'}$, $t_2^{9'}$, $t_3^{9'}$, and creates the new group G8 for the tasks $t_1^{9'}$, $t_2^{9'}$, $t_3^{9'}$ and add these tasks into the group G8, and insert the group G8 into the group queue.

After finish inserting, the process 4 waiting on the group queue until a new group is inserted retrieves the group G8 from the group queue and start processing the group G8. Likewise, after processing the task $t_5^{7'}$ in the group G5, the processing of the task $t_5^8$ of the join operation becomes newly available to be processed, and the task $t_5^9$ performing operations on the processing result of the task $t_5^8$ is a project operation, so the query processor retrieves the task $t_5^8$ of the join operation and the task $t_5^9$ of the project operation simultaneously and combines the task $t_5^8$ of the join operation and the task $t_5^9$ of the project operation to create the task $t_5^{9'}$, and adds the task $t_5^{9'}$ into the group G9, and inserts the group G9 into the group queue. After inserting, all processes except the process 1 are processing the other groups, so the process 1 continuously retrieves the group G9 from the group queue, and starts processing the group G9.

Thus, as each process finishes processing of the groups, the groups from the group queue are continuously retrieved and processed. As the multi-operation processor (1006) repeatedly performs the processing of the groups, the tasks in the query trees gradually approach the end. Then when the processing of all tasks in the query trees finish, the processing of all given queries is completed.

Also, if the new query $Q_7$ is requested from a user while the query processor is processing the current queries ($Q_1 \sim Q_6$), the query processor performs the query optimization for the query $Q_7$ using the query optimizer to create the query tree $P_7$, then retrieves the tasks to be processed from the query tree $P_7$ in the order of topological sort, then it checks to see if there are some groups in the group queue collecting tasks that access the same relations as the relations that the retrieved tasks access. If such groups exist in the group queue, it adds these tasks into the groups. If such groups do not exist in the group queue, it creates new groups for these tasks.

Furthermore, if the number of queries increases, several groups would be queued into the group queue while the multi-operation processor is processing other groups, and many tasks are collected into the groups, and the tasks collected into the groups are further collected into the sub-groups. As a result, many tasks are processed simultaneously. Therefore by processing the queries in this way, the database management system can process a large number of queries effectively and quickly.

[Flowchart of Query Processing System Using Multi-Operation Processing Utilizing a Synthetic Relational Operation in Consideration of Improvement in a Processing Capability of a Join Operation]

Figure 2:
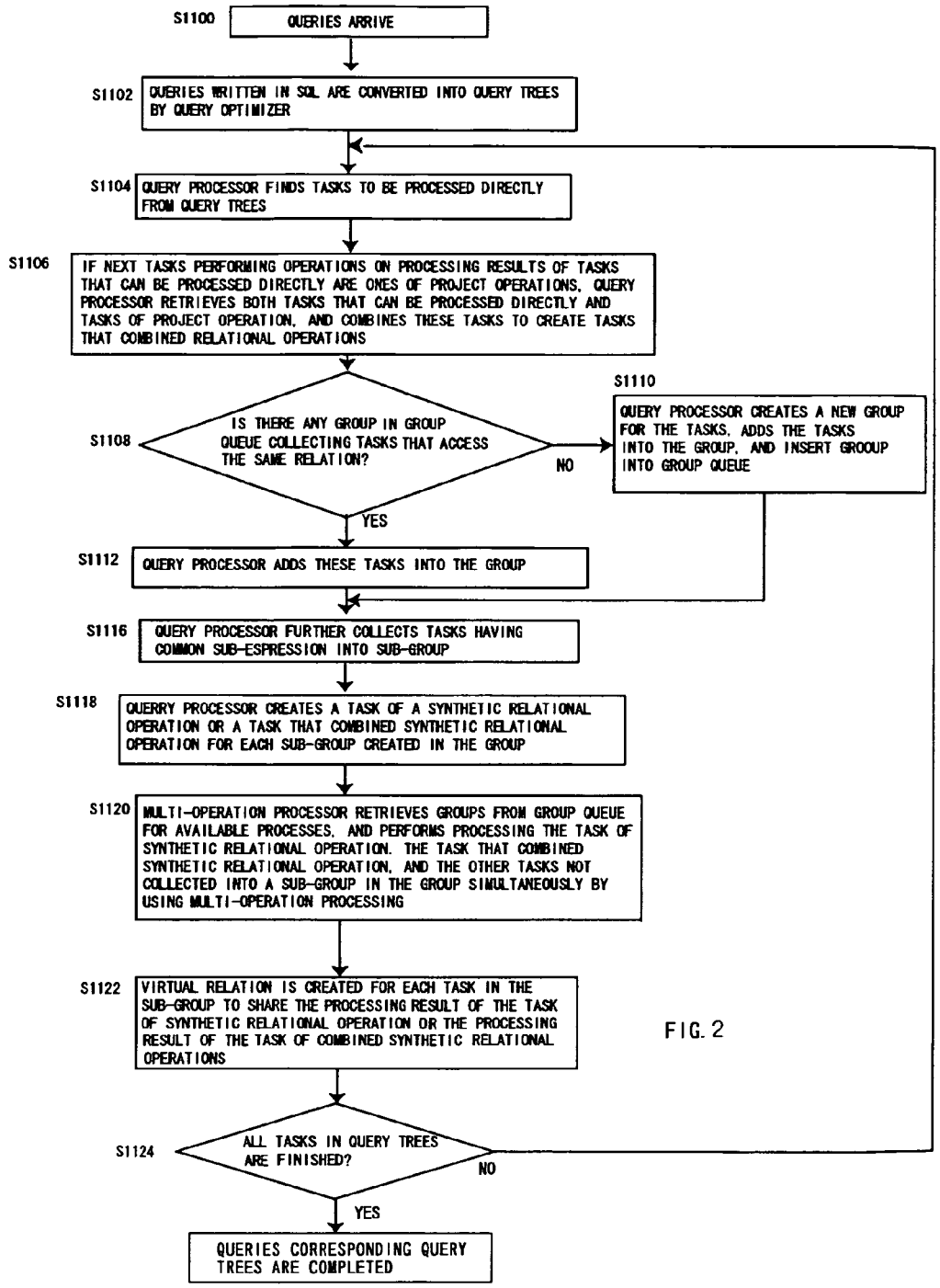
FIG. 2 is a diagram showing the flowchart of processing queries.

FIG. 2 shows a flowchart showing a series of processing queries using the multi-operation processing utilizing a synthetic relational operation described in the architecture of FIG. 1. The basic flow of the execution performed in this flowchart is similar to the ones described in the patent JP2006-356406 and the patent JP2007-075670.

In the flowchart of FIG. 2, when queries are requested from users to the database server using relational database language such as SQL (S1100), the queries are converted into query trees consisting of relational algebra by the query optimizer (S1102).

Then, the query processor finds tasks to be processed directly from the query trees in the order of topological sort. (S1104).

After finding the tasks to be processed directly, if the next tasks performing operations on the processing results of the tasks that can be processed directly are project operations, the query processor retrieves both the tasks that can be processed directly and the tasks of the project operation by applying the improved method 1, and combines these tasks to create the tasks that combined relational operations. (S1106)

Then, the query processor checks to see if there is any group in the group queue collecting tasks that access the same relation as the relation that the tasks that combined relational operations, as well as other tasks that can be processed directly, access. (S1108).

If such group exists in the group queue, the query processor adds these tasks into the group (S1112). If such group does not exist in the group queue, the query processor create a new group for these tasks, and adds these tasks into the group, and inserts the group into the group queue (S1110).

After collecting these tasks into the groups, the query processor further collects these tasks having common sub-expression into sub-groups (S1116). After the tasks are collected into sub-groups, the query processor creates a task of a synthetic relational operation or a task that combined synthetic relational operations for each sub-group created in the group by applying the improved method 2 and the improved method 3 (S1118).

The multi-operation processor retrieves the groups from the group queue for the number of available processes, and performs processing the tasks of synthetic relational operation, the tasks that combined synthetic relational operations, and the other tasks not collected into a sub-group in the group, simultaneously by using the multi-operation processing (S1120) of the improved method 4.

After processing the task of synthetic relational operation or the task that combined synthetic relational operations in the group, by applying the improved method 2 and the improved method 3, a virtual relation is created for each task in the sub-group to share a processing result of the task of synthetic relational operation or the processing result of the task that combined synthetic relational operations (S1122).

After processing all tasks in the group, the multi-operation processor checks if all tasks in the query trees finished (S1124). If some tasks still exist in the query trees, the query processor retrieves the next tasks to be processed from the query trees repeatedly. When all tasks in the query trees are finished, the queries corresponding to the query tree are completed.

<Detailed Description of Each Improved Method>

The four improved methods mentioned above are described in the followings in details.

[1. Multi-Operation Processing Utilizing a Synthetic Relational Operation in Consideration of Improvement in a Processing Capability of a Join Operation]

When the queries requested from users are converted into query trees consisting of relational algebra by the query optimizer (S1102), the query processor retrieves the tasks, which are vertices on the query trees that can be processed directly and not dependent on other tasks in the order of topological sort, as tasks that combined relational operations. (S1104, S1106)

Next, the query processor collects these tasks into the groups based on a relation of a database that each task accesses (S1108~S1112), then further collects these tasks in the groups into the sub-groups based on each common sub-expressions (S1116). Then, for each sub-group created in the groups, the query processor creates a task of a synthetic relational operations or a task that combined synthetic relational operations (S1118). After that, the query processor utilizes the multi-operation processor to process the tasks of a synthetic relational operation, the tasks that combined synthetic relational operations, and others tasks which are not collected into a sub-group simultaneously (S1120).

[1-1. Method of Retrieving a Task that Combined Relational Operations]

The method of retrieving tasks that combined relational operations as the improved methods 1 (S1106) is described in the following.

In collecting tasks which can be processed directly in the order of topological sort from query trees into the groups based on a relation R to be accessed, a task to be added into a group is a select operation as follow.

$$TEMP\_T1 \leftarrow \sigma_{<select\ condition>}R$$

Then, the next task performing operations on the processing result TEMP_T1 of the task of the select operation is a project operation as follows.

$$TEMP\_T2 \leftarrow \Pi_{<attribute\ list>}TEMP\_T1$$

In this case, this method combines the task of the select operation and the task of a project operation to create a task that combined relational operations as follows.

$$TEMP\_T2 \leftarrow \Pi_{<attribute\ list>}(\sigma_{<select\ condition>}R)$$

Then this method adds this task into a group. Here, a select operation is expressed as a notation σ, and a project operation is expressed as a notation Π.

Likewise, this method creates a task that combined a join operation and a project operation. That is, in collecting tasks that can be processed directly from query trees into groups based on a relation S to be accessed, a task to be added into a group is a join operation as follows.

$$TEMP\_T3 \leftarrow R|X|_{<join\ condition>}S$$

Then, a next task performing operations on the processing result TEMP_T3 of the task of the join operation is a project operation as follows.

$$TEMP\_T4 \leftarrow \Pi_{<attribute\ list>}TEMP\_T3$$

In this case, this method combines the task of the join operation and the task of the project operation to create a task that combined relational operations as follows.

$$TEMP\_T4 \leftarrow \Pi_{<attribute\ list>}(R|X|<join\ condition>S)$$

Then this method adds this task into a group. Here, a join operation is expressed as a notation |X|.

[1-2. Algorithm of Multi-Operation Processing Utilizing a Synthetic Relational Operation in Consideration of Improvement in a Processing Capability of a Join Operation]

Next, the algorithm of multi-operation processing utilizing a synthetic relational operation, which added the 4 improved methods, is further described.

The algorithm described here newly added 4 improved methods into the algorithm described in the previous patent (JP2007-075670) that the present inventors filed.

[(a) Step 1: Sub-Grouping Tasks]

For processing the tasks in a group performing operations on a common relation R, the following definition of common sub-expression was defined between the tasks. Then, the tasks in the group are collected into sub-groups for each common sub-expression (S1116). In the common sub-expression described here, the definition of common sub-expression of join operation is a new definition of common sub-expression added in the present invention. The definitions of other common sub-expression (select operation, project operation, and other relational operations) are basically same definition described in the previous patent JP2007-075670 that the present inventor filed.

Definition of Common Sub-Expression

A task $t_i$ and a task $t_j$ have common sub-expression if they satisfy one of the following conditions of select operation, project operation, join operation, and other relational operations.

Select Operation:

A task $t_i$ is a select operation on relation R using attributes $A_1, A_2, A_3, \ldots, A_k$ in its select condition (conjunctive select condition using AND, OR), and a task $t_j$ is a selection operation on relation R using attributes $A_1, A_2, A_3, \ldots, A_k$ in its select condition (conjunctive select condition using AND, OR), where the select conditions that the task $t_i$ and the tasks $t_j$ use on one attribute $Ai (1 \leq i \leq k)$ are different conditions or same conditions, and the other select conditions that the task $t_i$ and the tasks $t_j$ use on the other attributes are same conditions.

Project Operation:

A task $t_i$ is a project operation for relation R, and a task $t_j$ is a project operation for the same relation R.

Join Operation:

A task $t_i$ is a join operation represented as $Ri|X|_{<join\ condition\ i>}Si$, and a task $t_j$ is a join operation represented as $Rj|X|_{<join\ condition\ j>}Sj$, and a join condition <join condition i> and a join condition <join condition j> perform their join operations using same attributes, where the relation Ri and the relation Rj are equivalent (Ri=Rj) and the relation Si and the relation Sj are subsets of the relation S, or the relation Si and the relation Sj are equivalent (Si=Sj) and the relation Ri and the relation Rj are subsets of the relation R.

Other Relational Operations

A task $t_i$ and a task $t_j$ are equivalent tasks of a relational operation ($t_i = t_j$).

The conditions of the operations used in the above definition are only related to common sub-expressions.

Next, the tasks that combined a select operation and a project operation in the group are collected into sub-groups based on their select operations of these tasks. Also, the tasks that combined a join operation and a project operation in the group are collected into sub-groups based on their join operations of these tasks.

[(b) Step 2: Creating a Task of a Synthetic Relational Operation and a Task that Combined Synthetic Relational Operations]

If the tasks in the group are collected into sub-groups for each common sub-expression by using the step 1, a task of synthetic relational operation, or a task that combined synthetic relational operations is created for each sub-group in the group by using the following methods based on the type of operation of the tasks in the sub-group (S1116).

By adding the definition of common sub-expression of join operation, a task of a synthetic join operation discussed in the improved method 2 is created as follows.

[(b-1) Method of Creating a Task of a Synthetic Join Operation]

The following multiple tasks of the join operation having the common sub-expression of the join operation exist in a sub-group.

$$TEMP\_T1 \leftarrow R1|X|_{<join\ condition\ 1>}S1$$
$$TEMP\_T2 \leftarrow R2|X|_{<join\ condition\ 2>}S2$$
$$TEMP\_T3 \leftarrow R3|X|_{<join\ condition\ 3>}S3$$
$$\ldots$$
$$TEMP\_Tn \leftarrow Rn|X|_{<join\ condition\ n>}Sn$$

These tasks of the join operation follow the definition of the common sub-expression of the join operation.

Then, this method concatenates the join operations of these tasks by using logical union to create a task of a synthetic join operation satisfying all join conditions of these tasks in the sub-group as follows.

$$\text{TEMP\_SG} \leftarrow (R1|X|_{<join\ condition\ 1>}S1) \cup (R2|X|_{<join\ condition\ 2>}S2) \cup$$
$$(R3|X|_{<join\ condition\ 3>}S3) \cup ... \cup (Rn|X|_{<join\ condition\ n>}Sn)$$

Here, $\text{TEMP\_Ti} \leftarrow Ri|X|_{<join\ condition\ i>}Si$ represents a task performing a join operation ($|X|$) on the relations Ri and Si by using the join condition <join condition i> and storing the processing result in TEMP_Ti.

Next, the method of creating a task that combined synthetic relational operations, discussed in the improved method 3, is created from multiple tasks that combined relational operations in the following.

[(b-2) Method of Creating a Task that Combined a Synthetic Select Operation and a Synthetic Project Operation]

The following tasks that combined a select operation and a project operation exist in a sub-group.

$$\text{TEMP\_T1} \leftarrow \Pi_{<attribute\ list\ 1>}(\sigma_{<select\ condition\ 1>}R)$$
$$\text{TEMP\_T2} \leftarrow \Pi_{<attribute\ list\ 2>}(\sigma_{<select\ condition\ 2>}R)$$
$$\text{TEMP\_T3} \leftarrow \Pi_{<attribute\ list\ 3>}(\sigma_{<select\ condition\ 3>}R)$$
$$...$$
$$\text{TEMP\_Tn} \leftarrow \Pi_{<attribute\ list\ n>}(\sigma_{<select\ condition\ n>}R)$$

First, this method concatenates the select conditions <select condition i>(i=1, 2, ..., n) used in the select operations of these tasks by using Boolean OR to create a conjunctive select selection, then it optimizes the conjunctive select condition to remove any overlapped selections from the conjunctive select condition to create a synthetic select operation satisfying all select conditions of these tasks in the sub-group as follow.

$$\sigma_{optimize(<select\ condition\ 1> OR <select\ condition\ 2> OR <select\ condition\ 3> ... OR <select\ condition\ n>)}R$$

Next, this method obtains the union of the attributes from the attribute lists <attribute list i>(i=1, 2, ..., n) used in the project operations of these tasks in the sub-group to create a attribute list <attribute list SG>, then it creates a synthetic project operation including all attributes of the project operations of these tasks in the sub-group as follows.

$$\Pi_{<attribute\ list\ SG>}(...)$$

Then, by combining the synthetic select operation and the synthetic project operation that are created, this method creates a single task that combined the synthetic select operation and the synthetic project operation satisfying all select conditions of the select operations and including all attributes of the project operations of these tasks in the sub-group as follows.

$$\text{TEMP\_SG} \leftarrow \Pi_{<attribute\ list\ SG>}(\sigma_{optimize(<select\ condition\ 1> OR <select\ condition\ 2> OR <select\ condition\ 3> ... OR <select\ condition\ n>)}R)$$

[(b-3) Method of Creating a Task that Combined a Synthetic Join Operation and a Synthetic Project Operation]

The following tasks that combined a join operation and a project operation exist in a sub-group.

$$\text{TEMP\_T1} \leftarrow \Pi_{<attribute\ list\ 1>}(R1|X|_{<join\ condition\ 1>}S1)$$
$$\text{TEMP\_T2} \leftarrow \Pi_{<attribute\ list\ 2>}(R2|X|_{<join\ condition\ 2>}S2)$$
$$\text{TEMP\_T3} \leftarrow \Pi_{<attribute\ list\ 3>}(R3|X|_{<join\ condition\ 3>}S3)$$
$$...$$
$$\text{TEMP\_Tn} \leftarrow \Pi_{<attribute\ list\ n>}(Rn|X|_{<join\ condition\ n>}Sn)$$

First, this method concatenates the join operations $Ri|X|_{<join\ condition\ i>}Si$ (i=1, 2, ..., n) of these tasks by using logical union to create a synthetic join operation satisfying all join conditions of the join operations of these tasks in the sub-group as follow.

$$(R1|X|_{<join\ condition\ 1>}S1) \cup (R2|X|_{<join\ condition\ 2>}S2) \cup (R3|X|_{<join\ condition\ 3>}S3) ... \cup (Rn|X|_{<join\ condition\ n>}Sn)$$

Next, this method obtains the union of the attributes from the attribute list <attribute list i>(i=1, 2, ..., n) used in the project operations of these tasks in the sub-group to create a synthetic project operation including all attributes of the project operations of these tasks in the sub-group as follows.

$$\Pi_{<attribute\ list\ SG>}(...)$$

Then, by combining the synthetic join operation and the synthetic project operation that are created, this method creates a single task that combined the synthetic join operation and the synthetic project operation satisfying all join conditions of the join operations and including all attributes of the project operations of these tasks in the sub-group, as follows.

$$\text{TEMP\_SG} \leftarrow \Pi_{<attribute\ list\ SG>}((R1\ |X|\ <join\ condition\ 1>\ S1) \cup (R2\ |X|\ <join\ condition\ 2>\ S2) \cup (R3\ |X|\ <join\ condition\ 3>\ S3) ... \cup (Rn\ |X|\ <join\ condition\ n>\ Sn))$$

[(c) Step 3: Processing Tasks in a Group Using Multi-Operation Processing]

The task of the synthetic join operation, the task that combined the synthetic select operation and the synthetic project operation, and the task that combined the synthetic join operation and the synthetic project operation created for sub-groups in the group are processed by the multi-operation processing.

In order to process these tasks, the following methods are used in the multi-operation processing.

[(c-1) Method of Processing a Task of a Synthetic Join Operation]

The following is the task of the synthetic join operation created by using the method of creating a task of a synthetic join operation mentioned above.

$$\text{TEMP\_SG} \leftarrow (R1|X|_{<join\ condition\ 1>}S1) \cup (R2|X|_{<join\ condition\ 2>}S2) \cup (R3|X|_{<join\ condition\ 3>}S3) \cup ... \cup (Rn|X|_{<join\ condition\ n>}Sn)$$

Here, the virtual relations S1, S2, S3, ..., Sn are subsets of the relation S sharing a part of the relation S, and relation R1, R2, ..., Rn are subsets of the relation R sharing a part of the relation R.

The method of processing the task of the synthetic join operation using multi-operation processing does not separately execute each join operation (Ri|X|$_{<join\ condition\ i>}$Si) (i=1, 2, ..., n) contained in the task of synthetic join operation, and does not obtains the union of each processing result to collect each processing result into TEMP_SG. Instead, the following method is used.

First, this method finds the blocks that the virtual relation S1, S2, S2, ..., Sn share in the relation S of source search, and collects them into the block sets $B_1, B_2, \ldots, B_n$. In other words, for each virtual relation $S_i$(i=1, 2, ..., n), a block set $B_i$={a set of blocks that the virtual relation $S_i$ shares from the relation S consisting of blocks $b_1, b_2, \ldots, b_m$}(i=1, 2, ..., n) is obtained. Then this method creates a block set $B^{SG}$ by obtaining the union of the block sets $B_1, B_2, \ldots, B_n$, that is $B^{SG}=B_1 \cup B_2 \cup B_3 \cup \ldots \cup B_n$, corresponding to the task of synthetic join operation.

After creating the block set $B^{SG}$, this method accesses disk to reads the block $b_i$(i=1, 2, ..., k, k≦m) in the block set. Then for the first record s in the block $b_i$, this method retrieve a record r satisfying the join conditions <join condition i>(i=1, 2, ..., n) of the synthetic join operation from the common relation R of destination search (retrieves a record satisfying the join relationship of R|X|$_{<join\ condition\ i>}$S).

After a record r is found, if at least one join operation (Ri|X|$_{<join\ condition\ i>}$Si) (1≦i≦n) contained in the task of synthetic join operation includes the record r in its virtual relation Ri(1≦L≦n) of destination search and includes the record s in its virtual relation Si(1≦i≦n) of source search (satisfying the join relationship of Ri|X|$_{<join\ condition\ i>}$Si), this method joins the record r and the record s to create a record t, and add the record t into the processing result TEMP_SG of the task of synthetic join operation.

Likewise, this method continues processing for the remaining records in the block $b_i$ in the same way. After processing all records in the block $b_i$, this method repeats this process performed at the block $b_i$ for the remaining blocks in the block set $B^{SG}$.

For processing the task of a synthetic join operation, in order to check if a record r is in its virtual relation Ri(1≦i≦n), it is decided by checking if the relative address of the record r is in the range of the relative address of the records that the virtual relation Ri(1≦i≦n) shares in the relation R. Likewise, in order to check if a record s is in its virtual relation Si(1≦i≦n), it is decided by checking if the relative address of the record s is in the range of the relative address of the records that the virtual relation Si(1≦i≦n) shares in the relation S.

A relative address of the record is the relative address of the record on the relation, and it represents the number of bytes to move from the beginning of the relation to the location of the record when the beginning of the relation is 0.

By processing the task of a synthetic join operation in this way, each join operation (Ri|X|$_{<join\ condition\ i>}$Si) (i=1, 2, ..., n) contained in the task of a synthetic join operation is not processed separately, and the blocks that each virtual relation Si(i=1, 2, ..., n) shares in the relation S are only accessed once, and the records in the relation R that each virtual relation Ri(i=1, 2, ..., n) shares in the relation R are only searched once.

Also since the task of synthetic join operation is processed with other tasks in a group, the block access order of the blocks in the block set $B^{SG}$ is determined by multi-operation processing.

Therefore by using the method of processing a task of a synthetic join operation to process the task of the synthetic join operation as above, each join operation (Ri|X|$_{<join\ condition\ i>}$Si) (i=1, 2, ..., n) contained in the task of synthetic join operation is not processed separately. Therefore this method reduces the number of disk access and improves the query processing speed.

[(c-2) Method of Processing a Task that Combined a Synthetic Select Operation and a Synthetic Project Operation]

In order to process the task that combined the synthetic select operation and the synthetic project operation by using the multi-operation processing, the processing of the synthetic select operation and the processing of the synthetic project operation are performed simultaneously. This method performs the processing of the synthetic project operation for each record processed by the synthetic select operation, and adds results directly into the processing result of the task that combined the synthetic select operation and the synthetic project operation.

[(c-3) Method of Processing a Task that Combined a Synthetic Join Operation and a Synthetic Project Operation]

In order to process the task that combined the synthetic join operation and the synthetic project operation by using the multi-operation processing, the processing of the synthetic join operation and the processing of the synthetic project operation are performed simultaneously. This method performs the processing of the synthetic project operation for each record processed by the synthetic join operation, and adds results directly into the processing result of the task that combined the synthetic join operation and the synthetic project operation.

[(d) Virtual Relations]

[(d-1) Virtual Relations Sharing a Processing Result of a Task of Synthetic Join Operation]

Since the processing result of the task of the synthetic join operation contains processing results of all tasks of the join operation in the sub-group, each task of the join operation in the sub-group shares a part of the processing result of the task of synthetic join operation. In order to share the processing result, the processing result of the task of the synthetic join operation is sorted by the same attributes as the attributes used to sort the records in the relation of destination search or the relation of source search used in the synthetic join operation. Then for each task of the join operation in the sub-group, a virtual relation, which is a processing result of each task in the sub-group, is created, and in the virtual relation, the information such as a relation name of the processing result of the task of the synthetic join operation that the virtual relation shares partially, stored locations of the records (row range of records) shared in the processing result, stored locations of the attributes, and numbers and address of the blocks where the records are stored, are written.

[(d-2) Virtual Relations Sharing a Processing Result of a Task that Combined a Synthetic Select Operation and a Synthetic Project Operation]

Since the processing result of the task that combined the synthetic select operation and the synthetic project operation contains processing results of all tasks that combined the select operation and the project operation in the sub-group, each task in the sub-group shares a part of the processing result of the task that combined the synthetic select operation and the synthetic project operation. In order to share the processing result, the processing result of the task that combined the synthetic select operation and the synthetic project operation is sorted by the attributes used in the select condition of synthetic select operation contained in the task. Then for each task that combined the select operation and the project operation in the sub-group, a virtual relation, which is a processing result of each task in the sub-group, is created, and in the virtual relation, the information such as a relation name of the processing result of the task that combined the synthetic select operation and the synthetic project operation that the virtual relation shares partially, stored locations of the records (row range of records) shared in the processing result, attribute numbers, and numbers and address of the blocks where the records are stored, are written.

[(d-3) Virtual Relations Sharing a Processing Result of a Task that Combined a Synthetic Join Operation and a Synthetic Project Operation]

Since the processing result of the task that combined the synthetic join operation and the synthetic project operation contains processing results of all tasks that combined the join operation and the project operation in the sub-group, each task in the sub-group shares a part of the processing result of the task that combined the synthetic join operation and the synthetic project operation. In order to share the processing result, the processing result of the task that combined the synthetic join operation and the synthetic project operation is sorted by the same attributes as the attribute used to sort the records in the relation of destination search or the relation of source search used in the synthetic join operation of the task. Then for each task that combined the join operation and the project operation in the sub-group, a virtual relation, which is a processing result of each task in the sub-group, is created, and in the virtual relation, the information such as a relation name of the processing result of the task that combined the synthetic join operation and the synthetic project operation that the virtual relation shares partially, stored locations of the records (row range of records) shared in the processing result, attribute numbers, and numbers and address of the blocks where the records are stored, are written.

By creating the virtual relations as above, each task that combined relational operations in the sub-group is able to clarify the sharing of the processing result of the task that combined synthetic relational operations. As a result, a separate processing result having overlapped selections, join selections, and attributes (columns) is not created on disk for each task in the sub-group. Therefore it reduces the number of disk access and improves the query processing speed.

[(e) Method of Processing Multiple Tasks of a Join Operation Using Multi-Operation Processing (the Improved Method 4)]

For processing multiple tasks of a join operation in a group, the method of processing multiple tasks of a join operation using multi-operation processing simultaneously performs the processing of retrieving records and the processing of joining records that the multiple tasks of the join operation in the group require if the multiple tasks of the join operation in the group perform their join operations on their virtual relations of source search and their virtual relation of destination search using same attributes in their join condition, where these virtual relations of source search belong to a single common relation of source search and these virtual relations of destination search belong to a single common relation of destination search.

The following multiple tasks of a join operation are collected into a group.

$(t_1)$: TEMP_T1 ← R1|X|$_{<join\ condition\ 1>}$S1,
$(t_2)$: TEMP_T2 ← R2|X|$_{<join\ condition\ 2>}$S2,
$(t_3)$: TEMP_T3 ← R3|X|$_{<join\ condition\ 3>}$S3,
...,
$(t_n)$: TEMP_Tn ← Rn|X|$_{<join\ condition\ n>}$Sn The tasks $t_1, t_2, t_3, \ldots, t_n$ of the join operation perform their join operation on the virtual relations R1, R2, R3, ..., Rn and the virtual relations S1, S2, S3, ..., Sn using same attributes in their join conditions <join condition 1>, <join condition 2>, <join condition 3>, ..., <join condition n>. The virtual relations S1, S2, S3, ..., Sn that the tasks $t_1, t_2, t_3, \ldots, t_n$ of the join operation use share a part of the records and the attributes (columns) in the relation S (a common relation of source search), and the virtual relation R1, R2, R3, ..., Rn that the tasks $t_1, t_2, t_3, \ldots, t_n$ of the join operation use share a part of the records and the attributes in the relation R (a common relation of destination search).

Then the tasks $t_1, t_2, t_3, \ldots, t_n$ of the join operations in the group are simultaneously processed by the method of processing multiple tasks of a join operation using multi-operation processing.

In order to process the tasks $t_1, t_2, t_3, \ldots, t_n$ of the join operations in the group simultaneously, this method creates access plans for the tasks $t_1, t_2, t_3, \ldots, t_n$ in the group, obtains processing costs of these tasks based on the access plans, sort these tasks based on the processing cost (in the order from the task of smaller processing cost to the task of larger processing cost), finds blocks that the tasks $t_1, t_2, t_3, \ldots, t_n$ of the join operation need to access to the relation S (common relation of source search) and collects the blocks into the block sets $B_1, B_2, B_3, \ldots, B_n$ corresponding to the tasks $t_1, t_2, t_3, \ldots, t_n$ based on the information stored in the virtual relations S1, S2, S3, ..., Sn (the information such as the stored locations of the records in the relation S that the virtual relations S1, S2, S3, ..., Sn share partially, the stored locations of the attributes, and the numbers and the address of the blocks where the records are stored), and determines a block access order to the relation S by obtaining the union of the block sets $B_1, B_2, B_3, \ldots, B_n$ based on the sorted order of the tasks in the group (from the task of smaller processing cost to the task of larger processing cost).

Next, based on the block access order, this method accesses disk to read a block $b_k(1 \leq k \leq m)$ in the relation S into main memory as a common block.

Then, for the first record s in the common block $b_k$, this method retrieves a record r satisfying the join condition <join condition>(i=1, 2, 3, ..., n) with the record s (finding a record satisfying the join relationship R|X|$_{<join\ condition\ i>}$S) from the relation R. If the record r is found, this method joins the record r and the record s to create a record t.

Then, if the first task $t_i$ $(1 \leq i \leq n)$ of the join operation in the group that needs to be processed at the common block $b_k$ includes the record r in its virtual relation Ri of destination search and includes the record s in its virtual relation Si of source search (satisfying the join relationship Ri|X|$_{<join\ condition\ i>}$Si), the joined record t is added into the processing result TEMP_Ti$(1 \leq i \leq n)$ of the task $t_i$.

Next, if the next task $t_j$ $(1 \leq j \leq n)$ of the join operation in the group that needs to be processed at the common block $b_k$ includes the record r in its virtual relation Rj of destination search and includes the record s in its virtual relation Sj of source search (satisfying the join condition Rj

|X|$_{<join\ condition_j>}$Sj), utilizing the already joined record t, the record t is added into the processing result TEMP_Tj ($1 \leq j \leq n$) of the task $t_j$.

Likewise for the remaining tasks of the join operation in the group that need to be processed at the block $b_k$, these tasks of the join operations are performed in the same way.

After processing the all tasks of the join operation in the group for the first record s in the block $b_k$, this method continuously performs the processing of these tasks of the join operation described above for the next record in the common block $b_k$ repeatedly.

Thus, the method of processing multiple tasks of a join operation using multi-operation processing improves the query processing speed by utilizing the record in the common block, the record retrieved from the common relation of destination search, and the record that joined these two records for each task of the join operation in the group, so that the processing of retrieving records and the processing of joining records are not processed separately for each task of the join operation in the group. Therefore these operations are performed simultaneously for the tasks of the join operation in the group.

[2 Examples of Multi-Operation Processing Utilizing a Synthetic Relational Operation in Consideration of Improvement in a Processing Capability of a Join Operation]

Figures 1, 3:
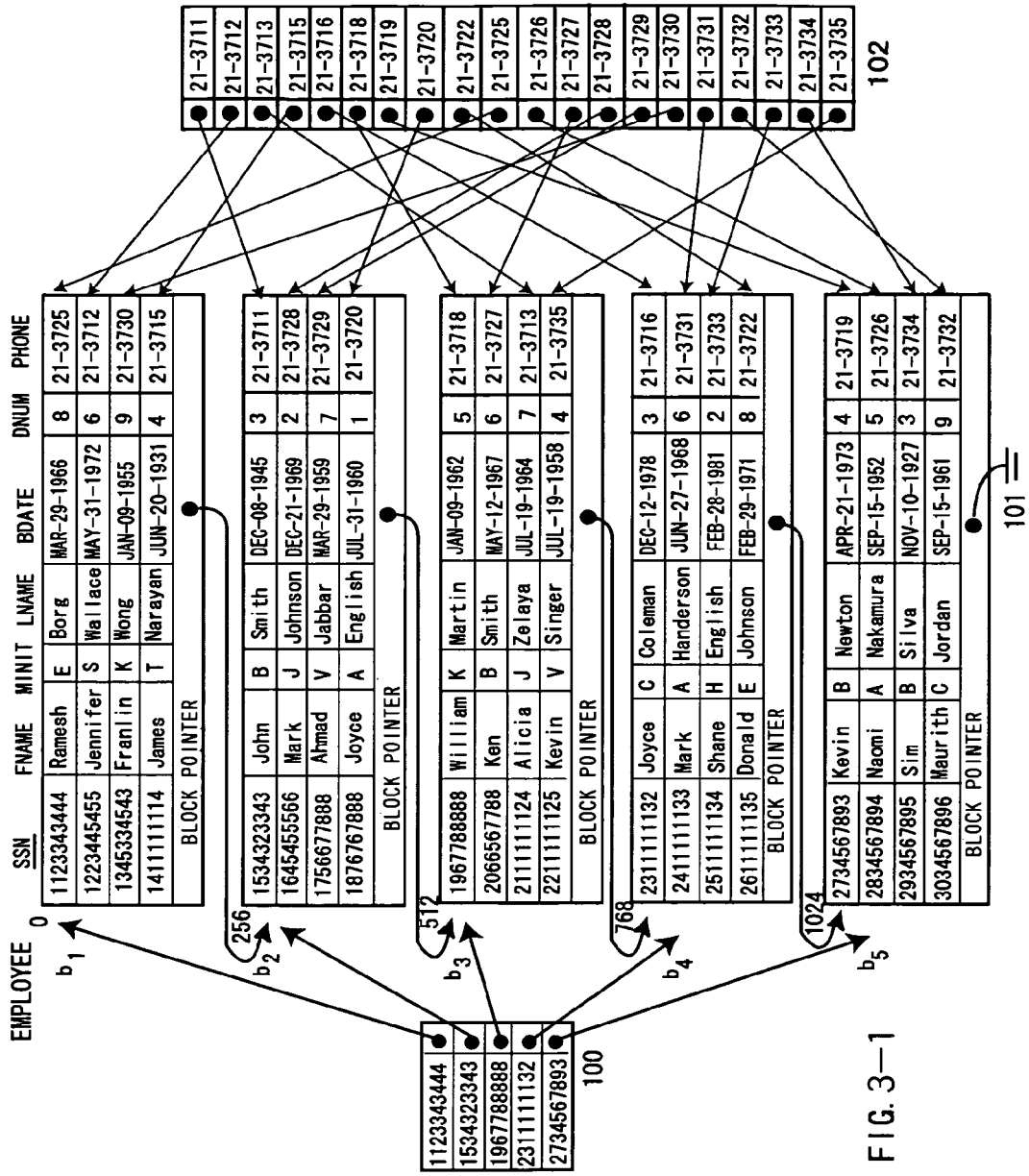
Figures 2, 3:
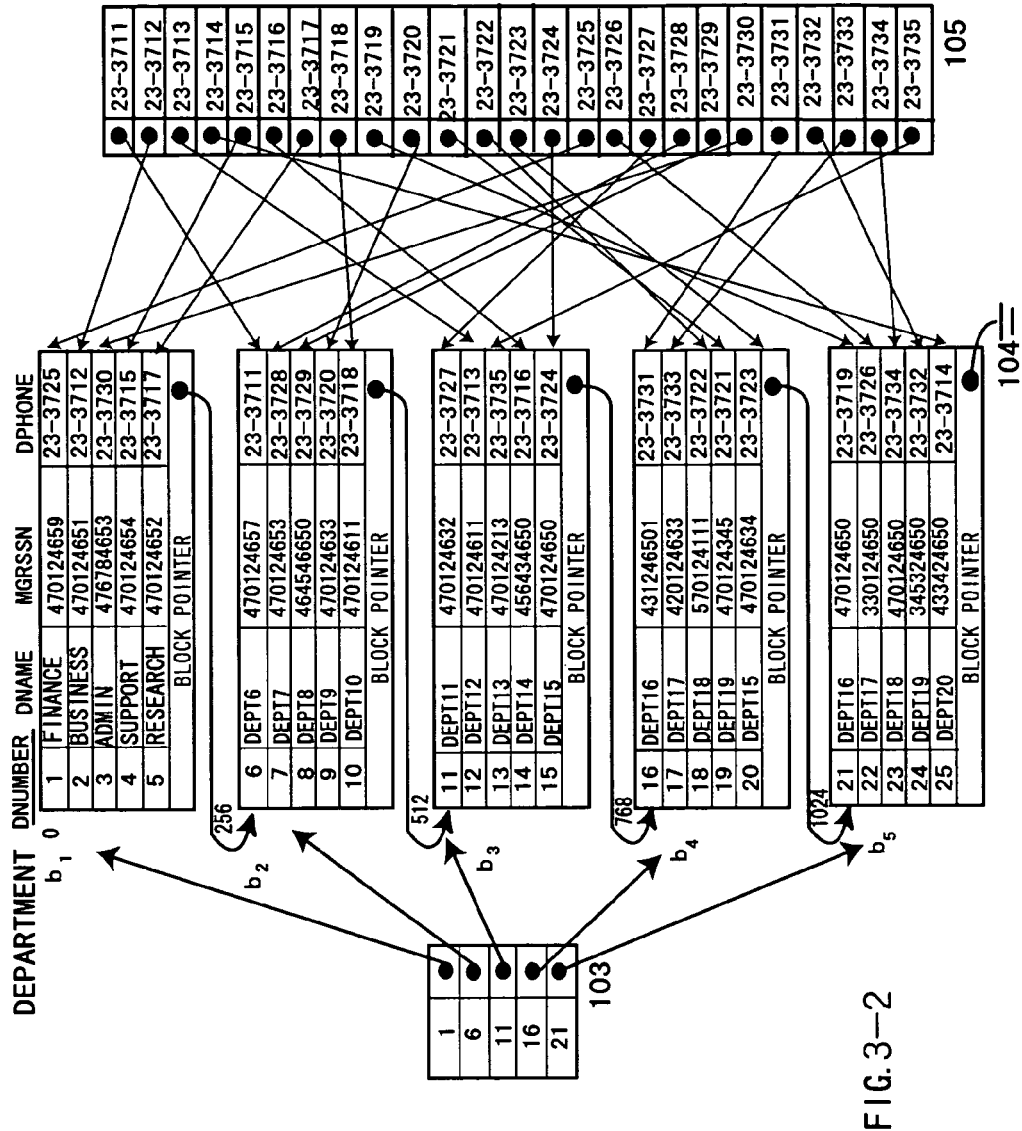
Figure 3:
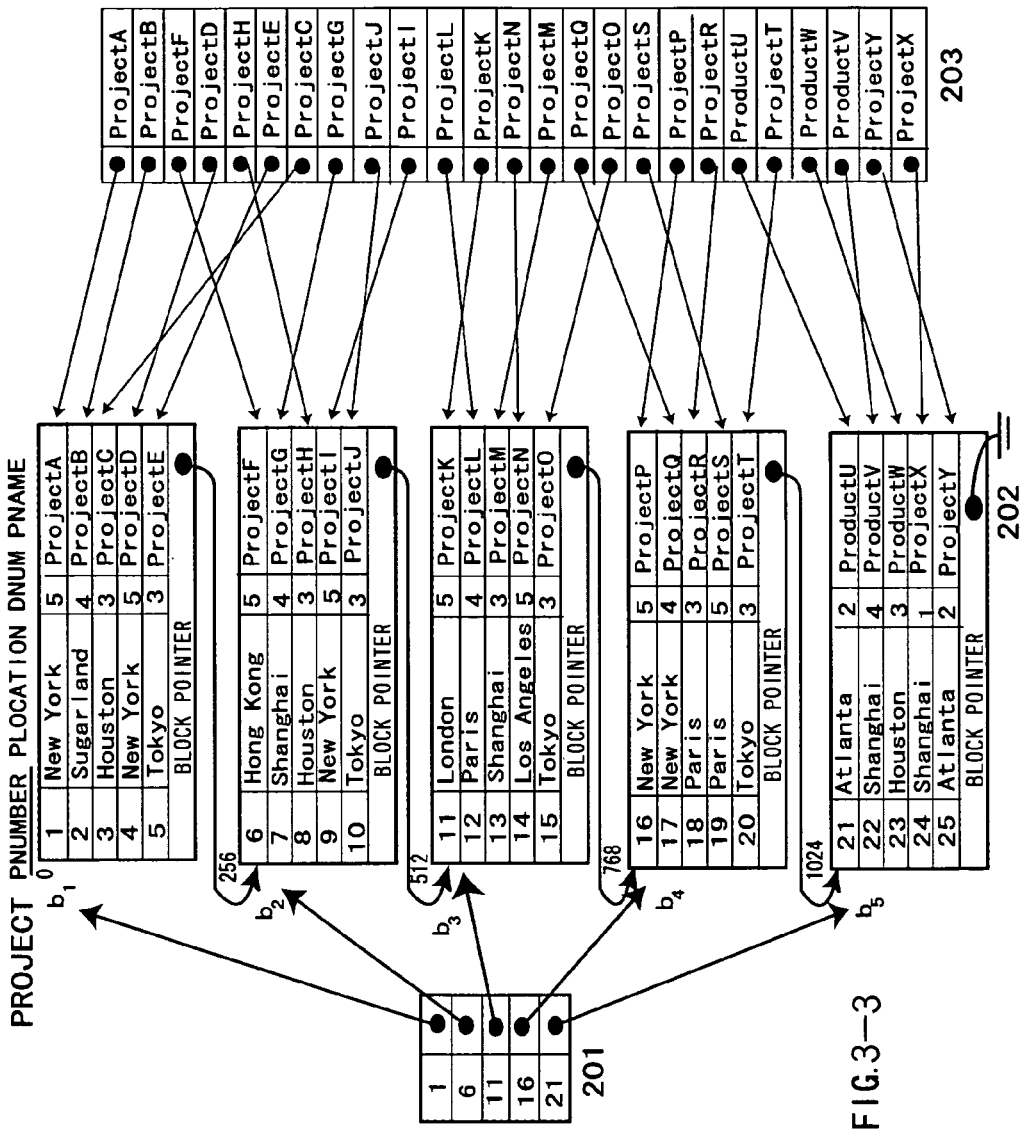
Figure 4:
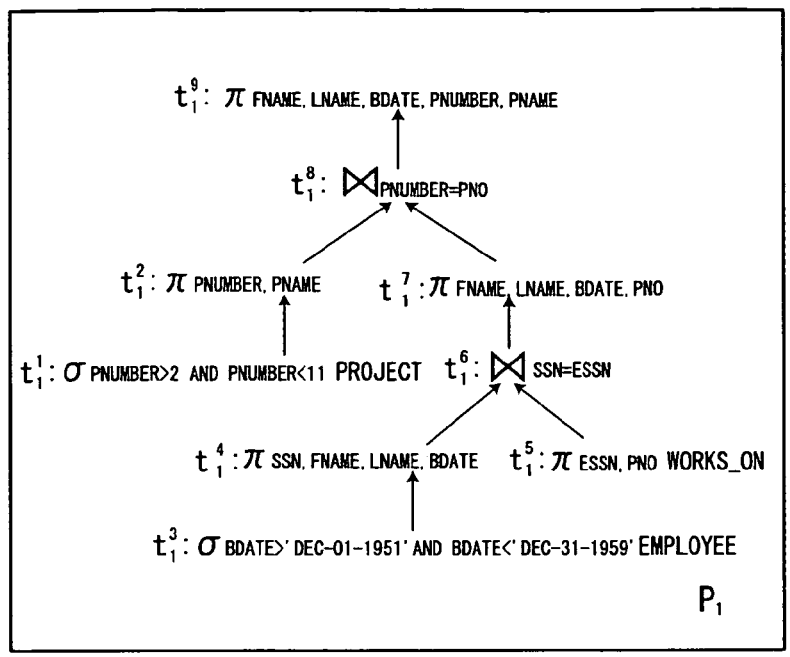
Figure 1:
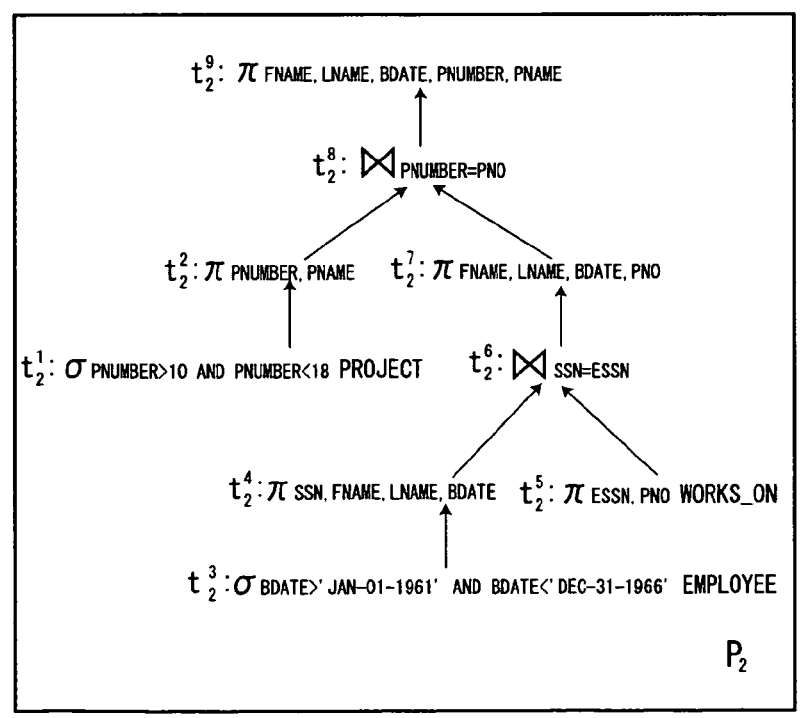
Figure 4:
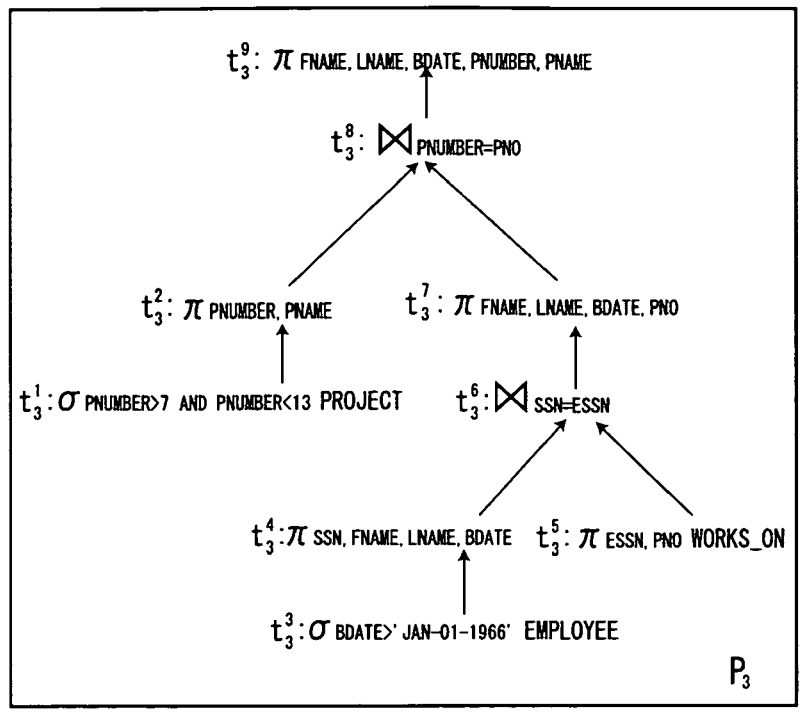
Figure 2:
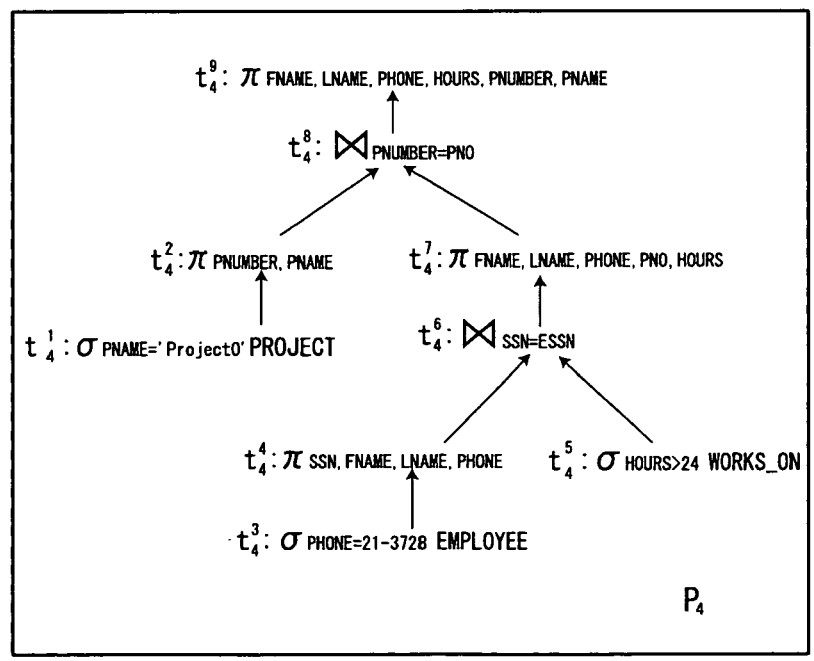
Figure 4:
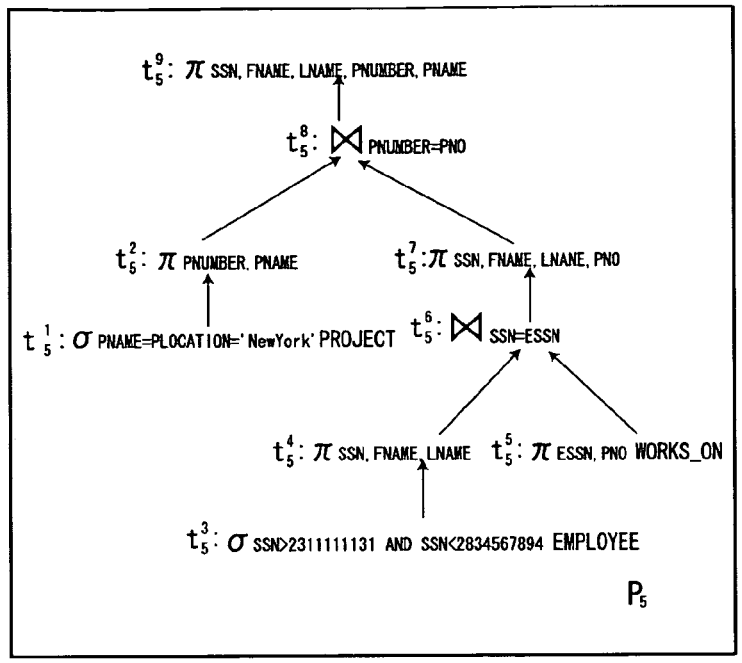
Figure 3:
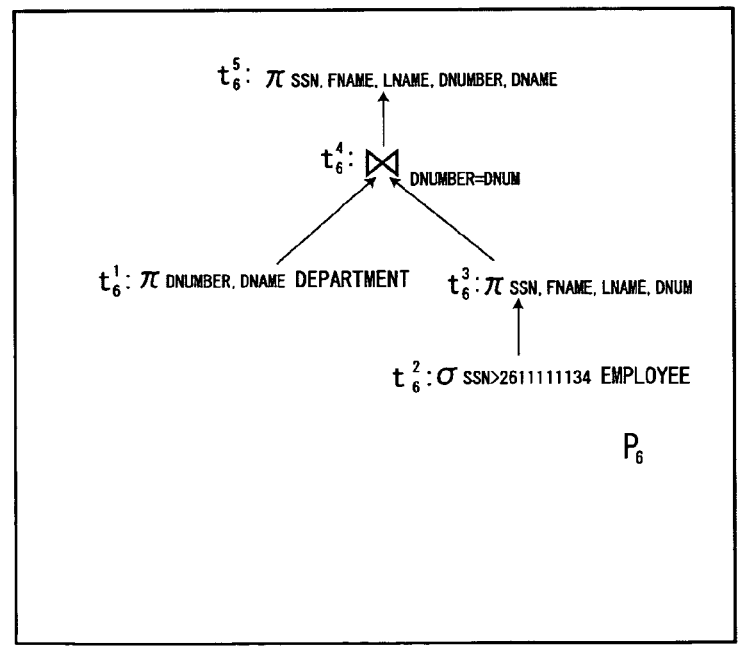

In this section, the multi-operation processing utilizing a synthetic relational operation described in the above is explained in detail by using the following queries $Q_1$~$Q_6$ as examples for the database consisting the data structures shown in FIG. 3-1~3-4.

[2-1. Relations and Processing Queries]

[(a) Examples of Relations]

FIG. 3-1~3-4 show a database that consists of the relations EMPLOYEE, DEPARTMENT, PROJECT, and WORKS_ON.

In FIG. 3-1, the relation EMPLOYEE contains 20 records stored in 5 blocks, and each block contains 4 records and has a block pointer to a next block. The relation EMPLOYEE (101) contains a primary index (100) for the attribute SSN, and has an index pointer to every block in the relation EMPLOYEE. The relation EMPLOYEE also has a secondary index (102) for the attribute PHONE, and the secondary index has an index pointer to every record in the relation EMPLOYEE.

In FIG. 3-2, the relation DEPARTMENT contains 25 records stored in 5 blocks, and each block contains 5 records and has a block pointer to a next block. The relation DEPARTMENT (104) contains a primary index (103) for the primary attribute DNUMBER in the relation DEPARTMENT, and has an index pointer to each block in the relation DEPARTMENT. The relation DEPARTMENT also has a secondary index (105) for the attribute DPHONE, and the secondary index has a pointer to every record in the relation DEPARTMENT.

In FIG. 3-3, the relation PROJECT (202) contains 25 records stored in 5 blocks, and each block contains 5 records and has a block pointer to a next block. The relation PROJECT contains a primary index (201) for the primary attribute PNUMBER, and has an index pointer to each block in the relation PROJECT. The relation PROJECT also has a secondary index (203) for the secondary attribute PNAME, and the secondary index has an index pointer to every record in the relation PROJECT.

In FIG. 3-4, the relation WORKS_ON contains 25 records stored in 5 blocks, and each block contains 5 records and has a block pointer to a next block. The primary attribute ESSN, PNO of the relation WORKS_ON are foreign keys to the relation EMPLOYEE and PROJECT.

By summarizing the above explanations, the following table is obtained.

TABLE 1

| Relation name | Number of records | Number of blocks | Primary index | Secondary Index |
| --- | --- | --- | --- | --- |
| EMPLOYEE | 20 | 5 | SSN | PHONE |
| DEPARTMENT | 25 | 5 | DNUMBER | DPHONE |
| PROJECT | 25 | 5 | PNUMBER | PNAME |
| WORKS_ON | 25 | 5 | None | None |

Next, in order to explain the multi-operation processing utilizing a synthetic relational operation based on the database shown in FIG. 3-1~3-4, the following 6 queries $Q_1$, $Q_2$, $Q_3$, $Q_4$, $Q_5$, $Q_6$ are used as a example.

($Q_1$) SELECT FNAME, LNAME, BDATE, PNUMBER, PNAME
  FROM EMPLOYEE, WORKS_ON, PROJECT
  WHERE PROJECT.PNUMBER>2 AND PROJECT.PNUMBER<11 AND EMPLOYEE.BDATE>'DEC-01-1951' AND EMPLOYEE.BDATE<'DEC-31-1959' AND PROJECT.PNUMBER=WORKS_ON.PNO AND EMPLOYEE.SSN=WORKS_ON.ESSN;

($Q_2$) SELECT FNAME, LNAME, BDATE, PNUMBER, PNAME
  FROM EMPLOYEE, WORKS_ON, PROJECT
  WHERE PROJECT.PNUMBER>10 AND PROJECT.PNUMBER<18 AND EMPLOYEE.BDATE>'JAN-01-1961' AND EMPLOYEE.BDATE<'DEC-31-1966' AND
  PROJECT.PNUMBER=WORKS_ON.PNO AND EMPLOYEE.SSN=WORKS_ON.ESSN;

($Q_3$) SELECT FNAME, LNAME, BDATE, PNUMBER, PNAME
  FROM EMPLOYEE, WORKS_ON, PROJECT
  WHERE PROJECT.PNUMBER>7 AND PROJECT.PNUMBER<13 AND EMPLOYEE.BDATE>'JAN-01-1966' AND PROJECT.PNUMBER=WORKS_ON.PNO AND EMPLOYEE.SSN=WORKS_ON.ESSN;

($Q_4$) SELECT FNAME, LNAME, PHONE, HOURS, PNUMBER, PNAME
  FROM EMPLOYEE, WORKS_ON, PROJECT
  WHERE EMPLOYEE.PHONE=21-3728 AND PROJECT.PNAME='ProjectO' AND WORKS_ON.HOURS>24 AND PROJECT.PNUMBER=WORKS_ON.PNO AND EMPLOYEE.SSN=WORKS_ON.ESSN;

($Q_5$) SELECT SSN, FNAME, LNAME, PNUMBER, PNAME
  FROM EMPLOYEE, WORKS_ON, PROJECT
  WHERE EMPLOYEE.SSN>2311111131 AND EMPLOYEE.SSN<2834567894 AND PROJECT.PLOCATION='New York' AND PROJECT.PNUMBER=WORKS_ON.PNO AND EMPLOYEE.SSN=WORKS_ON.ESSN;

($Q_6$) SELECT SSN, FNAME, LNAME, DNUMBER, DNAME
  FROM EMPLOYEE, DEPARTMENT
  WHERE EMPLOYEE.SSN>2611111134 AND DEPARTMENT.DNUMBER=EMPLOYEE.DNUM;

[2-2. Creating Processing Plans]

The query processor performs query optimizations for the queries Q1, Q2, Q3, Q4, Q5, Q6, and creates the following processing plans as the best methods to process these queries. Then the following processing plans $P_i$(i=1, 2, . . . , 6) are created for the queries $Q_i$(i=1, 2, . . . , 6). These processing plans $P_1 \sim P_6$ are represented as query trees in FIG. 4-1~4.3.

A task $t_i^j$ (i is a query tree number, j is a processing number in a query tree) in a query tree $P_i$ is represented as follows.

($t_i^j$): Processing result←Relational algebra

Processing result means a result of processing a relational algebra: when the name of Processing Result is TEMP_Tj_i, it means a processing result of a task in a query; when the name of Processing Result is RESULT_Qi, it means a processing result of a query.

The relational algebra is a collection of operations that are used to manipulate the relations in the database, and these operations are such as select operation ($\sigma$), project operation ($\Pi$), joins operation (|X|), etc.

Processing plan $P_1$ ($t_1^1$): TEMP_T1_1 ← $\sigma_{PNUMBER > 2\ and\ PNUMBER < 11}$ PROJECT
($t_1^2$): TEMP_T2_1 ← $\Pi_{PNUMBER,PNAME}$ TEMP_T1_1
($t_1^3$): TEMP_T3_1 ← $\sigma_{BDATE>'DEC-01-1951'\ AND\ BDATE<'DEC-31-1959'}$ EMPLOYEE
($t_1^4$): TEMP_T4_1 ← $\Pi_{SSN,\ FNAME,LNAME,BDATE}$ TEMP_T3_1
($t_1^5$): TEMP_T5_1 ← $\Pi_{ESSN,PNO}$ WORKS_ON
($t_1^6$): TEMP_T6_1 ← TEMP_T4_1|X|$_{SSN\ =\ ESSN}$TEMP_T5_1
($t_1^7$): TEMP_T7_1 ← $\Pi_{FNAME,LNAME,BDATE,PNO}$TEMP_T6_1
($t_1^8$): TEMP_T8_1 ← TEMP_T2_1|X|$_{PNUMBER=PNO}$TEMP_T7_1
($t_1^9$): RESULT_Q1 ← $\Pi_{FNAME,LNAME,BDATE,PNUMBER,PNAME}$ TEMP_T8_1

Processing plan $P_2$ ($t_2^1$): TEMP_T1_2 ← $\sigma_{PNUMBER > 10\ AND\ PNUMBER < 18}$ PROJECT
($t_2^2$): TEMP_T2_2 ← $\Pi_{PNUMBER,PNAME}$ TEMP_T1_2
($t_2^3$): TEMP_T3_2 ← $\sigma_{BDATE > 'JAN-01-1961'\ AND\ BDATE < 'DEC-31-1966'}$ EMPLOYEE
($t_2^4$): TEMP_T4_2 ← $\Pi_{SSN,\ FNAME,\ LNAME,\ BDATE}$ TEMP_T3_2
($t_2^5$): TEMP_T5_2 ← $\Pi_{ESSN,PNO}$ WORKS_ON
($t_2^6$): TEMP_T6_2 ← TEMP_T4_2|X|$_{SSN=ESSN}$ TEMP_T5_2
($t_2^7$): TEMP_T7_2 ← $\Pi_{FNAME,LNAME,BDATE,PNO}$TEMP_T6_2
($t_2^8$): TEMP_T8_2 ← TEMP_T2_2|X|$_{PNUMBER=\ PNO}$TEMP_T7_2
($t_2^9$): RESULT_Q2 ← $\Pi_{FNAME,LNAME,BDATE,PNUMBER,PNAME}$ TEMP_T8_2

Processing plan $P_3$ ($t_3^1$): TEMP_T1_3 ← $\sigma_{PNUMBER > 7\ AND\ PNUMBER < 13}$ PROJECT
($t_3^2$): TEMP_T2_3 ← $\Pi_{PNUMBER,PNAME}$ TEMP_T1_3
($t_3^3$): TEMP_T3_3 ← $\sigma_{BDATE > 'JAN-01-1966'}$ EMPLOYEE
($t_3^4$): TEMP_T4_3 ← $\Pi_{SSN,\ FNAME,\ LNAME,\ BDATE}$ TEMP_T3_3
($t_3^5$): TEMP_T5_3 ← $\Pi_{ESSN,PNO}$ WORKS_ON
($t_3^6$): TEMP_T6_3 ← TEMP_T4_3 |X|$_{SSN\ =\ ESSN}$TEMP_T5_3
($t_3^7$): TEMP_T7_3 ← $\Pi_{FNAME,LNAME,BDATE,\ PNO}$TEMP_T6_3
($t_3^8$): TEMP_T8_3 ← TEMP_T2_3 |X|$_{PNUMBER=PNO}$TEMP_T7_3
($t_3^9$): RESULT_Q3 ← $\Pi_{FNAME,LNAME,BDATE,PNUMBER,PNAME}$ TEMP_T8_3

Processing plan $P_4$ ($t_4^1$): TEMP_T1_4 ← $\sigma_{PNAME\ -\ 'ProjectO'}$ PROJECT
($t_4^2$): TEMP_T2_4 ← $\Pi_{PNUMBER,PNAME}$ TEMP_T1_4
($t_4^3$): TEMP_T3_4 ← $\sigma_{PHONE\ =\ 21-3728}$ EMPLOYEE
($t_4^4$): TEMP_T4_4 ← $\Pi_{SSN,FNAME,LNAME,\ PHONE}$TEMP_T3_4
($t_4^5$): TEMP_T5_4 ← $\sigma_{HOURS > 24}$ WORKS_ON
($t_4^6$): TEMP_T6_4 ← TEMP_T4_4|X|$_{SSN\ =\ ESSN}$TEMP_T5_4
($t_4^7$): TEMP_T7_4 ← $\Pi_{FNAME,LNAME,PHONE,\ PNO,HOURS}$TEMP_T6_4
($t_4^8$): TEMP_T8_4 ← TEMP_T2_4|X|$_{PNUMBER\ =\ PNO}$TEMP_T7_4
($t_4^9$): RESULT_Q4 ← $\Pi_{FNAME,LNAME,PHONE,HOURS,PNUMBER,PNAME}$ TEMP_T8_4

Processing plan $P_5$ ($t_5^1$): TEMP_T1_5 ← $\sigma_{PLOCATION-\ 'New\ York'}$ PROJECT
($t_5^2$): TEMP_T2_5 ← $\Pi_{PNUMBER,\ PNAME}$TEMP_T1_5
($t_5^3$): TEMP_T3_5 ← $\sigma_{SSN > 2311111131\ AND\ SSN < 2834567894}$EMPLOYEE
($t_5^4$): TEMP_T4_5 ← $\Pi_{SSN,FNAME,LNAME}$ TEMP_T3_5
($t_5^5$): TEMP_T5_5 ← $\Pi_{ESSN,PNO}$ WORKS_ON
($t_5^6$): TEMP_T6_5 ← TEMP_T4_5|X|$_{SSN\ =\ ESSN}$TEMP_T5_5
($t_5^7$): TEMP_T7_5 ← $\Pi_{SSN,FNAME,LNAME,\ PNO}$TEMP_T6_5
($t_5^8$): TEMP_T8_5 ← TEMP_T2_5|X|$_{PNUMBER=PNO}$TEMP_T7_5
($t_5^9$): RESULT_Q5 ← $\Pi_{SSN,FNAME,LNAME,PNUMBER,PNAME}$TEMP_T8_5

Processing plan $P_6$ ($t_6^1$): TEMP_T1_6 ← $\Pi_{DNUMBER,DNAME}$DEPARTMENT
($t_6^2$): TEMP_T2_6 ← $\sigma_{SSN > 2611111134}$EMPLOYEE
($t_6^3$): TEMP_T3_6 ← $\Pi_{SSN,FNAME,LNAME,DNUM}$ TEMP_T2_6
($t_6^4$): TEMP_T4_6 ← TEMP_T1_6|X|$_{DNUMBER=DNUM}$TEMP_T3_6
($t_6^5$): RESULT_Q6 ← $\Pi_{SSN,FNAME,LNAME,DNUMBER,DNAME}$TEMP_T4_6

[2.3 Grouping Tasks and Sub-Grouping Tasks]
[(a) Retrieving Tasks that Combined Relational Operations]

In FIG. 4-1~4-3, the processing plans $P_1, P_2, P_3, P_4, P_5, P_6$ that are created are represented as query trees. First, by using the improved method 1, which is the method of retrieving tasks that combined relational operations, the query processor retrieves the tasks from the query trees.

The query processor retrieves the tasks $t_1^1, t_1^3, t_1^5, t_2^1, t_2^3, t_2^5, t_3^1, t_3^3, t_3^5, t_4^1, t_4^3, t_4^5, t_5^1, t_5^3, t_5^5, t_6^1, t_6^2$ of the select operation, which are not dependent from other tasks and can be processed directly in the order of topological sort, from the query trees created from the processing plans $P_1, P_2, P_3, P_4, P_5, P_6$.

After finding these tasks of the selection operations that can be processed directly, the query processor checks if the next tasks performing operations on the processing results of these tasks are project operations. As a result, the task $t_1^2$ performing operations on the processing result TEMP_T1_1 of the task $t_1^1$, is a project operation.

Likewise, the following tasks are project operations: the task $t_1^4$ performing operations on the processing result of the task $t_1^3$; the task $t_2^2$ performing operations on the processing result of the task $t_2^1$; the task $t_2^4$ performing operations on the processing result of the task $t_2^3$; the task $t_3^2$ performing operations on the processing result of the task $t_3^1$; the task $t_3^4$ performing operations on the processing result of the task $t_3^3$; the task $t_4^2$ performing operations on the processing result of the task $t_4^1$; the task $t_4^4$ performing operations on the processing result of the task $t_4^3$; the task $t_5^2$ performing operations on the processing result of the task $t_5^1$; the task $t_5^4$ performing operations on the processing result of the task $t_5^3$; and the task $t_6^3$ performing operations on the processing result of the task $t_6^2$.

Next, in order to create tasks that combined a select operation ($\sigma$) and a project operation ($\Pi$), the query processor combines the task $t_1^1$ (select operation) to the task $t_1^2$ (project operation) to create the task $t_1^{2'}$.

Likewise, the task $t_1^3$ is combined to the task $t_1^4$ to create the task $t_1^{4'}$, the task $t_2^1$ is combined to the task $t_2^2$ to create the task $t_2^{2'}$, the task $t_2^3$ is combined to the task $t_2^4$ to create the task $t_2^{4'}$, the task $t_3^1$ is combined to the task $t_3^2$ to create the task $t_3^{2'}$, the task $t_3^3$ is combined to the task $t_3^4$ to create the task $t_3^{4'}$, the task $t_4^1$ is combined to the task $t_4^2$ to create the task $t_4^{2'}$, the task $t_4^3$ is combined to the task $t_4^4$ to create the task $t_4^{4'}$, the task $t_5^1$ is combined to the task $t_5^2$ to create the task $t_5^{2'}$, the task $t_5^3$ is combined to the task $t_5^4$ to create the task $t_5^{4'}$, and the task $t_6^2$ is combined to the task $t_6^3$ to create the task $t_6^{3'}$.

Summarizing the above, the query processor retrieves the tasks of the selection operation and the tasks of the project operation simultaneously as the tasks that combined relational operations, and creates the tasks that combined the select operation and the project operation as follows.

$(t_1^{2'})$: TEMP_T2_1 ← $\pi_{PNUMBER,PNAME}(\sigma_{PNUMBER > 2 \text{ AND } PNUMBER < 11}$ PROJECT)
$(t_1^{4'})$: TEMP_T4_1 ← $\pi_{SSN, FNAME, LNAME, BDATE}(\sigma_{BDATE > \text{'DEC-01-1951' AND } BDATE < \text{'DEC-31-1959'}}$ EMPLOYEE)
$(t_2^{2'})$: TEMP_T2_2 ← $\pi_{PNUMBER,PNAME}(\sigma_{PNUMBER > 10 \text{ AND } PNUMBER < 18}$ PROJECT)
$(t_2^{4'})$: TEMP_T4_2 ← $\pi_{SSN, FNAME, LNAME, BDATE}(\sigma_{BDATE > \text{'JAN-01-1961' AND } BDATE < \text{'DEC-31-1966'}}$ EMPLOYEE)
$(t_3^{2'})$: TEMP_T2_3 ← $\pi_{PNUMBER,PNAME}(\sigma_{PNUMBER > 7 \text{ AND } PNUMBER < 13}$ PROJECT)
$(t_3^{4'})$: TEMP_T4_3 ← $\pi_{SSN, FNAME, LNAME, BDATE}(\sigma_{BDATE > \text{'JAN-01-1966'}}$ EMPLOYEE)
$(t_4^{2'})$: TEMP_T2_4 ← $\pi_{PNUMBER,PNAME}(\sigma_{PNAME = \text{'ProjectO'}}$ PROJECT)
$(t_4^{4'})$: TEMP_T4_4 ← $\pi_{SSN,FNAME,LNAME,PHONE}(\sigma_{PHONE = 21\text{-}3728}$ EMPLOYEE)
$(t_5^{2'})$: TEMP_T2_5 ← $\pi_{PNUMBER, PNAME}(\sigma_{PLOCATION= \text{'New York'}}$ PROJECT)
$(t_5^{4'})$: TEMP_T4_5 ← $\pi_{SSN,FNAME,LNAME}(\sigma_{SSN > 2311111131 \text{ AND } SSN < 2834567894}$ EMPLOYEE)
$(t_6^{3'})$: TEMP_T3_6 ← $\pi_{SSN,FNAME,LNAME,DNUM}(\sigma_{SSN > 2611111134}$ EMPLOYEE)

Then, the tasks $t_1^{2'}, t_1^{4'}, t_2^{2'}, t_2^{4'}, t_3^{2'}, t_3^{4'}, t_4^{2'}, t_4^{4'}, t_5^{2'}, t_5^{4'}, t_6^{3'}$ that combined relational operations, and the tasks $t_1^5, t_2^5, t_3^5, t_4^5, t_5^5, t_6^1$ that can be processed directly, are collected into the groups G1~G4 based on a relation of the database that each task accesses.

| | |
|---|---|
| EMPLOYEE: | group G1 = $\{t_1^{4'}, t_2^{4'}, t_3^{4'}, t_4^{4'}, t_5^{4'}, t_6^{3'}\}$ |
| PROJECT: | group G2 = $\{t_1^{2'}, t_2^{2'}, t_3^{2'}, t_4^{2'}, t_5^{2'}\}$ |
| WORKS_ON: | group G3 = $\{t_1^5, t_2^5, t_3^5, t_4^5, t_5^5\}$ |
| DEPARTMENT: | group G4 = $\{t_6^1\}$ |

The tasks accessing the relation EMPLOYEE are collected into the group G1, the tasks accessing the relation PROJECT are collected into the group G2, the tasks accessing the relation WORKS_ON are collected into the group G3, and the tasks accessing the relation DEPARTMENT are collected into the group G4.

[(b) Sub-Grouping Tasks that Combined Relational Operations]

Then, the tasks that are collected into the groups are further collected into the sub-groups based on the common sub-expression as follows.

| | |
|---|---|
| EMPLOYEE: | group G1 = $\{SG1_{G1}, SG2_{G1}, t_4^{4'}\}$ |
| | sub-group $SG1_{G1} = \{t_1^{4'}, t_2^{4'}, t_3^{4'}\}$ |
| | sub-group $SG2_{G1} = \{t_5^{4'}, t_6^{3'}\}$ |
| PROJECT: | group G2 = $\{SG1_{G2}, t_4^{2'}, t_5^{2'}\}$ |
| | sub-roup $SG1_{G2} = \{t_1^{2'}, t_2^{2'}, t_3^{2'}\}$ |
| WORKS_ON: | group G3 = $\{SG1_{G3}, t_4^5\}$ |
| | sub-group $SG1_{G3} = \{t_1^5, t_2^5, t_3^5, t_5^5\}$ |
| DEPARTMENT: | group G4 = $\{t_6^1\}$ |

$SG1_{G1}$ is a sub-group for the tasks performing a select operation on the relation EMPLOYEE using the attribute BDATE in their select condition.

$SG2_{G1}$ is a sub-group for the tasks performing a select operation on the relation EMPLOYEE using the attribute SSN in their select condition.

$SG1_{G2}$ is a sub-group for the tasks performing a select operation on the relation PROJECT using the attribute PNUMBER in their select condition.

$SG1_{G3}$ is a sub-group for the tasks performing a project operation on the relation WORKS_ON.

Figure 5:
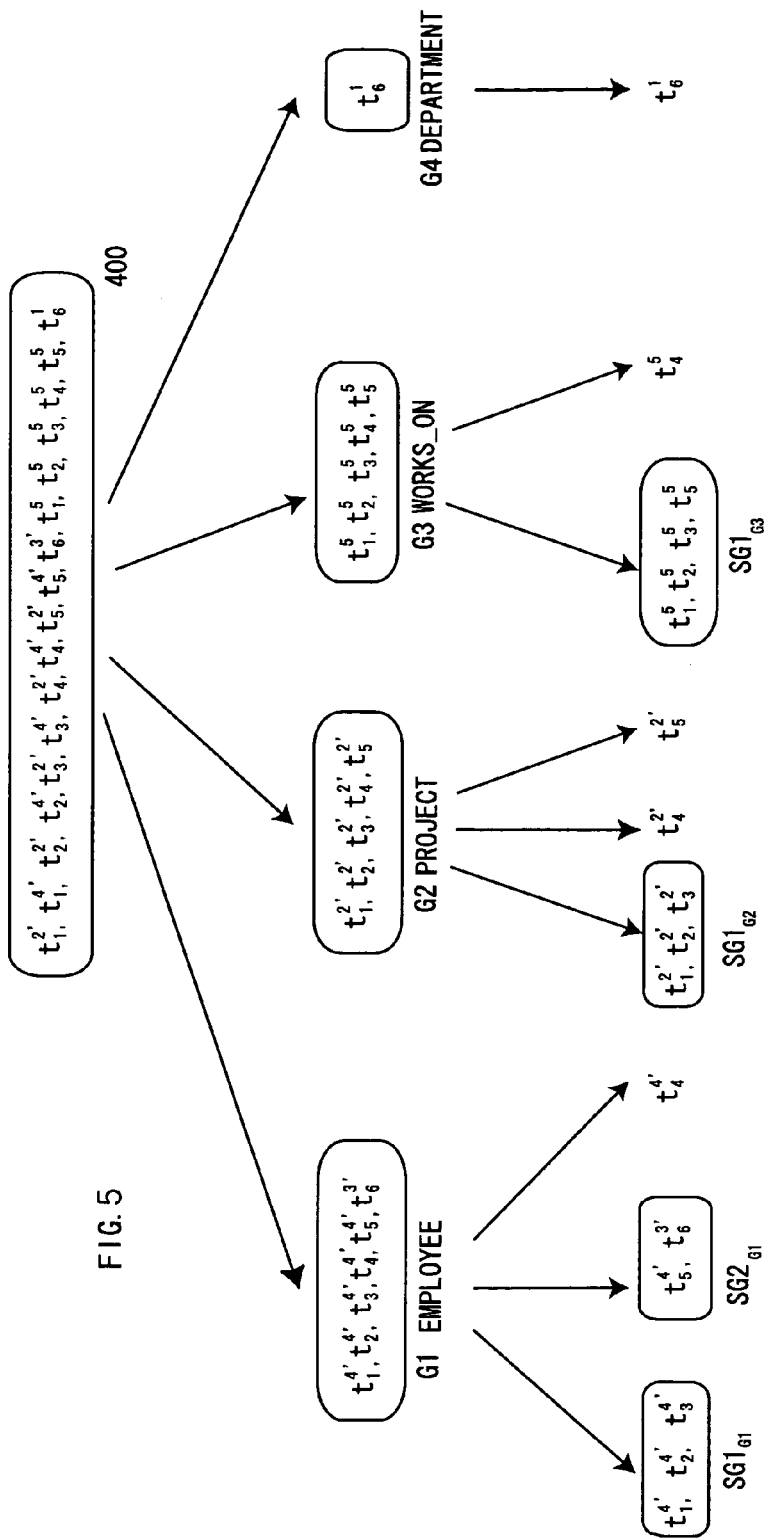
FIG. 5 is a diagram showing the grouping of the tasks.

As shown in FIG. 5, the tasks that combined a select operation and a project operation, and the tasks that can be processed directly are collected into the group G1~G4, then these tasks are further collected into the sub-groups.

[(c) Creating Tasks that Combined Synthetic Relational Operations]

After the sub-groups are created in the groups, the query processor creates the tasks $t_{G1}^{SG1}$, $t_{G1}^{SG2}$, $t_{G2}^{SG1}$ that combined synthetic relational operations for the sub-groups $SG1_{G1}, SG2_{G1}, SG1_{G2}$, and create the task $t_{G3}^{SG1}$ of synthetic project operation for the sub-group $SG1_{G3}$ by using the following procedure (corresponds to the method of creating a task that combined a synthetic select operation and a synthetic project operation as shown in the step 2 (b-2)) as follows.

Second, it creates the optimized select condition of the synthetic select operation by optimizing the conjunctive select condition as Optimize(<temp_cond>) to remove any overlapped selections from the conjunctive select condition as follows.

$$\text{Optimize}(<temp\_cond>)=SSN>2311111131$$

Third, the query processor obtains the union of all attributes used in the project operations of the tasks $t_5^{4'}, t_6^{3'}$ to create the synthetic project operation as follows.

$$\Pi_{SSN, FNAME, LNAME, DNUM}(\ldots)$$

Finally, the query processor combines the synthetic select operation and the synthetic project operation to create the task $t_{G1}^{SG2}$ as above.

---

$(t_{G1}^{SG1})$: TEMP_SG1_G1 ← $\pi_{SSN,FNAME,LNAME,BDATE}$ ($\sigma_{(BDATE>'DEC-01-1951' AND BDATE < 'DEC-31-1959') OR (BDATE > 'JAN-01-1961')}$EMPLOYEE)
$(t_{G1}^{SG2})$: TEMP_SG2_G1 ← $\pi_{SSN,FNAME,LNAME,DNUM}(\sigma_{SSN > 2311111131}$EMPLOYEE)
$(t_{G2}^{SG1})$: TEMP_SG1_G2 ← $\pi_{PNUMBER, PNAME}(\sigma_{PNUMBER > 2 AND PNUMBER < 18}$PROJECT)
$(t_{G3}^{SG1})$: $\pi_{ESSN,PNO}$ WORKS_ON

---

The task $t_{G1}^{SG1}$ is created as follows.

First, the query processor concatenates the select conditions of the select operations in the tasks $t_1^{4'}, t_2^{4'}, t_3^{4'}$ using Boolean OR to create the conjunctive select condition <temp_cond> as follows.

<temp_cond> = (BDATE>'DEC-01-1951' AND BDATE < 'DEC-31-1959') OR (BDATE > 'JAN-01-1961' AND BDATE < 'DEC-31-1966') OR (BDATE > 'JAN-01-1966')

Second, it creates the optimized select condition of the synthetic select operation by optimizing the conjunctive select condition as Optimize(<temp_cond>) to remove any overlapped selections from the conjunctive select condition as follows.

Optimize(<temp_cond>) = (BDATE>'DEC-01-1951' AND BDATE <'DEC-31-1959') OR (BDATE > 'JAN-01-1961')

Third, the query processor obtains the union of all attributes used in the project operations of these tasks $t_1^{4'}, t_2^{4'}, t_3^{4'}$ to create the synthetic project operation as follows.

$$\Pi_{SSN, FNAME, LNAME, BDATE}(\ldots)$$

Finally, the query processor combines the synthetic select operation and the synthetic project operation to create the task $t_{G1}^{SG1}$ as above.

The task $t_{G1}^{SG2}$ is created as follows.

First the query processor concatenates the select conditions of the selection operations in the tasks $t_5^{4'}, t_6^{3'}$ using Boolean OR to create the conjunctive select condition <temp_cond> as follows.

<temp_cond> = (SSN > 2311111131 AND SSN < 2834567894) OR (SSN > 2611111134)

The task $t_{G2}^{SG1}$ is created as follows.

First, the query processor concatenates the select conditions of the select operations of the tasks $t_1^{2'}, t_2^{2'}, t_3^{2'}$ using a Boolean OR to create the conjunctive select condition <temp_cond> as follows.

<temp_cond> = (PNUMBER > 2 AND PNUMBER < 11) OR (PNUMBER > 10 AND PNUMBER < 18) OR (PNUMBER > 7 AND PNUMBER < 13)

Second, the query processor creates the optimized select condition of the synthetic select operation by optimizing the conjunctive select condition as Optimize(<temp_cond>) to remove any overlapped selections from the conjunctive select condition as follows.

Optimize(<temp_cond>)=PNUMBER>2 AND PNUMBER<18

Third, the query processor obtains the union of all attributes used in the project operations of the tasks $t_1^{2'}, t_2^{2'}, t_3^{2'}$ to create the synthetic project operation as follows.

$$\Pi_{PNUMBER, PNAME}(\ldots)$$

Finally, the query processor combines the synthetic select operation and the synthetic project operation to create the task $t_{G2}^{SG1}$ as above.

The task $t_{G3}^{SG1}$ is the synthetic project operation created by obtaining the union of all attributes used in the tasks $t_1^5, t_2^5, t_3^5, t_5^5$ of the project operation as above.

After creating the task that combined synthetic relational operation for each sub-group in the groups, the query processor replaces each sub-group in the groups by the task that combined synthetic relational operations as follows.

EMPLOYEE:   Group G1 = $\{t_{G1}^{SG1}, t_{G1}^{SG2}, t_4^{4'}\}$
PROJECT:    Group G2 = $\{t_{G2}^{SG1}, t_4^{2'}, t_5^{2'}\}$
WORKS_ON:   Group G3 = $\{t_{G3}^{SG1}, t_4^5\}$
DEPARTMENT: Group G4 = $\{t_6^1\}$

[2.4 Processing Tasks in a Group Using Multi-Operation Processing]

After each sub-group in the groups are replaced by the task that combined synthetic relational operations, the query processor uses the multi-operation processor to process the groups G1~G4.

The improved method 2, the method of processing a task of a synthetic join operation, is applied for the processing of the new group G5 to be created. The improved method 3, the method of processing a task that combined synthetic relational operations is applied for the processing of the groups G1, G2, and the new group G5 to be created. The improved method 4, the method of processing multiple tasks of a join operation using multi-operation processing is applied for the processing of the new group G8 to be created. The processing of other groups is needed for the processing of these groups mentioned above.

[(a) Processing Group G1 (Processing a Group Having Tasks that Combined a Synthetic Select Operation and a Synthetic Project Operation]

Using the multi-operation processing, the multi-operation processor performs the processing of the tasks $t_{G1}^{SG1}$, $t_{G1}^{SG2}$ that combined the synthetic select operation and the synthetic project operation, and the task $t_4^{4'}$ that combined the select operation and the project operation in the group G1 simultaneously.

As described above, the group G1 has the following tasks.

EMPLOYEE: group G1 = $\{t_{G1}^{SG1}, t_{G2}^{SG2}, t_4^{4'}\}$
($t_{G1}^{SG1}$): TEMP__SG1__G1 ← $\pi_{SSN,FNAME,LNAME,BDATE}(\sigma_{(BDATE>'DEC-01-1951' AND BDATE < 'DEC-31-1959') OR (BDATE > 'JAN-01-1961')}$EMPLOYEE)
($t_{G1}^{SG2}$): TEMP__SG2__G1 ← $\pi_{SSN,FNAME,LNAME, DNUM}(\sigma_{SSN > 2311111131}$EMPLOYEE)
($t_4^{4'}$): TEMP__T4__4 ← $\pi_{SSN, FNAME, LNAME, PHONE}(\sigma_{PHONE = 21-3728}$ EMPLOYEE))

[(a-1) Creating Access Plans]

First, the multi-operation processor creates the following access plans for the tasks $t_{G1}^{SG1}$, $t_{G1}^{SG2}$ that combined the synthetic select operation and the synthetic project operation, and the task $t_4^{4'}$ that combined the select operation and the project operation.

- plan($t_{G1}^{SG1}$): Scan the relation EMPLOYEE to retrieve multiple records, and project the attributes SSN, FNAME, LNAME, BDATE from the retrieved records.
- plan($t_{G1}^{SG2}$): Use the primary index to retrieve multiple records from the relation EMPLOYEE, and project the attributes SSN,FNAME,LNAME,DNUM from the retrieved records.
- plan($t_4^{4'}$): Use the secondary index to retrieve a single record from the relation EMPLOYEE, and project the attributes SSN, FNAME, LNAME, PHONE from the retrieved record.

[(a-2) Calculating Cost of Access Plans]

After creating an access plan for each task, the multi-operation processor obtains a processing cost for each task based on the access plan. A project operation of each task is processed simultaneously with the select operation when records are accessed from disk to be selected. Therefore a separate disk access is not required for the project operation, so there is no processing cost for the project operation. The processing cost of each task is the following.

Processing cost of the task $t_{G1}^{SG1}$:
　　cost($t_{G1}^{SG1}$) = $b_E$ = 5 ($b_E$:number of blocks in the relation EMPLOYEE)
Processing cost of the task $t_{G1}^{SG2}$:
　　cost($t_{G1}^{SG2}$) = $X_{E1}$ + [$b_E$ / 2] = 3 ($x_{E1}$:levels of the primary index for the relation EMPLOYEE)
Processing cost for the task $t_4^{4'}$:
　　cost($t_4^{4'}$) = $X_{E2}$ + 1 = 2 ($x_{E2}$:levels of the secondary index for the relation EMPLOYEE)

The processing cost of the task $t_{G1}^{SG1}$ is the cost of accessing all blocks in the relation EMPLOYEE to retrieve each record in the relation EMPLOYEE, so the processing cost of the task $t_{G1}^{SG1}$ becomes $b_E$=5.

The processing cost of the task $t_{G1}^{SG2}$ is the cost of retrieving the first record in the relation EMPLOYEE by using the primary index ($x_{E1}$=1), and continuously accessing about a half of the blocks in the relation EMPLOYEE, so the processing cost of the task $t_{G1}^{SG2}$ becomes $x_{E1}$+[$b_E$/2]=1+[5/2]=4.

The processing cost of the task $t_4^{4'}$ is the cost of finding a record using the secondary index, which is the level $x_{E2}$ of the secondary index, and the cost of accessing one block in the relation EMPLOYEE. Since the level $x_{E2}$ of the secondary index is one, the processing cost of the task $t_4^{4'}$ becomes $x_{E2}$+1=2.

After calculating the processing costs as above, the multi-operation processor sorts these tasks in the group in the order from the task of smaller processing cost to the task of larger processing cost based on the processing cost of each task as follows.

$$\text{sort}(t_{G1}^{SG1}, t_{G1}^{SG2}, t_4^{4'}) \rightarrow (t_4^{4'}, t_{G1}^{SG2}, T_{G1}^{SG1})$$

sort( . . . ) means ordering tasks from the task of smaller processing cost.

For the tasks $t_4^{4'}$, $t_{G1}^{SG2}$, $t_{G1}^{SG1}$, the multi-operation processor finds the blocks that need to be accessed from the relation EMPLOYEE shown in FIG. 3-1 using the indices of the relation EMPLOYEE, and collects them into the block sets $B_4^{4'}$, $B_{G1}^{SG2}$, $B_{G1}^{SG1}$ as follows.

Block set for the task $t_4^{4'}$:　　$B_4^{4'}$ = $\{b_2\}$
Block set for the task $t_{G1}^{SG2}$:　　$B_{G1}^{SG2}$ = $\{b_4, b_5\}$
Block set for the task $t_{G1}^{SG1}$:　　$B_{G1}^{SG1}$ = $\{b_1, b_2, b_3, b_4, b_5\}$ The reason for being able to find these block sets $B_4^{4'}$, $B_{G1}^{SG2}$, $B_{G1}^{SG1}$ for the tasks $t_4^{4'}$, $t_{G1}^{SG2}$, $t_{G1}^{SG1}$ are the followings:

The task $t_4^{4'}$ needs a record satisfying the select condition "PHONE=21-3728".

Using the secondary index (102) of the relation EMPLOYEE, the record having a value of 21-3728 for the attribute PHONE is stored in the block $b_2$ of relative address 256, so only the block $b_2$ is needed to be accessed. Therefore a set containing the block that need to be accessed for the processing of the task $t_4^{4'}$ becomes $\{b_2\}$.

The task $t_{G1}^{SG2}$ needs records satisfying the select condition "SSN>231111131".

Using the primary index (100) of the relation EMPLOYEE, the records having a value greater than 231111131 for the attribute SSN are stored from the block $b_4$ of relative address of 768, so the blocks from the block $b_4$ to the last block $b_5$ are needed to be accessed. Therefore a set containing the blocks that need to be accessed for the processing of the task $t_{G1}^{SG2}$ becomes $\{b_4, b_5\}$.

The task $t_{G1}^{SG1}$ needs records satisfying the select condition

"(BDATE<'DEC-01-1951' AND BDATE<'DEC-31-1959') OR (BDATE>'JAN-01-1961')".

Since the relation EMPLOYEE does not have any index for the attribute BDATE, all blocks in the relation EMPLOYEE, from the first block $b_1$ to the last block $b_5$, are needed to be accessed to search the records from the relation EMPLOYEE linearly. Therefore a set containing the blocks that need to be accessed for the processing of the task $t_{G1}^{SG1}$ becomes $\{b_1, b_2, b_3, b_4, b_5\}$.

After finding all blocks that need to be accessed for each task, the union of the block sets is obtained based on the sorted order of the tasks as follows (the union of the block sets is obtained in the order of $B_4^{4'}, B_{G1}^{SG2}, B_{G1}^{SG1}$).

$TB_0 = \emptyset$ (empty set)

The union of the set $TB_0$ and the block set $B_4^{4'}$ corresponding to the task $t_4^{4'}$:

$TB_4^{4'} = TB_0 \cup B_4^{4'} = \{b_2\}$

The union of the set $TB_4^{4'}$ and the block set $B_{G1}^{SG2}$ corresponding to the task $t_{G1}^{SG2}$:

$TB_{G1}^{SG2} = TB_4^{4'} \cup B_{G1}^{SG2} = \{b_2, b_4, b_5\}$

The union of the set $TB_{G1}^{SG2}$ and the block set $B_{G1}^{SG1}$ corresponding to the task $t_{G1}^{SG1}$:

$TB_{G1}^{SG1} = TB_{G1}^{SG2} \cup B_{G1}^{SG1} = \{b_2, b_4, b_5, b_1, b_3\}$

As above, by finding the union of the block sets, the block access order to the relation EMPLOYEE is determined as ($b_2$, $b_4$, $b_5$, $b_1$, $b_3$) from the result of $TB_{G1}^{SG1}$. Using this method to obtain the union of the block sets is to determine the block access order in the relation EMPLOYEE for processing the tasks in the group in the order from the task of smaller processing cost to the task of larger processing cost.

Since the blocks $b_2$, $b_4$, $b_5$, $b_1$, $b_3$ obtained in this method are shared by the processing of the tasks $t_4^{4'}, t_{G1}^{SG2}, t_{G1}^{SG1}$ in this order, these blocks are called common blocks.

By looking at the blocks in the block sets $B_4^{4'}, B_{G1}^{SG2}, B_{G1}^{SG1}$ based on the block access order, the block $b_2$ is used for the processing of the tasks $t_4^{4'}, t_{G1}^{SG1}$, the blocks $b_4, b_5$ are used for the processing of the tasks $t_{G1}^{SG1}, t_{G1}^{SG2}$, and the blocks $b_1, b_3$ are used for the processing of the task $t_{G1}^{SG1}$. By summarizing the above explanations, the following table is obtained.

TABLE 2

| Common block | processing of tasks at common block | finishing task |
|---|---|---|
| $B_2$ | $t_4^{4'}, t_{G1}^{SG1}$ | $t_4^{4'}$ |
| $B_4$ | $t_{G1}^{SG2}, t_{G1}^{SG1}$ | |
| $B_5$ | $t_{G1}^{SG2}, t_{G1}^{SG1}$ | $t_{G1}^{SG2}$ |
| $B_1$ | $t_{G1}^{SG1}$ | |
| $B_3$ | $t_{G1}^{SG1}$ | $t_{G1}^{SG1}$ |

[(a-3) Processing of Tasks at Common Block]

As shown in the table above, in order to find which tasks to be processed at each common block, the following steps can be used based on the information of the block sets $B_4^{4'}$, $B_{G1}^{SG2}, B_{G1}^{SG1}$ created for the tasks $t_4^{4'}, t_{G1}^{SG2}, t_{G1}^{SG1}$.

First, the multi-operation processor accesses the block $b_2$ from disk, and reads the data of the block $b_2$ into main memory. In order to check if the tasks $t_4^{4'}, t_{G1}^{SG2}, t_{G1}^{SG1}$ need to be processed at the block $b_2$, the block $b_2$ is represented as a set $\{b_2\}$, and the intersections for the block sets $B_4^{4'}$, $B_{G1}^{SG2}, B_{G1}^{SG1}$ with the set $\{b_2\}$ are obtained as follows.

| | |
|---|---|
| For the task $t_4^{4'}$: | $B_4^{4'} \cap \{b_2\} = \{b_2\}$ |
| For the task $t_{G1}^{SG2}$: | $B_{G1}^{SG2} \cap \{b_2\} = \{\}$ |
| For the task $t_{G1}^{SG1}$: | $B_{G1}^{SG1} \cap \{b_2\} = \{b_2\}$ |

The intersections for the tasks $t_4^{4'}, t_{G1}^{SG1}$, excluding the task $t_{G1}^{SG2}$, becomes $\{b_2\}$. Therefore the block $b_2$ becomes a common block and the tasks $t_4^{4'}, t_{G1}^{SG1}$ are processed at the common block $b_2$ being read into main memory.

After processing these tasks at the common block $b_2$, the block $b_2$ is no longer needed to be accessed again, so the differences for the block sets $B_4^{4'}, B_{G1}^{SG1}$ are obtained with the set $\{b_2\}$ are obtained as follows. Then the obtained differences are represented as the block sets $B_4^{4'(1)}, B_{G1}^{SG1(1)}$ as follows.

| | |
|---|---|
| For the task $t_4^{4'}$: | $B_4^{4'} - \{b_2\} = \{\} = B_4^{4'(1)}$ |
| For the task $t_{G1}^{SG1}$: | $B_{G1}^{SG1} - \{b_2\} = \{b_1, b_3, b_4, b_5\} = B_{G1}^{SG1(1)}$ |

As a result, the block set $B_4^{4'(1)}$ becomes an empty set $\emptyset$, and the processing of the task $t_4^{4'}$ finishes.

Next, the multi-operation processor accesses the block $b_4$ from disk, and reads the data of the block $b_4$ into main memory. In order to check if the tasks $t_{G1}^{SG2}, t_{G1}^{SG1}$ in the group, excluding the task $t_4^{4'}$ that already finished processing, need to be processed at the block $b_4$, the block $b_4$ is represented as the set $\{b_4\}$ and the intersections for the block sets $B_{G1}^{SG2}, B_{G1}^{SG1}$ with the set $\{b_4\}$ are obtained as follows.

| | |
|---|---|
| For the task $t_{G1}^{SG2}$: | $B_{G1}^{SG2} \cap \{b_4\} = \{b_4\}$ |
| For the task $t_{G1}^{SG1}$: | $B_{G1}^{SG1(1)} \cap \{b_4\} = \{b_4\}$ |

The intersections for the tasks $t_{G1}^{SG2}, t_{G1}^{SG1}$ become $\{b_4\}$. Therefore the tasks $t_{G1}^{SG2}, t_{G2}^{SG1}$ need to be processed at the block $b_4$ being read into main memory.

After processing these tasks at the common block $b_4$, the block $b_4$ is no longer needed to be accessed again, so the differences for the block sets $B_{G1}^{SG2}, B_{G1}^{SG1(1)}$ with the set $\{b_4\}$ are obtained. Then the obtained differences are represented as the block sets $B_{G1}^{SG2(1)}, B_{G1}^{SG1(2)}$ as follows.

| | |
|---|---|
| For the task $t_{G1}^{SG2}$: | $B_{G1}^{SG2} - \{b_4\} = \{b_5\} = B_{G1}^{SG2(1)}$ |
| For the task $t_{G1}^{SG1}$: | $B_{G1}^{SG1(1)} - \{b_4\} = \{b_1, b_3, b_5\} = B_{G1}^{SG1(2)}$ |

Next, the multi-operation processor accesses the block $b_5$ from disk, and read the data of the block $b_5$ into main memory. In order to check if the tasks $t_{G1}^{SG2}, t_{G1}^{SG1}$ in the group, excluding the task $t_4^{2'}$ that already finished processing, need to be processed at the block $b_5$, the block $b_5$ is represented as a set $\{b_5\}$, and the intersections for the block sets $B_{G2}^{SG1(1)}$, $B_{G1}^{SG1(2)}$ with the set $\{b_5\}$ are obtained as follows.

| | |
|---|---|
| For the task $t_{G1}^{SG2}$: | $B_{G1}^{SG2(1)} \cap \{b_5\} = \{b_5\}$ |
| For the task $t_{G1}^{SG1}$: | $B_{G1}^{SG1(2)} \cap \{b_5\} = \{b_5\}$ |

The intersections for the tasks $t_{G1}^{SG2}$, $t_{G2}^{SG1}$ becomes $\{b_5\}$. Therefore the tasks $t_{G1}^{SG2}$, $t_{G2}^{SG1}$ are processed at the common block $b_5$ being read into main memory.

After processing these tasks at the common block $b_5$, the block $b_5$ is no longer needed to be accessed again, so the differences for the block sets $B_{G1}^{SG2(1)}$, $B_{G1}^{SG1(2)}$ with the set $\{b_5\}$ are obtained, and the obtained differences are represented as the block sets as $B_{G1}^{SG2(2)}$, $B_{G1}^{SG1(3)}$ as follows.

| | |
|---|---|
| For the task $t_{G1}^{SG2}$: | $B_{G1}^{SG2(1)} - \{b_5\} = \{\ \} = B_{G1}^{SG2\ (2)}$ |
| For the task $t_{G1}^{SG1}$: | $B_{G1}^{SG1(2)} - \{b_5\} = \{b_1, b_3\} = B_{G1}^{SG1(3)}$ |

As a result, the block set $B_{G1}^{SG2(2)}$ becomes an empty set, and the processing of the task $t_{G1}^{SG2}$ finishes. At this stage, the only remaining task in the group is the task $t_{G1}^{SG1}$, so the multi-operation processor accesses the rest of the blocks $b_1$, $b_3$ from the relation EMPLOYEE, and performs the processing of the task $t_{G1}^{SG1}$. After processing the task $t_{G1}^{SG1}$, the processing of all tasks in the group G1 finishes.

Figure 6:
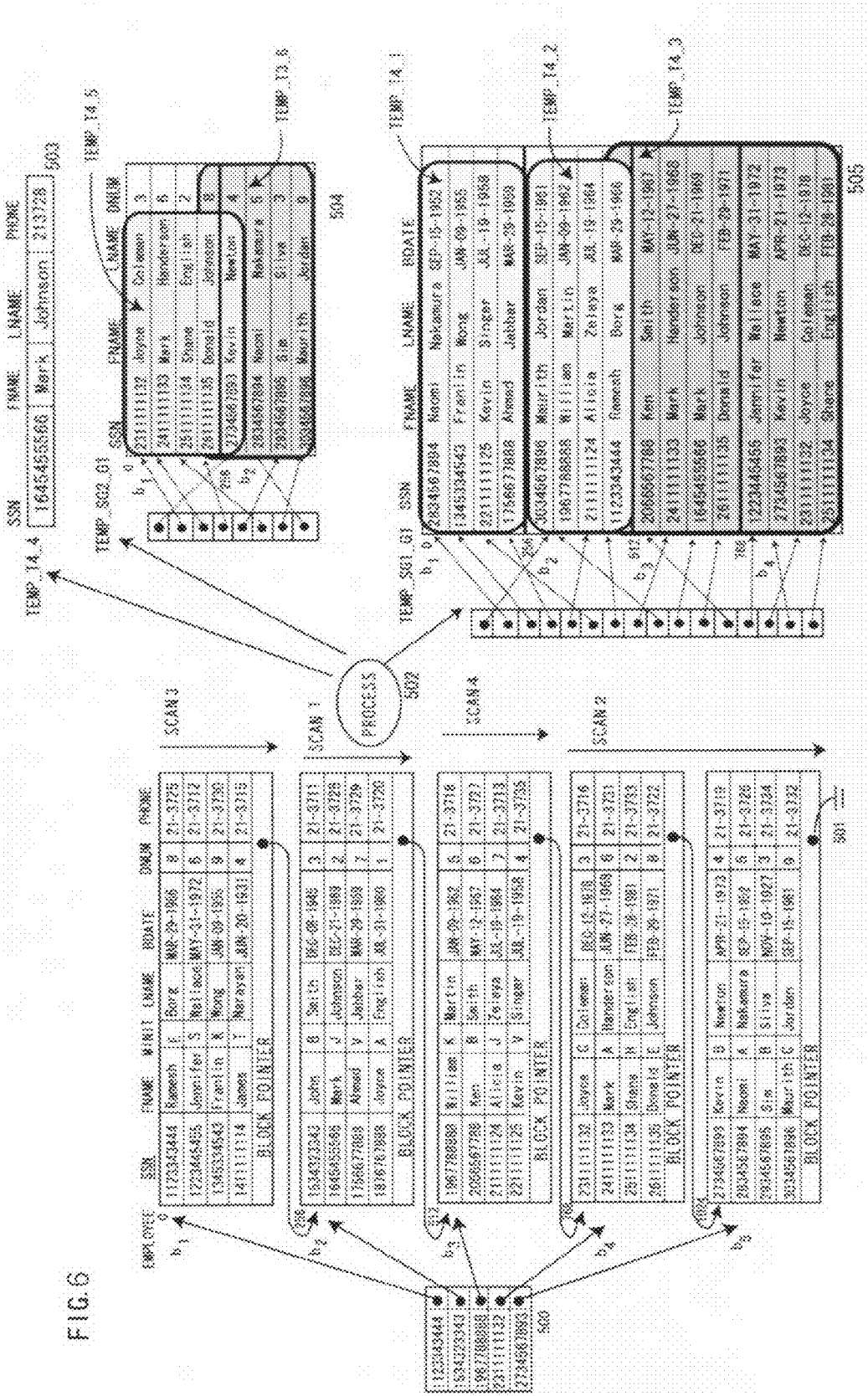
FIG. 6 is a diagram showing the processing of tasks that combined a synthetic select operation and a synthetic project operation.

FIG. 6 shows the status of the process (502) accessing the blocks in the relation EMPLOYEE in the order of $b_2$, $b_4$, $b_5$, $b_1$, $b_3$, and processing the tasks $t_4^{4'}$, $t_{G1}^{SG2}$, $t_{G1}^{SG1}$ simultaneously, and writing the processing results to TEMP_T4_4, TEMP_SG2_G1, TEMP_SG1_G1.

[(a-4) Creating a Virtual Relation]

In FIG. 6, the relation TEMP_T4_4 is the processing result of the task $t_4^{4'}$, and the relation TEMP_SG2_G1, which is the processing result of the task $t_{G1}^{SG2}$ that combined the synthetic select operation and the synthetic project operation, is partially shared by the tasks $t_5^{4'}$, $t_6^{3'}$ in the sub-group $SG2_{G1}$. As described above, the tasks in the sub-group $SG2_{G1}$ are the followings.

Sub-group $SG2_{G1} = \{t_5^{4'}, t_6^{3'}\}$

| | |
|---|---|
| $(t_5^{4'})$: TEMP_T4_5 | $\leftarrow \Pi_{SSN, FNAME, LNAME}$ ($\sigma_{SSN > 2311111131\ AND\ SSN < 2834567894}$ EMPLOYEE) |
| $(t_6^{3'})$: TEMP_T3_6 | $\leftarrow \Pi_{SSN, FNAME, LNAME, DNUM}$ ($\sigma_{SSN > 2611111134}$ EMPLOYEE) |

Then, the virtual relations TEMP_T4_5, TEMP_T3_6 are created as the processing results of the tasks $t_5^{4'}$, $t_6^{3'}$ in the sub-group $SG2_{G1}$ as shown in FIG. 6. In the virtual relations, the relation name of the processing result of the task $t_{G1}^{SG2}$ that combined the synthetic select operation and the synthetic project operation, the stored locations of the records (row range of the records) shared in the processing result, the stored locations of the attributes (column numbers), and the numbers and the address of the blocks where the records are stored, are written as follows.

TEMP_T4_5 = {relation: TEMP_SG2_G1; rows: 1~5; columns: 1~3; blocks: $b_1$[0, 256], $b_2$[256, 512]};

TEMP_T3_6 = {relation: TEMP_SG2_G1; rows: 4~8; columns: 1~4; blocks: $b_1$[0, 256], $b_2$[256, 512]};

The virtual relation TEMP_T4_5 is the processing result of the task $t_5^{4'}$ sharing the records and the attributes in the relation TEMP_SG2_G1 for the rows 1~5 and the columns 1~3 stored in the blocks $b_1$, $b_2$ of relative address 0~512 as shown in FIG. 6.

The virtual relation TEMP_T3_6 is the result of processing the task $t_6^{3'}$ sharing the records and the attributes in the relation TEMP_SG2_G1 for the rows 4~8 and the columns 1~4 stored in the blocks $b_1$, $b_2$ of the relative address 0~512 as shown in FIG. 6.

Likewise, the relation TEMP_SG1_G1, which is the processing result of the task $t_{G1}^{SG1}$ that combined the synthetic select operation and the synthetic project operation, is shared by the tasks $t_1^{4'}$, $t_2^{4'}$, $t_3^{4'}$ in the sub-group. As described above, the tasks in the sub-group $SG1_{G1}$ are the followings.

Sub-group $SG1_{G1} = \{t_1^{4'}, t_2^{4'}, t_3^{4'}\}$

| | |
|---|---|
| $(t_1^{4'})$: TEMP_T4_1 | $\leftarrow \Pi_{SSN, FNAME, LNAME, BDATE}$ ($\sigma_{BDATE > `DEC-01-1951'\ AND\ BDATE < `DEC-31-1959'}$ EMPLOYEE) |
| $(t_2^{4'})$: TEMP_T4_2 | $\leftarrow \Pi_{SSN, FNAME, LNAME, BDATE}$ ($\sigma_{BDATE > `JAN-01-1961'\ AND\ BDATE < `DEC-31-1966'}$ EMPLOYEE) |
| $(t_3^{4'})$: TEMP_T4_3 | $\leftarrow \Pi_{SSN, FNAME, LNAME, BDATE}$ ($\sigma_{BDATE > `JAN-01-1966'}$ EMPLOYEE) |

The virtual relations TEMP_T4_1, TEMP_T4_2, TEMP_T4_3 shown in FIG. 6 are created for the tasks $t_1^{4'}$, $t_2^{4'}$, $t_3^{4'}$ in the sub-group. In each virtual relation, the relation name TEMP_SG1_G1 of the processing result of the task $t_{G1}^{SG1}$ that combined the synthetic select operation and the synthetic project operation, the stored locations of the records (row range of the record) shared in the processing result, the stored locations of the attributes (column numbers), and the numbers and the address of the block where the records are stored, are written as follows.

TEMP_T4_1 = {relation: TEMP_SG1_G1; rows: 1~4; columns: 1~4; blocks: $b_1$ [0, 256]};

TEMP_T4_2 = {relation: TEMP_SG1_G1; rows: 5~8; columns: 1~4; blocks: $b_2$ [256, 512]};

TEMP_T4_3 = {relation: TEMP_SG1_G1; rows: 8~16; columns: 1~4; blocks: $b_2$ [256, 512], $b_3$ [512, 768], $b_4$ [768, 1024]};

The virtual relation TEMP_T4_1 is the processing result of the task $t_1^{4'}$ sharing the records and the attributes in the relation TEMP_SG1_G1 for the rows 1~4 and the columns 1~4 stored in the block $b_1$ of relative address 0~256 as shown in FIG. 6.

The virtual relation TEMP_T4_2 is the processing result of the task $t_2^{4'}$ sharing the records and the attributes in the relation TEMP_SG1_G1 for the rows 5~8 and the columns 1~4 stored in the block $b_2$ of relative address 256~512 as shown in FIG. 6.

The virtual relation TEMP_T4_3 is the processing result of the task $t_2^{4'}$ sharing the records and the attributes in the relation TEMP_SG1_G1 for the rows 8~16 and the columns 1~4 stored in the block $b_2$, $b_3$, $b_4$ of at relative address 256~1024 as shown in FIG. 6.

[(a-5) Creating New Group]

After processing the tasks $t_{G1}^{SG2}$, $t_{G1}^{SG1}$ that combined the synthetic select operation and the synthetic project operation, and the task $t_4^{4'}$ that combined the select operation and the project operation in the order of $t_4^{4'}$, $t_{G1}^{SG2}$, $t_{G1}^{SG1}$ in the group G1 by using multi-operation processing utilizing a synthetic relational operation as above, the query processor finds the new tasks to be processed from the query trees of FIG. 4-1~4-2 in the order of topological sort.

First, when the processing of the task $t_4^{4'}$ finishes, new tasks to be processed from the query tree $P_4$ are not found and a new group is not created, because the processing of the task $t_4^5$ in the group G3 is not finished.

Second, when the processing of the task $t_{G1}^{SG2}$ finishes, the processing of the tasks $t_5^{4'}$, $t_6^{3'}$ in the sub-group $SG2_{G1}$ finish. However new tasks to be processed from the query trees $P_5$, $P_6$ are not found so that new groups are not created, because the processing of the task $t_5^5$ in the group G3 and the processing of the task $t_6^1$ in the group G4 are not finished.

Finally, when the processing of the task $t_{G1}^{SG1}$ finishes, the processing of the tasks $t_1^{4'}$, $t_2^{4'}$, $t_3^{4'}$ in the sub-group $SG1_{G1}$ finish. However new tasks to be processed from the query trees $P_1$, $P_2$, $P_3$ are not found so that new groups are not created, because the processing of the tasks $t_1^5$, $t_2^5$, $t_3^5$ in the group G3 are not finished.

[(b) Processing Group G2 (Processing a Group Containing a Task that Combined a Synthetic Select Operation and a Synthetic Project Operation)]

By using multi-operation processing, the multi-operation processor performs the processing of the task $t_{G2}^{SG1}$ that combined the synthetic select operation and the synthetic operation, and the processing of the tasks $t_4^{2'}$, $t_5^{2'}$, which are not collected into a sub-group, in the group G2 simultaneously. As described above, the group G2 has the task $t_{G2}^{SG1}$ that combined the synthetic select operation and the synthetic project operation, and the tasks $t_4^{2'}$, $t_5^{2'}$ that combined the select operation and the project operation.

PROJECT, and project the attributes PNUMBER, PNAME from the retrieved record.

plan($t_5^{2'}$): Retrieve multiple records from the relation PROJECT by searching the relation linearly, and project the attributes PNUMBER, PNAME from the retrieved records.

[(b-2) Processing Cost for Each Task]

After creating the access plan for each task, the multi-operation processor calculates a processing cost for each task in the group based on the access plan.

Processing cost of the task $t_{G2}^{SG1}$:

$\text{cost}(t_{G2}^{SG1}) = x_P + [b_P/2] = 4$ ($x_P$: a levels of the primary index of the relation PROJECT, $b_P$: number of blocks in the relation PROJECT)

Processing cost of the task $t_4^{2'}$:

$\text{cost}(t_4^{2'}) = x_{P2} + 1 = 2$ ($x_{P2}$: a level of secondary index of the relation PROJECT)

Processing cost of the task $t_5^{2'}$:

$\text{cost}(t_5^{2'}) = b_P = 5$

The processing cost of the task $t_{G2}^{SG1}$ is the cost of using the primary index to find the first record, and accessing about a half of the blocks in the relation, so $\text{cost}(t_{G2}^{SG1})$ becomes $x_P + [b_P/2] = 4$.

The processing cost of the task $t_4^{2'}$ is the cost of using the secondary index (203) to find a single record. This is the level $x_P$ of the secondary index and the cost of accessing one block. The level $x_P$ of the secondary index (201) of the relation PROJECT shown in FIG. 3-3 is 1, so $\text{cost}(t_4^{2'})$ becomes $x_{P2} + 1 = 2$.

The processing cost of the task $t_5^{2'}$ is the cost of accessing 5 blocks to retrieve multiple records from the relation PROJECT linearly, so $\text{cost}(t_5^{2'})$ becomes $b_P = 5$.

After calculating the processing costs as above, the multi-operation processor sorts these tasks in the group based on the processing costs in the order from the task of smaller processing cost.

$\text{sort}(t_4^{2'}, t_5^{2'}, t_{G2}^{SG1}) \rightarrow (t_4^{2'}, t_{G2}^{SG1}, t_5^{2'})$

[(b-3) Block Set for Each Task]

After sorting these tasks in the group in the order from the task of smaller processing cost, the multi-operation processor finds blocks that the tasks $t_4^{2'}$, $t_{G2}^{SG1}$, $t_5^{2'}$ need to access from the relation PROJECT in advance by using the indices of the PROJECT: Group G2 = $\{t_{G2}^{SG1}, t_4^{2'}, t_5^{2'}\}$
($t_{G2}^{SG1}$): TEMP_SG1_G2 ← $\Pi_{PNUMBER, PNAME}$ ($\sigma_{PNUMBER > 2 \text{ AND } PNUMBER < 18}$ PROJECT)
($t_4^{2'}$): TEMP_T2_4 ← $\Pi_{PNUMBER, PNAME}$ ($\sigma_{PNAME = \text{'ProjectO'}}$ PROJECT)
($t_5^{2'}$): TEMP_T2_5 ← $\Pi_{PNUMBER, PNAME}$ ($\sigma_{PLOCATION = \text{'New York'}}$ PROJECT)

[(b-1) Access Plan for Each Task]

First, the multi-operation processor creates the following access plans for the task $t_{G2}^{SG1}$ that combined the synthetic select operation and the synthetic project operation, and the tasks $t_4^{2'}$, $t_5^{2'}$ that combined a select operation and a project operation in the group G2.

plan($t_{G2}^{SG1}$): Retrieve multiple records from the relation PROJECT by using the primary index of the relation PROJECT, and project the attributes PNUMBER, PNAME from the retrieved records.

plan($t_4^{2'}$): Retrieve a single record from the relation PROJECT by using the secondary index of the relation relation PROJECT in the order of $t_4^{2'}$, $t_{G2}^{SG1}$, $t_5^{2'}$ and collect them into the blocks sets $B_4^{2'}$, $B_{G2}^{SG1}$, $B_5^{2'}$ as follows.

| | |
|---|---|
| Block set for the task $t_4^{2'}$: | $B_4^{2'} = \{b_3\}$ |
| Block set for the task $t_{G2}^{SG1}$: | $B_{G2}^{SG1} = \{b_1, b_2, b_3, b_4\}$ |
| Block set for the task $t_5^{2'}$: | $B_5^{2'} = \{b_1, b_2, b_3, b_4, b_5\}$ |

The reasons for being able to find the block sets $B_4^{4'}$, $B_{G2}^{SG1}$, $B_5^{2'}$ for the tasks $t_4^{2'}$, $t_{G2}^{SG1}$, $t_5^{2'}$ are the followings.

The task $t_4^{2'}$ needs a record satisfying the select condition "PNAME='ProjectO'". By using the secondary index (203) of the relation PROJECT, the record having the value of 'ProjectO' for the attribute PNAME is stored at the block $b_3$ of relative address 512 in the relation PROJECT, so only the block $b_3$ is needed to be accessed. Therefore a set containing the blocks that need to be accessed for the processing of the task $t_4^{2'}$ becomes $\{b_3\}$.

The task $t_{G2}^{SG1}$ needs records satisfying the select condition "PNUMBER>2 AND PNUMBER<18". Using the primary index (201) of the relation PROJECT, the records having a value greater than 2 for the attribute PNUMBER are stored from the block $b_1$ and the record having a value less than 18 for the attribute PNUMBER is stored at the block $b_4$ of relative address 768, so the set containing the blocks that need to be accessed for the processing of the task $t_{G2}^{SG1}$ becomes $\{b_1, b_2, b_3, b_4\}$.

The task $t_5^{2'}$ needs a record satisfying the select condition "PLOCATION='New York'". Since the relation PROJECT does not contain an index for the attribute PLOCATION, all blocks in the relation PROJECT need to be accessed, so the set containing the blocks that need to be accessed for the processing of the task $t_5^{2'}$ becomes $\{b_1, b_2, b_3, b_4, b_5\}$.

After finding all blocks that need to be accessed for each task, the multi-operation processor obtains the union of the block sets based on the sorted order of the tasks as follows.

$$TB_0 = \emptyset$$

The union of the set $TB_0$ and the block set $B_4^{2'}$ corresponding to the task $t_4^{2'}$ $$TB_4^{2'} = TB_0 \cup B_4^{2'} = \{b_3\}$$

The union of the set $TB_4^{2'}$ and the block set $B_{G2}^{SG1}$ corresponding to the task $t_{G2}^{SG1}$ $$TB_{G2}^{SG1} = TB_4^{2'} \cup B_{G2}^{SG1} = \{b_3, b_1, b_2, b_4\}$$

The union of the set $TB_{G2}^{SG1}$ and the block set $B_5^{2'}$ corresponding to the task $t_5^{2'}$ $$TB_5^{2'} = TB_{G2}^{SG1} \cup B_5^{2'} = \{b_3, b_1, b_2, b_4, b_5\}$$

Thus, after obtaining the union of the block sets, the block access order to the relation PROJECT is determined as $b_3, b_1, b_2, b_4, b_5$ from the result $TB_5^{2'}$ of the union of these block set. These obtained blocks $b_3, b_1, b_2, b_4, b_5$ are shared for the processing of the tasks $t_4^{2'}, t_{G2}^{SG1}, t_5^{2'}$ in this order, so these blocks are called common blocks.

Looking at the block sets $B_4^{2'}, B_{G2}^{SG1}, B_5^{2'}$ based on the block access order, the block $b_3$ is used for the processing of the tasks $t_4^{2'}, t_{G2}^{SG1}, t_5^{2'}$, the block $b_1$ is used for the processing of the tasks $t_{G2}^{SG1}, t_5^{2'}$, the block $b_2$ is used for the processing of the tasks $t_{G2}^{SG1}, t_5^{2'}$, the block $b_4$ is used for the processing of the tasks $t_{G2}^{SG1}, t_5^{2'}$, and the block $b_4$ is used for the processing of the task $t_5^{2'}$. By using these blocks as common blocks, the tasks that need to be processed at each common block are processed simultaneously. By summarizing the above explanation, the following table is obtained.

TABLE 3

| Common block | tasks processed at common block | finishing tasks |
|---|---|---|
| $b_3$ | $t_4^{2'}, t_{G2}^{SG1}, t_5^{2'}$ | $t_4^{2'}$ |
| $b_1$ | $t_{G2}^{SG1}, t_5^{2'}$ | |
| $b_2$ | $t_{G2}^{SG1}, t_5^{2'}$ | |
| $b_4$ | $t_{G2}^{SG1}, t_5^{2'}$ | $t_{G2}^{SG1}$ |
| $b_5$ | $t_5^{2'}$ | $t_5^{2'}$ |

[(b-4) Processing Tasks at Common Block]

As shown in the above table, in order to find which tasks to be processed at each common block, the following steps are used based on the information of the block sets $B_4^{2'}, B_{G2}^{SG1}, B_5^{2'}$ created for the tasks $t_4^{2'}, t_{G2}^{SG1}, t_5^{2'}$.

First, the multi-operation processor accesses the block $b_3$ from disk, and reads the data of the block $b_3$ into main memory. In order to check if the tasks $t_4^{2'}, t_{G2}^{SG1}, t_5^{2'}$ in the group need to be processed at the block $b_3$, the block $b_3$ is represented as a set $\{b_3\}$, and the intersections for the block sets $B_4^{2'}, B_{G2}^{SG1}, B_5^{2'}$ with the set $\{b_3\}$ are obtained as follows.

| For the task $t_4^{2'}$: | $B_4^{2'} \cap \{b_3\} = \{b_3\}$ |
|---|---|
| For the task $t_{G2}^{SG1}$: | $B_{G2}^{SG1} \cap \{b_3\} = \{b_3\}$ |
| For the task $t_5^{2'}$: | $B_5^{2'} \cap \{b_3\} = \{b_3\}$ |

The intersections for the tasks $t_4^{2'}, t_{G2}^{SG1}, t_5^{2'}$ becomes $\{b_3\}$. Therefore the tasks $t_4^{2'}, t_{G2}^{SG1}, t_5^{2'}$ are processed at the common block $b_3$ being read into main memory. After processing these tasks at the block $b_3$, the block $b_3$ is no longer needed to be accessed again. Therefore the differences for the sets $B_4^{2'}, B_{G2}^{SG1}, B_5^{2'}$ with the set $\{b_3\}$ are obtained. Then the obtained differences are represented as the block sets $B_4^{2'(1)}, B_{G2}^{SG1(1)}, B_5^{2'(1)}$ as follows.

| For the task $t_4^{2'}$: | $B_4^{2'} - \{b_3\} = \{\} = B_4^{2'(1)}$ |
|---|---|
| For the task $t_{G2}^{SG1}$: | $B_{G2}^{SG1} - \{b_3\} = \{b_1, b_2, b_4\} = B_{G2}^{SG1(1)}$ |
| For the task $t_5^{2'}$: | $B_5^{2'} - \{b_3\} = \{b_1, b_2, b_4, b_5\} = B_5^{2'(1)}$ |

As a result, the block set $B_4^{2'(1)}$ becomes an empty set and the processing of the task $t_4^{2'}$ finishes.

Then, the multi-operation processor accesses the block $b_1$ from disk, and reads the data of the block $b_1$ into main memory. In order to check to see if the tasks $t_{G2}^{SG1}, t_5^{2'}$ in the group, excluding the task $t_4^{2'}$ that already finished processing, need to be processed at the block $b_1$, the block $b_1$ is represented as a block set $\{b_1\}$, and the intersections for the block sets $B_{G2}^{SG1(1)}, B_5^{2'(1)}$ with the set $\{b_1\}$ are obtained as follows.

| For the task $t_{G2}^{SG1}$: | $B_{G2}^{SG1(1)} \cap \{b_1\} = \{b_1\}$ |
|---|---|
| For the task $t_5^{2'}$: | $B_5^{2'(1)} \cap \{b_1\} = \{b_1\}$ |

The intersections for the tasks $t_{G2}^{SG1}, t_5^{2'}$ becomes $\{b_1\}$. Therefore the tasks $t_{G2}^{SG1}, t_5^{2'}$ are processed at the common block $b_5$ being read into main memory, and the block $b_5$ becomes a common block. After processing these tasks at the common block $b_1$, the block $b_1$ is no longer needed to be accessed again. Therefore the differences for the block sets $B_{G2}^{SG1(1)}, B_5^{2'(1)}$ with the set $\{b_1\}$ are obtained. Then the obtained differences are represented as the block sets $B_{G2}^{SG1(2)}, B_5^{2'(2)}$ as follows.

| For the task $t_{G2}^{SG1}$: | $B_{G2}^{SG1(1)} - \{b_1\} = \{b_2, b_4\} = B_{G2}^{SG1(2)}$ |
|---|---|
| For the task $t_5^{2'}$: | $B_5^{2'(1)} - \{b_1\} = \{b_2, b_4, b_5\} = B_5^{2'(2)}$ |

Next, the multi-operation processor accesses the block $b_2$ from disk, and read the data of the block $b_2$ into main memory. In order to check if the tasks $t_{G2}^{SG1}, t_5^{2'}$ in the group, excluding the task $t_4^{2'}$ that already finished processing, need to be processed at the block $b_2$, the block $b_2$ is represented as a block set $\{b_2\}$, and the intersections for the block sets $B_{G2}^{SG1(2)}, B_5^{2'(2)}$ with the set $\{b_2\}$ are obtained as follows.

| | |
|---|---|
| For the task $t_{G2}^{SG1}$: | $B_{G2}^{SG1(2)} \cap \{b_2\} = \{b_2\}$ |
| For the task $t_5^{2'}$: | $B_5^{2'(2)} \cap \{b_2\} = \{b_2\}$ |

The intersections for the tasks $t_{G2}^{SG1}, t_5^{2'}$ becomes $\{b_2\}$. Therefore the tasks $t_{G2}^{SG1}, t_5^{2'}$ are processed at the common block $b_2$ being read into main memory. After processing these tasks at the common block $b_2$, the block $b_2$ is no longer needed to be accessed again. Therefore the differences for the block sets $B_{G2}^{SG1(2)}, B_5^{2'(2)}$ are obtained with the set $\{b_2\}$. Then the obtained differences are represented as the block sets $B_{G2}^{SG1(3)}, B_5^{2'(3)}$ as follows.

| | |
|---|---|
| For the task $t_{G2}^{SG1}$: | $B_{G2}^{SG1(2)} - \{b_2\} = \{b_4\} = B_{G2}^{SG1(3)}$ |
| For the task $t_5^{2'}$: | $B_5^{2'(2)} - \{b_2\} = \{b_4, b_5\} = B_5^{2'(3)}$ |

Next, the multi-operation processor accesses the block $b_4$ from disk, and read the data of the block $b_4$ into main memory. In order to check if the tasks $t_{G2}^{SG1}, t_5^{2'}$ in the group, excluding the task $t_4^{2'}$ that already finished processing, need to be processed at the block $b_4$, the block $b_4$ is represented as a block set $\{b_4\}$, and the intersections for the block sets $B_{G2}^{SG1(3)}, B_5^{2'(3)}$ with the set $\{b_4\}$ are obtained as follows.

| | |
|---|---|
| For the task $t_{G2}^{SG1}$: | $B_{G2}^{SG1(3)} \cap \{b_4\} = \{b_4\}$ |
| For the task $t_5^{2'}$: | $B_5^{2'(3)} \cap \{b_4\} = \{b_4\}$ |

The intersections for the tasks $t_{G2}^{SG1}, t_5^{2'}$ becomes $\{b_4\}$. Therefore the tasks $t_{G2}^{SG1}, t_5^{2'}$ are processed at the common block $b_4$ being read into main memory.

After processing these tasks at the block $b_4$, the block $b_4$ is no longer needed to be accessed again. Therefore the differences for the block sets $B_{G2}^{SG1(3)}, B_5^{2'(3)}$ are obtained with the set $\{b_4\}$ as follows. Then the obtained difference are represented as the block sets $B_{G2}^{SG1(4)}, B_5^{2'(4)}$ as follows.

| | |
|---|---|
| For the task $t_{G2}^{SG1}$: | $B_{G2}^{SG1(3)} - \{b_4\} = \{\} = B_{G2}^{SG1(4)}$ |
| For the task $t_5^{2'}$: | $B_5^{2'(3)} - \{b_4\} = \{b_5\} = B_5^{2'(4)}$ |

As a result, the block set $B_{G2}^{SG1(4)}$ becomes empty set $\emptyset$, and the processing of the task $t_{G2}^{SG1}$ finishes. At this stage, there is only the task $t_5^{2'}$ left in the group G2, so the multi-operation processor accesses the remaining block $b_5$ from the relation PROJECT and perform processing the task $t_5^{2'}$. After processing the task $t_5^{2'}$, the processing of all tasks in the group is completed.

Figure 7:
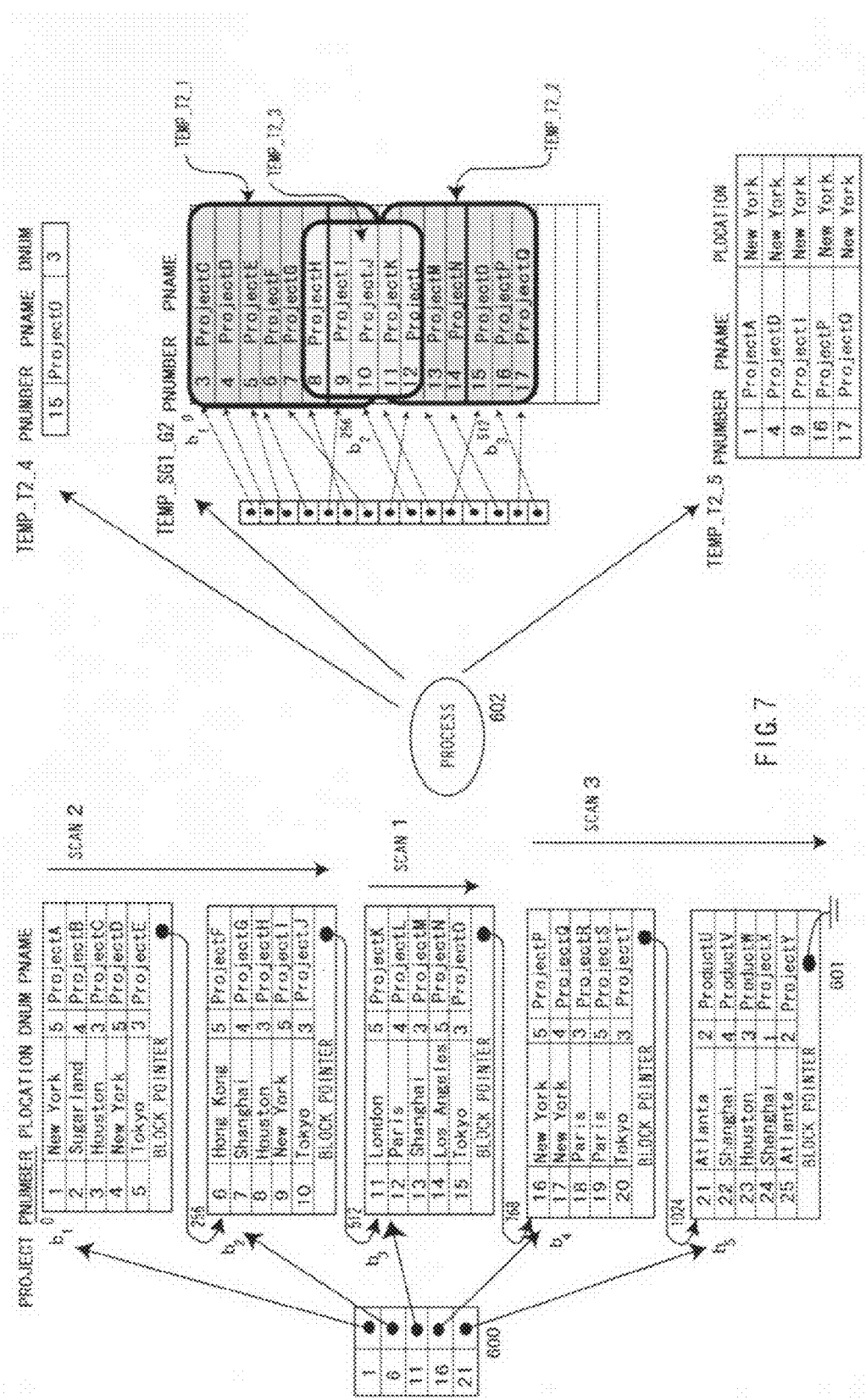
FIG. 7 is a diagram showing the processing of a task that combined a synthetic select operation and a synthetic project operation.

FIG. 7 shows the status of the process (602) accessing the blocks in the relation PROJECT in the order of $b_3, b_1, b_2, b_4, b_5$ and processing the tasks $t_4^{2'}, t_{G2}^{SG1}, t_5^{2'}$ simultaneously, and writing the processing result to TEMP_T2_4, TEMP_SG1_G2, TEMP_T2_5.

[(b-5) Creating Virtual Relations]

The relation TEMP_SG1_G2 which is the processing result of the task $t_{G2}^{SG1}$ that combined the synthetic select operation and the synthetic project operation is shared by the tasks $t_1^{2'}, t_2^{2'}, t_3^{2'}$ that combined the select operation and the project operation in the sub-group $SG1_{G2}$.

As described above, the tasks in the sub-group $SG1_{G2}$ are the followings. sub-group $SG1_{G2} = \{t_1^{2'}, t_2^{2'}, t_3^{2'}\}$

| |
|---|
| $(t_1^{2'})$: TEMP_T2_1 ← $\Pi_{PNUMBER, PNAME}$ $(\sigma_{PNUMBER > 2 \text{ AND } PNUMBER < 11} \text{PROJECT})$ |
| $(t_2^{2'})$: TEMP_T2_2 ← $\Pi_{PNUMBER, PNAME}$ $(\sigma_{PNUMBER > 10 \text{ AND } PNUMBER < 18} \text{PROJECT})$ |
| $(t_3^{2'})$: TEMP_T2_3 ← $\Pi_{PNUMBER, PNAME}$ $(\sigma_{PNUMBER > 7 \text{ AND } PNUMBER < 13} \text{PROJECT})$ |

For the tasks $t_1^{2'}, t_2^{2'}, t_3^{2'}$ in the sub-group $SG1_{G2}$, the virtual relations TEMP_T2_1, TEMP_T2_2, TEMP_T2_3 shown in FIG. 7 are created, and in each virtual relation, the name of the relation (TEMP_SG1_G2) which is the processing result of the task $t_{G2}^{SG1}$ that combined the synthetic select operation and the synthetic project operation that each virtual relation shares, the stored locations of the records (row range of records) shared in the relation, the stored locations of the attributes (column numbers), the numbers and the address of the blocks where the records are stored, are written.

| |
|---|
| TEMP_T2_1 = {relation: TEMP_SG1_G2; rows: 1~8; columns: 1~2; blocks: $b_1[0, 256], b_2[256, 512]$}; |
| TEMP_T2_2 = {relation: TEMP_SG1_G2; rows: 9~15; columns: 1~2; blocks: $b_2[256, 512], b_3[512, 768]$}; |
| TEMP_T2_3 = {relation: TEMP_SG1_G2; rows: 6~10; columns: 1~2; blocks: $b_1[0, 256], b_2[256, 512]$}; |

FIG. 7 shows that the relation TEMP_SG1_G2 which is the processing result of the task $t_{G2}^{SG1}$ is partially shared by the virtual relations TEMP_T2_1, TEMP_T2_2, TEMP_T2_3.

The virtual relation TEMP_T2_1 is the processing result of the task $t_1^{2'}$ in the sub-group $SG1_{G2}$ sharing the records and the attributes in the relation TEMP_SG1_G2 for the rows 1~8 and the columns 1~2 stored in the blocks $b_1, b_2$ of relative address 0~512 as shown in FIG. 7.

The virtual relation TEMP_T2_2 is the processing result of the task $t_2^{2'}$ in the sub-group $SG1_{G2}$ sharing the records and the attributes in the relation TEMP_SG1_G2 for the rows 1~8 and the columns 1~2 stored in the blocks $b_1, b_2$ of relative address 0~512 as shown in FIG. 7.

The virtual relation TEMP_T2_3 is the processing result of the task $t_3^{2'}$ in the sub-group $SG1_{G2}$ sharing the records and the attributes in the relation TEMP_SG1_G2 for the rows 6~10 and the columns of 1~2 stored in the blocks $b_2, b_3$ of relative address 256~768 as shown in FIG. 7.

Thus, by creating a virtual relation for each task in the sub-group $SG1_{G2}$ as above, the tasks $t_1^{2'}, t_2^{2'}, t_3^{2'}$ in a sub-group are able to share a part of the records and the attributes in the relation TEMP_SG1_G2 which is the processing result of the task $t_{G2}^{SG1}$ that combined the synthetic select operation and the synthetic project operation.

[(b-6) Creating New Groups]

After processing the tasks $t_4^{2'}, t_{G2}^{SG1}, t_5^{2'}$ in the group G2, the query processor finds the new tasks to be processed from the query trees shown in FIG. 4-1~4-3. First, when the processing of the task $t_4^{2'}$ finishes, new tasks to be processed from the query tree $P_4$ are not found so that new groups are not created, because the processing of the task $t_4^{5'}$ in the group G3 and the processing of the tasks $t_4^6, t_4^7$ which are not collected into a group are not finished.

Next, when the processing of the task $t_{G2}^{SG1}$ finishes, the processing of the tasks $t_1^{2'}$, $t_2^{2'}$, $t_3^{2'}$ in the sub-group $SG1_{G2}$ finishes simultaneously. However, new tasks to be processed from the query trees $P_1$, $P_2$, $P_3$ are not found so that new groups are not created; because when the processing of the task $t_1^{2'}$ finishes, the processing of the task $t_1^5$ in the group G3 and the processing of the tasks $t_2^6$, $t_2^7$ which are not collected in a group are not finished; also when the processing of the task $t_2^{2'}$ finishes, the processing of the task $t_2^5$ in the group G3 and the processing of the tasks $t_2^6$, $t_2^7$ which are not collected in a group are not finished; and also when the processing of the task $t_3^{2'}$ finishes, the processing of the task $t_3^5$ in the group G3 and the processing of the tasks $t_3^6$, $t_3^7$ which are not collected in a group are not finished.

Finally, when the processing of the task $t_5^{2'}$ finishes, new tasks to be processed from the query trees $P_5$ are not found so that new groups are not created, because the processing of the task $t_3^5$ in the group G3 and the processing of the tasks $t_5^6$, $t_5^7$ not collected in a group are not finished.

[(c) Processing Group G3]

By using multi-operation processing, the multi-operation processor performs the processing of the task $t_{G3}^{SG1}$ of the synthetic project operation and the task $t_4^5$ of the select operation. As described above, the tasks in the group G3 are the followings.

---

WORKS_ON: group $G3 = \{t_{G3}^{SG1}, t_4^5\}$
$(t_{G3}^{SG1})$: TEMP_SG1_G3 ← $\Pi_{ESSN,PNO}$ WORKS_ON
$(t_4^5)$: TEMP_T5_4 ← $\sigma_{HOURS > 24}$ WORKS_ON

---

[(c-1) Creating Access Plans]

The multi-operation processor creates the access plans for the task $t_{G3}^{SG1}$ of the synthetic project operation and the task $t_4^5$ of the select operation in the group G3 as follows.

plan($t_{G3}^{SG1}$): Project the attributes ESSN, PNO from the relation WORKS_ON by scanning the relation.

plan($t_4^5$): Retrieve multiple records from the relation WORKS_ON by searching linearly.

[(c-2) Processing Cost of Each Task]

After creating the access plan for each task, the processing cost for each task is obtained based on the access plan as follows.

Processing cost for the task $t_{G3}^{SG1}$:

cost($t_{G3}^{SG1}$)=$b_W$=5 ($b_W$: number of blocks in the relation WORKS_ON)

Processing cost for the task $t_4^5$:

cost($t_4^5$)=$b_W$=5

The processing cost of the task $t_{G3}^{SG1}$ is the cost of accessing all blocks in the relation WORKS_ON. Since the relation WORKS_ON contains 5 blocks, so cost($t_{G3}^{SG1}$) becomes $b_W$=5.

The processing cost of the task $t_4^5$ is the cost of accessing 5 blocks to retrieve multiple records from the relation WORKS_ON linearly, so cost($t_4^5$) becomes $b_W$=5.

[(c-3) Obtaining Block Sets]

Using multi-operation processing, the multi-operation processor performs the processing of the tasks $t_{G3}^{SG1}$, $t_4^5$ in the group G3 simultaneously. The multi-operation processor finds all blocks that the tasks $t_{G3}^{SG1}$, $t_4^5$ need to access in the relation WORKS_ON, and collects them into the block sets $B_{G3}^{SG1}$, $B_4^5$ as follows.

---

Block set for the task $t_{G3}^{SG1}$: $B_{G3}^{SG1} = \{b_1, b_2, b_3, b_4, b_5\}$
Block set for the task $t_4^5$: $B_4^5 = \{b_1, b_2, b_3, b_4, b_5\}$

---

[(c-4) Obtaining a Block Access Order]

After finding all blocks that need to be accessed for the processing of the tasks $t_{G3}^{SG1}$, $t_4^5$, the union of the block sets $B_{G3}^{SG1}$, $B_4^5$ is obtained based on the sorted order of the tasks (since the processing cost of these two tasks are both 5, either order is fine).

$TB_0 = \emptyset$

The union of the set $TB_0$ and the block set $B_{G3}^{SG1}$ corresponding to the task $t_{G3}^{SG1}$:

$$TB_{G3}^{SG1} = TB_0 \cup B_{G3}^{SG1} = \{b_1, b_2, b_3, b_4, b_5\}$$

The union of the set $TB_{G3}^{SG1}$ and the block set $B_4^5$ corresponding to the task $t_4^5$:

$$TB_4^5 = TB_{G3}^{SG1} \cup B_4^5 = \{b_1, b_2, b_3, b_4, b_5\}$$

From $TB_4^5$, the block access order to the relation WORKS_ON is determined as $b_1$, $b_2$, $b_3$, $b_4$, $b_5$, and the processing of the tasks $t_4^{2'}$, $t_{G2}^{SG1}$ are performed at each block being read into main memory simultaneously.

Figure 8:
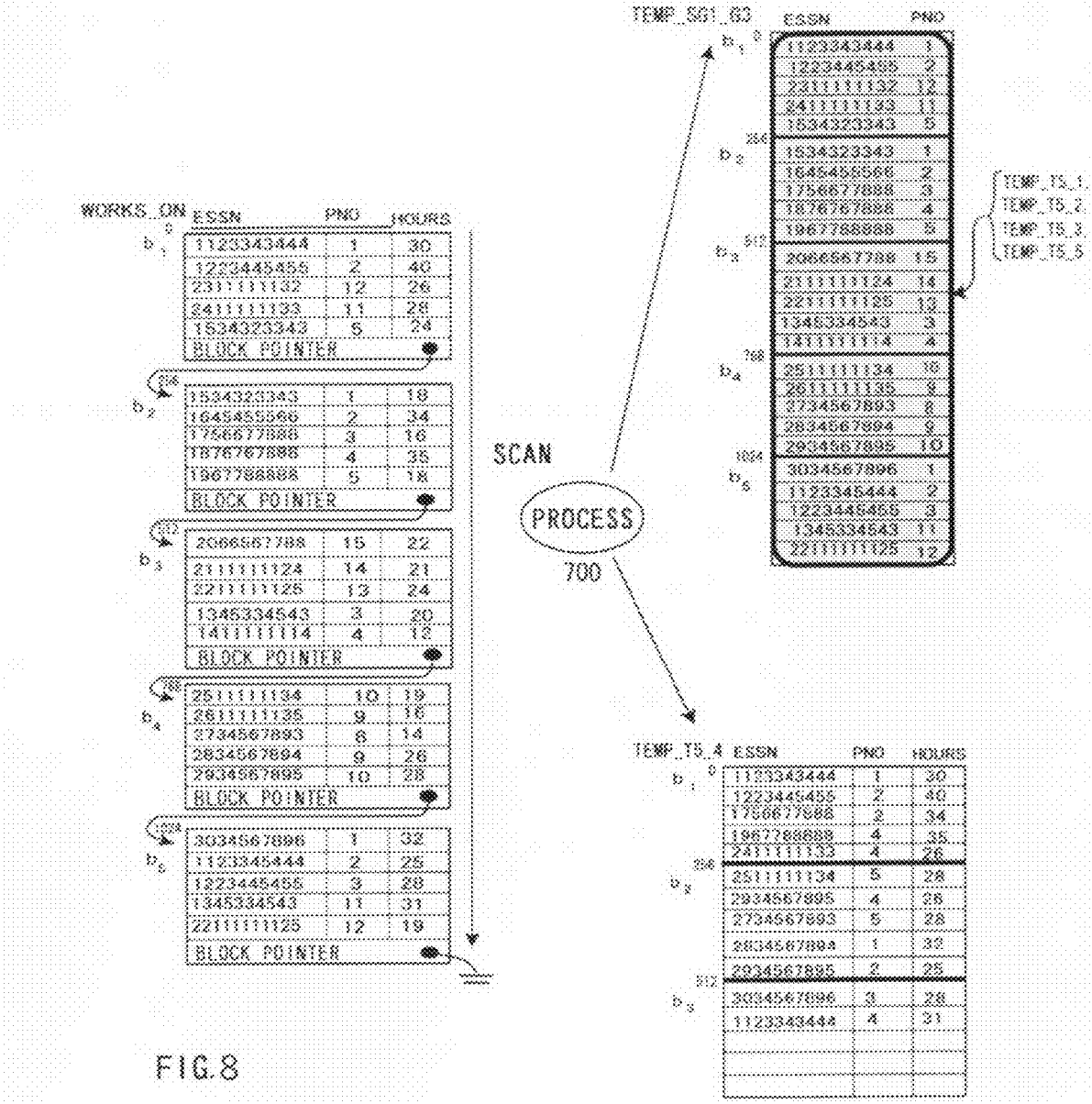
FIG. 8 is a diagram showing the processing of tasks using multi-operation processing.

In FIG. 8, the process (700) is accessing the blocks to the relation WORKS_ON in the order of $b_1 \sim b_5$ and processing the tasks $t_{G3}^{SG1}$, $t_4^5$ at each block and writing the processing results to TEMP_SG1_G3, TEMP_5_4 simultaneously.

[(c-5) Creating Virtual Relations]

In FIG. 8, the relation TEMP_SG1_G3, which is the processing result of the task $t_{G3}^{SG1}$ of the synthetic project operation, is shared by the virtual relations TEMP_T5_1, TEMP_T5_2, TEMP_T5_3, TEMP_T5_5 created for the tasks $t_1^5$, $t_2^5$, $t_3^5$, $t_5^5$ of the project operation in the sub-group $SG1^{G3}$. In each virtual relation, the relation name (TEMP_SG1_G3) of the processing result of the task $t_{G3}^{SG1}$ of the synthetic project operation, the stored locations of the records (row range of the records) in the processing result shared by the virtual relation, the stored locations of the attributes (column numbers of attributes), and the numbers and the address of the blocks where the records are stored, are written.

---

TEMP_T5_1 = {relation: TEMP_SG1_G3; rows: 1~25; columns: 1~2;
    blocks: $b_1$[0, 256], $b_2$[256, 512], $b_3$[512, 768], $b_4$[768, 1024], $b_5$[1024, —]};

TEMP_T5_2 = {relation: TEMP_SG1_G3; rows: 1~25; columns: 1~2;
    blocks: $b_1$[0, 256], $b_2$[256, 512], $b_3$[512, 768], $b_4$[768, 1024], $b_5$[1024, —]};

TEMP_T5_3 = {relation: TEMP_SG1_G3; rows: 1~25; columns: 1~2;
    blocks: $b_1$[0, 256], $b_2$[256, 512], $b_3$[512, 768], $b_4$[768, 1024], $b_5$[1024, —]};

-continued

TEMP_T5_5 = {relation: TEMP_SG1_G3; rows: 1~25; columns: 1~2;
      blocks: $b_1$[0, 256], $b_2$[256, 512], $b_3$[512, 768], $b_4$[768, 1024], $b_5$[1024, —]};

Since the tasks $t_1^5, t_2^5, t_3^5, t_5^5$ of the project operation in the sub-group are equivalent ($t_1^5 \equiv t_2^5 \equiv t_3^5 \equiv t_5^5$), the virtual relations TEMP_T5_1, TEMP_T5_2, TEMP_T5_3, TEMP_T5_5, which are processing results of these tasks, are also equivalent (TEMP_T5_1=TEMP_T5_2 = TEMP_T5_3 =TEMP_T5_5).

[(c-6) Creating New Groups]

After processing the task $t_{G3}^{SG1}$ of the synthetic project operation and the task $t_4^5$ of the select operation using multi-operation processing, the query processor finds new tasks to be processed from the query trees shown in FIG. 4-1~4-3 in the order of topological sort.

First, when the processing of the task $t_{G3}^{SG1}$ finishes, the processing of the tasks $t_1^5, t_2^5, t_3^5, t_5^5$ of the project operation in the sub-group $SG1_{G3}$ finishes. As a result, the tasks $t_1^6, t_2^6, t_3^6, t_5^6$ of the join operation become newly available to be processed from the query trees $P_1, P_2, P_3, P_5$. Although the tasks $t_1^5, t_2^5, t_3^5, t_5^5$ use different virtual relations of source search for their join operations, the task $t_1^6$ uses the virtual relation TEMP_T5_1(FIG. 8) which is the processing result of the task $t_1^5$ to access the processing result TEMPS_SG1_G3 of the task $t_{G3}^{SG1}$, and the task $t_2^6$ uses the virtual relation TEMP_T5_2 which is the processing result of the task $t_2^5$ to access the processing result TEMPS_SG1_G3 of the task $t_{G3}^{SG1}$, and the task $t_3^6$ uses the virtual relation TEMP_T5_3 which is the processing result of the task $t_3^5$ to access the processing result TEMPS_SG1_G3 of the task $t_{G3}^{SG1}$. Therefore these tasks $t_1^6, t_2^6, t_3^6, t_5^6$ are treated as tasks performing operations on the common relation TEMP_SG1_G3, and a new group G5 is created for these tasks $t_1^6, t_2^6, t_3^6, t_5^6$. Furthermore, since the task $t_1^7$ performing operations on the processing result of the task $t_1^6$ of the join operation is a project operation, the task $t_1^6$ of the join operation is combined to the task $t_1^7$ of the project operation to create a task $t_1^{7'}$. Likewise, since the task $t_2^7$ performing operations on the processing result of the task $t_2^6$ of the join operation is a project operation, the task $t_2^6$ of the join operation is combined to the task $t_2^7$ of the project operation to create a task $t_2^{7'}$. Since the task $t_3^7$ performing operations on the processing result of the task $t_3^6$ of the join operation is a project operation, the task $t_3^6$ of the join operation is combined to the task $t_3^7$ of the project operation to create a task $t_3^{7'}$. Since the task $t_5^7$ performing operations on the processing result of the task $t_5^6$ of the join operation is a project operation, the task $t_5^6$ of the join operation is combined to the task $t_5^7$ of the project operation to create a task $t_5^{7'}$. Then these tasks $t_1^{7'}, t_2^{7'}, t_3^{7'}, t_5^{7'}$ that combined a join operation and a project operation are added into the group G5.

Next, when the processing of the task $t_4^5$ finishes, the processing of the task $t_4^6$ of the join operation becomes newly available.

Since the task $t_4^6$ uses the processing result TEMP_T5_4 of the task $t_4^5$ as the relation of source search for its join operation, a new group G6 is created for the task $t_4^6$ as a task performing operations on the processing result TEMP_T5_4 of the task $t_4^5$. Furthermore, since the task $t_4^7$ performing operations on the processing result of the task $t_4^6$ of the join operation is a project operation, the task $t_4^6$ of the join operation is combined to the task $t_4^7$ of the project operation to create a task $t_4^{7'}$, and the task $t_4^{7'}$ is added into the group G6.

Summarizing the above explanations, the tasks $t_1^{7'}, t_2^{7'}, t_3^{7'}, t_5^{7'}, t_4^{7'}$, which are newly found by finishing the processing of the tasks in the group G3, are collected into the groups G5, G6 as follows.

TEMP_SG1_G3:   Group G5 = {($t_1^{7'}, t_2^{7'}, t_3^{7'}, t_5^{7'}$)}
      ($t_1^{7'}$): TEMP_T7_1 ← $\Pi_{FNAME,LNAME,BDATE,PNO}$(TEMP_T4_1|X|$_{SSN=ESSN}$TEMP_T5_1)
      ($t_2^{7'}$): TEMP_T7_2 ← $\Pi_{FNAME,LNAME,BDATE,PNO}$(TEMP_T4_2|X|$_{SSN=ESSN}$TEMP_T5_2)
      ($t_3^{7'}$): TEMP_T7_3 ← $\Pi_{FNAME,LNAME,BDATE,PNO}$(TEMP_T4_3|X|$_{SSN=ESSN}$TEMP_T5_3)
      ($t_5^{7'}$): TEMP_T7_5 ← $\Pi_{SSN,FNAME,LNAME,PNO}$(TEMP_T4_5|X|$_{SSN=ESSN}$TEMP_T5_5)
TEMP_T5_4:   Group G6 = {$t_4^{7'}$}
      ($t_4^{7'}$): TEMP_T7_4 ← $\Pi_{FNAME,LNAME,PHONE,PNO,HOURS}$ (TEMP_T4_4 |X|$_{SSN=ESSN}$ TEMP_T5_4)

The tasks $t_1^{7'}, t_2^{7'}, t_3^{7'}, t_5^{7'}$ performing operations on the relation TEMP_SG1_G3, which is the processing result of the task $t_{G3}^{SG1}$, are collected into the group G5. The task $t_4^{7'}$ performing an operation on the relation TEMP_T5_4, which is the processing result of the task $t_4^5$, is collected into the group G6.

[(c-7) Creating a Task that Combined a Synthetic Join Operation and a Synthetic Project Operational]

Next, the tasks $t_1^{7'}, t_2^{7'}, t_3^{7'}, t_5^{7'}$ collected into the group G5 are further collected into sub-groups based on common sub-expression of join operation as follows.

TEMP_SG1_G3:   Group G5 = {$SG1_{G5}$, {$t_5^{7'}$}}
      Sub-group $SG1_{G5}$ = {$t_1^{7'}, t_2^{7'}, t_3^{7'}$}

Since the relations TEMP_T5_1, TEMP_T5_2, TEMP_T5_3 are same relations as shown in FIG. 8 and the relations TEMP_T4_1, TEMP_T4_2, TEMP_T4_3 are subsets of the relation TEMP_SG1_G1 as shown in FIG. 6, these tasks $t_1^{7'}, t_2^{7'}, t_3^{7'}$ containing the join operations are collected into the sub-group $SG1_{G5}$ as tasks having the common sub-expression of the join operation.

After collecting these tasks having common sub-expression of join operation into the sub-group $SG1_{G5}$, the logical union (∪) is used to concatenate each join operation of the tasks $t_1^{7'}, t_2^{7'}, t_3^{7'}$ in the sub-group $SG1_{G5}$ to create a synthetic join operation satisfying all join conditions of the join operations of these tasks as follows.

$$(TEMP\_T4\_1 \, |X|_{SSN=ESSN} \, TEMP\_T5\_1) \, U$$
$$(TEMP\_T4\_2 \, |X|_{SSN=ESSN} \, TEMP\_T5\_2)$$
$$U(TEMP\_T4\_3 \, |X|_{SSN=ESSN} \, TEMP\_T5\_3)$$

Next, since the tasks $t_1^{7'}$, $t_2^{7'}$, $t_3^{7'}$ also contain the project operations, the union of the attributes used in the project operations are obtained to create a synthetic project operation including all attributes of the project operations of the tasks $t_1^{7'}$, $t_2^{7'}$, $t_3^{7'}$ as follows.

$$\Pi_{FNAME,LNAME,BDATE,PNO}(\ldots)$$

Furthermore, the synthetic join operation and the synthetic project operation created are combined to create a single task $t_{G5}^{SG1}$ satisfying all join conditions of the join operations and including all attributes of the project operations of the tasks $t_1^{7'}$, $t_2^{7'}$, $t_3^{7'}$ as follows.

$$(t_{G5}^{SG1}): TEMP\_SG1\_G5 \leftarrow \Pi_{FNAME,LNAME,BDATE,PNO}$$
$$((TEMP\_T4\_1|X|_{SSN=ESSN}TEMP\_T5\_1)U$$
$$(TEMP\_T4\_2|X|_{SSN=ESSN}TEMP\_T5\_2) \, U$$
$$(TEMP\_T4\_3|X|_{SSN=ESSN}TEMP\_T5\_3))$$

After creating the task $t_{G5}^{SG1}$ that combined the synthetic join operation and the synthetic project operation, the subgroup $SG1_{G5}$ in the group G5 is replaced by the task $t_{G5}^{SG1}$ that combined the synthetic join operation and the synthetic project operation as follows.

$$TEMP\_SG1\_G3:groupG5=\{t_{G5}^{SG1},t_5^{7'}\}$$

The processing of the group G5 containing the task $t_{G5}^{SG1}$ that combined the synthetic join operation and the synthetic project operation is explained after processing the next group G4. When the processing of the group G3 finishes, the group G4 is processed next.

[(d) Processing Group G4]

As described above, the task in the group G4 is the following. In the group G4, the task t61 of the project operation is collected.

$$DEPARTMENT:Group \, G4=\{t_6^1\}$$
$$(t_6^1):TEMP\_T1\_6 \leftarrow \Pi_{DNUMBER,DNAME}DEPARTMENT$$

Since there is only a single task in the group G4, the task $t_6^1$ of the project operation is processed directly.

After processing the task $t_6^1$, the task $t_6^4$ of the join operation becomes newly available to be processed from the query tree $P_6$ of the FIG. 4-3(*b*).

Since the task $t_6^4$ performs its join operation on the relation TEMP_T1_6, which is the processing result of the task $t_6^1$, and the relation TEMP_T3_6, which is the processing result of the task $t_6^3$, and uses the relation TEMP_T3_6 as the relation of source search, a new group G7 is created for the task $t_6^4$ as a task performing its operation on the relation TEMP_T3_6.

Furthermore, since the task $t_6^5$ performing operations on the processing result of the task $t_6^4$ of the join operation is a project operation, the task $t_6^4$ of the join operation is combined to the task $t_6^5$ of the project operation to create a task $t_6^{5'}$, and the task $t_6^{5'}$ is added into the group G7. Since the processing result of the task $t_6^{5'}$ becomes the final result of the query Q6, the processing result of the task $t_6^{5'}$ is named as RESULT_Q6.

$$TEMP\_T3\_6: Group \, G7 = \{t_6^{5'}\}$$
$$(t_6^{5'}): RESULT\_Q6 \leftarrow \Pi_{SSN, FNAME, LNAME, DNUMBER, DNAME}$$
$$(TEMP\_T1\_6 \, |X|_{DNUMBER=DNUM} TEMP\_T3\_6)$$

After processing the group G4, the group G5 is processed next.

[(e) Processing Group G5 (Processing a Group Containing a Task that Combined a Synthetic Join Operation and a Synthetic Project Operation)]

Using the multi-operation processing, the multi-operation processor performs the processing of the task $t_{G5}^{SG1}$ that combined the synthetic join operation and the synthetic project operation, and the task $t_5^{7'}$ that combined the join operation and the project operation in the group G5 simultaneously. As discussed above, the group G5 contains the following tasks.

$$TEMP\_SG1\_G3: group \, G5 = \{t_{G5}^{SG1}, t_5^{7'}\}$$
$$(t_{G5}^{SG1}): TEMP\_SG1\_G5 \leftarrow \Pi_{FNAME,LNAME,BDATE,PNO}$$
$$((TEMP\_T4\_1|X|_{SSN=ESSN}TEMP\_T5\_1)$$
$$U (TEMP\_T4\_2|X|_{SSN=ESSN}$$
$$TEMP\_T5\_2) \, U \, (TEMP\_T4\_3|X|_{SSN=ESSN}$$
$$TEMP\_T5\_3))$$
$$(t_5^{7'}): TEMP\_T7\_5 \leftarrow \Pi_{SSN, FNAME, LNAME, PNO}$$
$$(TEMP\_T4\_5|X|_{SSN=ESSN}TEMP\_T5\_5)$$

Figure 9:
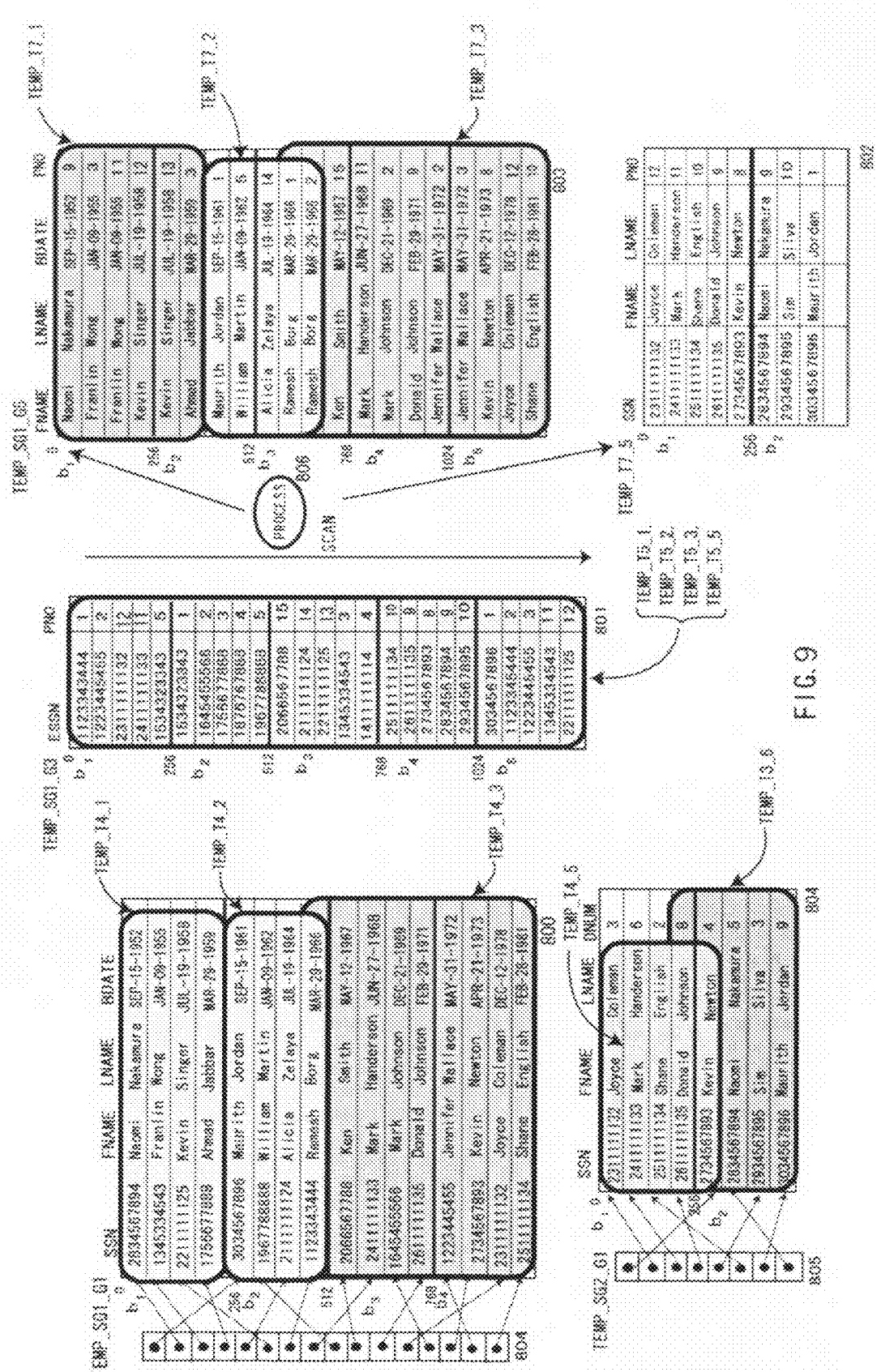
FIG. 9 is a diagram showing the processing of the task that combined a synthetic join operation and a synthetic project operation.

For the processing of the task $t_{G5}^{SG1}$ that combined the synthetic join operation and the synthetic project operation, the relation TEMP_SG1_G1 shown in FIG. 6 (the processing result of the task $t_{G1}^{SG1}$ containing the virtual relations TEMP_T4_1, TEMP_4_2, and TEMP_4_3) and the relation TEMP_SG1_G3 shown in FIG. 8 (The processing result of the task $t_{G3}^{SG1}$ containing the virtual relations TEMP_T5_1, TEMP_T5_2, and TEMP_T5_3) are used, so the relation TEMP_SG1_G1 and the relation TEMP_SG1_G3 are shown again in FIG. 9.

[(e-1) Creating Access Plans]

The multi-operation processor creates access plans for the task $t_{G5}^{SG1}$ that combined the synthetic join operation and the synthetic project operation, and task $t_5^{7'}$ that combined the join operation and the project operation as follows.

plan($t_{G5}^{SG1}$): use the method of processing a task of a synthetic join operation to process the task $t_{G5}^{SG1}$ that combined the synthetic join operation and the synthetic project operation (The improved method 2).

plan($t_5^{7'}$): for each record in the virtual relation TEMP_T5_5, retrieve a record from the virtual relation TEMP_T4_5 satisfying the join condition using the index of the relation TEMP_SG2_G1, and join these two records. Then project the attributes SSN, FNAME, LNAME, PNO from the joined record.

The access plan of the task $t_{G5}^{SG1}$ is explained in detail as follows.

First, the information stored in the virtual relations TEMP_T5_1, TEMP_T5_2, TEMP_T5_3 shown in FIG. 9 are used to find the blocks that these virtual relations share in the relation TEMP_SG1_G3, and the blocks are collected into the block sets $B_{TEMP\_T5\_1}$, $B_{TEMP\_T5\_2}$, $B_{TEMP\_T5_3}$ as follows.

TEMP_T5_1: $B_{TEMP\_T5\_1} = \{b_1, b_2, b_3, b_4, b_5\}$
TEMP_T5_2: $B_{TEMP\_T5\_2} = \{b_1, b_2, b_3, b_4, b_5\}$
TEMP_T5_3: $B_{TEMP\_T5\_3} = \{b_1, b_2, b_3, b_4, b_5\}$

Here, the blocks $b_1$~$b_5$ are blocks in the relation TEMP_SG1_G3 shown in FIG. 8 and FIG. 9. After obtaining the block sets $B_{TEMP\_T5\_1}$, $B_{TEMP\_T5\_2}$, $B_{TEMP\_T5\_3}$, the union of these block sets is obtained to create the block set $B_{G5}^{SG1}$ as follows.

$$B_{G5}^{SG1} = B_{TEMP\_T5\_1} \cup B_{TEMP\_T5\_2} \cup B_{TEMP\_T5\_3} = \{b_2, b_3, b_4, b_5\}$$

After obtaining the block set $B_{G5}^{SG1}$, the blocks $b_1$, $b_2$, $b_3$, $b_4$, $b_5$ in the block set $B_{G5}^{SG1}$ are read from the relation TEMP_SG1_G3 shown in FIG. 9 respectively. Then for each record s in the block $b_i$ (i=1, 2, . . . , 5), the record r satisfying the join condition r[SSN]=s[ESSN], which means the value of the record r for the attribute SSN is same as the value of the record s for the attribute ESSN, is retrieved from the relation_SG1_G1 using the index (804) of the relation TEMP_SG1_G1 shown in FIG. 9.

When the record r is found, if the record r is in the virtual relation TEMP_T4_1 and the record s is in the virtual relation TEMP_T5_1 (satisfying the join relationship TEMP_T4_1|X|$_{SSN=ESSN}$ TEMP_T5_1), or if the record r is in the virtual relation TEMP_T4_2 and the record s is in the virtual relation TEMP_T5_2 (satisfying the join relationship TEMP_T4_2|X|$_{SSN=ESSN}$ TEMP_T5_2), or if the record r is in the virtual relation TEMP_T4_3 and the record s is in the virtual relation TEMP_T5_3 (satisfying the join relationship TEMP_T4_3|X|$_{SSN=ESSN}$ TEMP_T5_3), then the record r and the record s are joined to create a record t.

After creating the record t, the attributes FNAME, LNAME, BDATE, PNO are projected from the record t to create a record u, and the record u is added into the processing result TEMP_SG1_G5 of the task $t_{G5}^{SG1}$ that combined the synthetic join operation and the synthetic project operation as shown in FIG. 9.

[(e-2) Calculating Processing Cost for Each Task]

After creating the access plans for the task $t_{G5}^{SG1}$ that combined the synthetic join operation and the synthetic project operation, and the task $t_5^{7'}$ that combined the join operation and the project operation in the group G5, the processing costs for these tasks are calculated based on the access plans as follows.

Processing cost of the task $t_{G5}^{SG1}$:

$$cost(t_{G5}^{SG1}) = |B_{G5}^{SG1}| + (|b_1| * (x_{TEMP\_SG1\_G1} + 1)) + (|b_2| * (x_{TEMP\_SG1\_G1} + 1)) +$$
$$(|b_3| * (x_{TEMP\_SG1\_G1} + 1)) + (|b_4| * (x_{TEMP\_SG1\_G1} + 1)) +$$
$$(|b_5| * (x_{TEMP\_SG1\_G1} + 1)) = 55 (x_{TEMP\_SG1\_G1}: \text{levels}$$
of the index for the relation TEMP_SG1_G1)

Processing cost of the task $t_5^{7'}$:

$cost(t_5^{7'}) = b_{TEMP\_T5\_5} + (|TEMP\_T5\_5|*$
$(x_{TEMP\_SG2\_G1}+1))=55$ ($b_{TEMP\_T5\_5}$:number of
blocks in the virtual relation TEMP_T5_
5,$x_{TEMP\_SG2\_G1}$:level of an index in the relation
TEMP_SG2_G1)

The processing cost of the task $t_{G5}^{SG1}$ that combined the synthetic join operation and the synthetic project operation is a total of the cost of accessing 5 blocks in the block set $B_{G5}^{SG1}$ and the cost of finding a record from the relation TEMP_SG1_G1 to be joined with each record in the block $b_i$(i=1, 2, . . . , 5) using the index (804) of the relation TEMP_SG1_G1. As shown in FIG. 9, since the level of the index $x_{TEMP\_SG1\_G1}$ for the relation TEMP_SG1_G1(804) is one and the block set $B^{SG1}$ contains 5 blocks and each block contains 5 records, the processing cost of the task $t_{G5}^{SG1}$ becomes $cost(t_{G5}^{SG1})=5+(5*(1+1))+(5*(1+1))+(5*(1+1))+(5*$
$(1+1))+(5*(1+1))=55.$ The processing cost of the task $t_5^{7'}$ is a total of the cost of accessing the blocks in the virtual relation TEMP_T5_5 and the cost of finding a record from the virtual relation TEMP_T4_5 to be joined with each record in the virtual relation TEMP_T5_5 using the index (805) of the relation TEMP_SG2_G1.

As shown in FIG. 9, the virtual relation TEMP_T5_5 is sharing 5 blocks in the relation TEMP_SG1_G3, so the processing cost $b_{TEMP\_T5\_5}$ of scanning the virtual relation TEMP_T5_5 is 5. Also as shown in FIG. 9, the level of the index $x_{TEMP\_SG2\_G1}$ for the relation TEMP_SG2_G1 is 1. Therefore processing cost of the task $t_5^{7'}$ becomes $cost(t_5^{7'})= 5+(25*(1+1))=55.$

[(e-3) Obtaining a Block Access Order]

After calculating the processing cost of the tasks $t_{G5}^{SG1}$, $t_5^{7'}$ as above, these tasks are sorted based on the processing costs of these tasks in the order from the task of smaller processing cost as follows (since the processing costs of these tasks are both 55, either order is fine).

$$\text{sort}(t_{G5}^{SG1}, t_5^{7'}) \rightarrow (t_{G5}^{SG1}, t_5^{7'})$$

After sorting these tasks in the group, the blocks that the tasks $t_{G5}^{SG1}$, $t_5^{7'}$ need to access to the relation TEMP_SG1_G3 are obtained, and the obtained blocks are collected into the block sets $B_{G5}^{SG1}$, $B_5^{7'}$ respectively.

The blocks that the task $t_{G5}^{SG1}$ needs to access to the relation TEMP_SG1_G3 are the blocks in the block sets $B_{G5}^{SG1}$ obtained by creating the access plan ($t_{G5}^{SG1}$).

The blocks that the task $t_5^{7'}$ needs to access from the relation TEMP_SG1_G3 are obtained from the information of the blocks stored in the virtual relation TEMP_T5_5.

Block set for the task $t_{G5}^{SG1}$: $B_{G5}^{SG1}=\{b_1, b_2, b_3, b_4, b_5\}$
Block set for the task $t_5^{7'}$: $B_5^{7'}=\{b_1, b_2, b_3, b_4, b_5\}$ After finding all blocks that need to be accessed for each task, the union of these block sets is obtained based on the sorted order of the tasks as follows.

$TB_0 = \emptyset$

The union of the set $TB_0$ and the block set $B_{G5}^{SG1}$ corresponding to task $t_{G5}^{SG1}$:

$TB_{G5}^{SG1}=TB_0 \cup B_{G5}^{SG1}=\{b_1,b_2,b_3,b_4,b_5\}$

The union of the set $TB_{G5}^{SG1}$ and the block set $B_5^{7'}$ corresponding to task $t_5^{7'}$:

$TB_5^{7'}=TB_{G5}^{SG1} \cup B_5^{7'}=\{b_1,b_2,b_3,b_4,b_5\}$

From $TB_5^{7'}$, the block access order to the relation TEMP_SG1_G3 is determined as $b_1, b_2, b_3, b_4, b_5$ as shown in FIG. 9 and the processing of the tasks $t_{G5}^{SG1}$, $t_5^{7'}$ are processed at each block simultaneously by the multi-operation processor as follows.

[(e-4) Processing Tasks at Common Blocks]

First, for the first record s1(1123343444, 1) (attribute ESSN=1123343444, attribute PNO=1) in the block $b_1$ of the relation TEMP_SG1_G3 shown in FIG. 9, the multi-operation processor retrieves a record having a value of 1123343444 for the attribute SSN from the relation TEMP_SG1_G1 using the index (804) of the relation TEMP_SG1_G1 for the task $t_{G5}^{SG1}$. Then the record r1(1123343444, Ramesh, Borg, Mar. 29, 1966) stored in the block $b_2$ of the relation TEMP_SG1_G1 is found.

Then for the task $t_{G5}^{SG1}$, since the record r1 is in the virtual relation TEMP_T4_2 and the record s1 is in the virtual relation TEMP_T5_2 (satisfying the join relationship TEMP_T4_2|X|$_{SSN=ESSN}$ TEMP_T5_2), the multi-operation processor joins the records r1 and the record s1 to create a record t1(1123343444, Ramesh, Borg, Mar. 29, 1966, 1123343444, 1), and projects the attributes FNAME, LNAME, BDATE, PNO from the record t1 to create a record u1(Ramesh, Borg, Mar. 29, 1966, 1), and adds the record u1 into the processing result TEMP_SG1_G5 of the task $t_{G5}^{SG1}$ that combined the synthetic join operation and the synthetic project operation as shown in FIG. 9.

Continuously for the $t_5^{7'}$, utilizing the record s1, the multi-operation processor retrieves a record having a value of 1123343444 for the attribute SSN from the relation TEMP_SG2_G1 using the index (805) of the relation TEMP_SG2_G1 shown in FIG. 9, but such a record is not found, so no record is added into the processing result TEMP_T7_5 of the task $t_5^{7'}$ shown in FIG. 9.

Next, for the second record s2(1223445455, 2) (ESSN=1223445455, PNO=2) in the block $b_1$ of the relation TEMP_SG1_G3 shown in FIG. 9, the multi-operation processor retrieves a record having a value of 1223445455 for the attribute SSN from the relation TEMP_SG1_G1 using the index (804) of the relation TEMP_SG1_G1. Then, the record r2(1223445455, Jennifer, Wallace, May 31, 1972) stored at the block $b_4$ of the relation TEMP_SG1_G1 is found.

Then for the $t_{G5}^{SG1}$, since the record r2 is in the virtual relation TEMP_T4_3 and the record s2 is in the virtual relation TEMP_T5_3, satisfying the join relationship TEMP_T4_3|X|$_{SSN=ESSN}$ TEMP_T5_3, the multi-operation processor joins the record r2 and the record s2 to create a record t2(1223445455, Jannifer, Wallace, May 31, 1972, 1223445455, 2), and projects the attributes FNAME, LNAME, BDATE, PNO from the record t2 to create a record u2(Jannifer, Wallace, May 31, 1972, 2), and adds the record u2 into the processing result TEMP_SG1_G5 of the task $t_{G5}^{SG1}$.

Continuously for the task $t_5^{7'}$, utilizing the record s2, the multi-operation processor retrieves a record having a value of 1223445455 for the attribute SSN from the relation TEMP_SG2_G1 using the index (805) of the relation TEMP_SG2_G1. But such a record is not found, so no record is added into the processing result TEMP_T7_5 of the task $t_5^{7'}$.

Next, the multi-operation processor takes the third record s3(2311111132, 12) from the block $b_1$ of the relation TEMP_SG1_G3 shown in FIG. 9, and retrieves a record having a value of 2311111132 for the attribute SSN from the relation TEMP_SG1_G1 using the index of the relation TEMP_SG1_G1, and the record r3(2311111132, Joyce, Coleman, Dec. 12, 1978) stored at the block $b_4$ of the relation TEMP_SG1_G1 is found.

After finding the record r3, since the record r3 is in the virtual relation TEMP_T4_3 and the record s3 is in the virtual relation TEMP_T5_3, satisfying join relationship of TEMP_T4_3|X|$_{SSN=ESSN}$ TEMP_T5_3, so the multi-operation processor joins the record r3 and the record s3 to create a record t3(2311111132, Joyce, Coleman, Dec. 12, 1978, 2311111132, 12), and projects the attributes FNAME, LNAME, BDATE, PNO from the record t3 to create a record u3(Joyce, Coleman, Dec. 12, 1978, 12), and adds the record u3 into the processing result TEMP_SG1_G5 of the task $t_{G5}^{SG1}$.

Continuously for the task $t_5^{7'}$, utilizing the record s3, the multi-operation processor retrieves a record having a value of 2311111132 for the attribute SSN from the relation TEMP_SG2_G1 using the index of the relation TEMP_SG2_G1, and the record v3(2311111132, Joyce, Coleman, 3) stored at the block $b_1$ of the relation TEMP_SG2_G1 is found.

After finding the record v3, since the record v3 is in the virtual relation TEMP_T4_5 and the record s3 is in the virtual relation TEMP_T5_5, satisfying the join relationship TEMP_T4_5|X|$_{SSN=ESSN}$ TEMP_T5_5, the multi-operation processor joins the records v3 and the record s3 to create a record w3(2311111132, Joyce, Coleman, 3, 2311111132, 12), and projects the attributes SSN, FNAME, LNAME, PNO from the record w3 to create a record x3(2311111132, Joyce, Coleman, 12), and adds the record x3 into the processing result TEMP_T7$_{-5\ of\ the\ task\ t5}^{7'}$ as shown in FIG. 9.

Likewise, for the remaining records in the block $b_1$ of the relation TEMP_SG1_G3, the processing of the tasks are performed in the same way as the processing of the tasks performed for the records s1, s2, and s3.

After accessing the block $b_1$, the blocks $b_2 \sim b_5$ are continuously accessed and the processing of the tasks performed at the block $b_1$ are also performed at the blocks $b_2 \sim b_5$ repeatedly.

In FIG. 9, the processing of the tasks $t_{G5}^{SG1}$, $t_5^{7'}$ in the group G5 using the multi-operation processing is shown. The process (806) is accessing the blocks in the relation TEMP_SG1_G3 in the order of $b_1 \sim b_5$, and performing the processing of the tasks $t_{G5}^{SG1}$, $t_5^{7'}$ simultaneously, and writing the processing results to TEMP_SG1_G5 and TEMP_T7_5.

[(e-5) Creating Virtual Relations]

The processing result TEMP_SG1_G5 of the task $t_{G5}^{SG1}$ that combined the synthetic join operation and the synthetic project operation, is partially shared by the tasks $t_1^{7'}, t_2^{7'}, t_3^{7'}$ that combined the join operation and the project operation in the sub-group SG1$_{G5}$. As described above, the tasks in the sub-group SG1$_{G5}$ are the followings.

Sub-group SG1$_{G5}$ = {$t_1^{7'}, t_2^{7'}, t_3^{7'}$}
($t_1^{7'}$): TEMP_T7_1 ← Π$_{FNAME,LNAME,BDATE,PNO}$
    (TEMP_T4_1 |X|$_{SSN=ESSN}$TEMP_T5_1)
($t_2^{7'}$): TEMP_T7_2 ← Π$_{FNAME,LNAME,BDATE,PNO}$
    (TEMP_T4_2 |X|$_{SSN=ESSN}$TEMP_T5_2)
($t_3^{7'}$): TEMP_T7_3 ← Π$_{FNAME,LNAME,BDATE,PNO}$
    (TEMP_T4_3 |X|$_{SSN=ESSN}$ TEMP_T5_3)

Since the records in the relation TEMP_SG1_G1 used by the task $t_{G5}^{SG1}$ is sorted by the values of the attribute BDATE, then the records in the processing result TEMP_SG1_G5 of the task $t_{G5}^{SG1}$ is also sorted by the values of the attribute BDATE.

The reason for using the attribute BDATE to sort the records in the processing result TEMP_SG1_G5 of the task $t_{G5}^{SG1}$ is because the virtual relations TEMP_T5_1, TEMP_T5_2, TEMP_T5_3 used in the task $t_{G5}^{SG1}$ are equivalent (TEMP_T5_1≡TEMP_T5_2≡TEMP_T5_3), and the virtual relations TEMP_T4_1, TEMP_T4_2, TEMP_T4_3 are subsets of the relation TEMP_SG1_G1, and records in the relation TEMP_SG1_G1 are sorted by the values of the attribute BDATE, and virtual relations TEMP_T4_1, TEMP_T4_2, TEMP_T4_3 are sharing a part of the records from the relation TEMP_SG1_G1 based on the values of the attribute BDATE.

Next, the multi-operation processor creates the virtual relations TEMP_T7_1, TEMP_T7_2, TEMP_T7_3 shown in FIG. 9 for the tasks $t_1^{7'}, t_2^{7'}, t_3^{7'}$ in the sub-group $SG1_{G5}$. The virtual relations TEMP_T7_1, TEMP_T7_2, TEMP_T7_3 share a part of the records and the attributes in the relation TEMP_SG1_G5, which is the processing result of the task $t_{G5}^{SG1}$ sorted by the values of the attribute BDATE. When the records in the processing result TEMP_SG_G5 are sorted by the values of the attribute BDATE, the relation name of the processing result of the task $t_{G5}^{SG1}$ that combined the synthetic join operation and the synthetic project operation that each virtual relation shares, the stored locations of the records (row range of the records) shared in the processing result, the stored locations of the attributes (column numbers of the attributes), and the numbers and the address of the blocks where the records are stored, are written in the virtual relations as follows.

---

TEMP_T7_1 = {relation: TEMP_SG1_G5; rows: 1~6; columns: 1~4; blocks: $b_1$[0, 256], $b_2$[256, 512]};
TEMP_T7_2 = {relation: TEMP_SG1_G5; rows: 7~11; columns: 1~4; blocks: $b_2$[256, 512], $b_3$[512, 768]};
TEMP_T7_3 = {relation: TEMP_SG1_G5; rows: 1~20; columns: 1~4; blocks: $b_3$[512, 768], $b_4$[768, 1024], $b_5$[1024, 1280]};

---

The virtual relation TEMP_T7_1 is the processing result of the task $t_1^{7'}$ in the sub-group $SG1_{G5}$ sharing the records and the attributes in the processing result TEMP_SG1_G5 of the task $t_{G5}^{SG1}$ for the rows 1~6 and the columns 1~4 stored in the blocks $b_1$, $b_2$ of relative address 0~512 as shown in FIG. 9.

The virtual relation TEMP_T7_2 is the processing result of the task $t_2^{7'}$ in the sub-group $SG1_{G5}$ sharing the records and the attributes in the processing result TEMP_SG1_G5 of the task $t_{G5}^{SG1}$ for the rows 7~11 and the columns 1~4 stored in the blocks $b_2$, $b_3$ of relative address 256~768 as shown in FIG. 9.

The virtual relation TEMP_T7_3 is the processing result of the task $t_3^{7'}$ in the sub-group $SG1_{G5}$ sharing the records and the attributes in the processing result TEMP_SG1_G5 of the task $t_{G5}^{SG1}$ for the rows 10~20 and the columns 1~4 stored in the blocks $b_3$~$b_5$ of relative address 512~1280 as shown in FIG. 9.

Therefore by creating the virtual relations TEMP_T7_1, TEMP_T7_2, TEMP_T7_3 as above, the tasks $t_1^{7'}, t_2^{7'}, t_3^{7'}$ that combined the join operation and the project operation are able to share a part of the processing result TEMP_SG1_G5 of the task $t_{G5}^{SG1}$ that combined the synthetic join operation and the synthetic project operation. FIG. 9 shows the status of the virtual relations TEMP_T7_1, TEMP_T7_2, TEMP_T7_3 sharing a part of the processing result TEMP_SG1_G5(803) of the $t_{G5}^{SG1}$ sorted by the values of the attribute BDATE.

By processing the task $t_{G5}^{SG1}$ that combined the synthetic join operation and the synthetic project operation in this way, same records are not searched multiple times for the multiple tasks of the join operation contained in the task $t_{G5}^{SG1}$. Also by using the multi-operation processing, the tasks $t_{G5}^{SG1}, t_5^{7'}$ are processed at the common blocks simultaneously.

[(e-6) Creating New Group]

After processing the task $t_{G5}^{SG1}$ that combined the synthetic join operation and the synthetic project operation, and the task $t_5^{7'}$ that combined the join operation and the project operation in the order of $t_{G5}^{SG1}$, $t_5^{7'}$ using multi-operation processing, the query processor finds new tasks to be processed from the query trees shown in FIG. 4-1~FIG. 4-3 in the order of topological sort.

First, when the processing of the task $t_{G5}^{SG1}$ that combined the synthetic join operation and the synthetic project operation finishes, the tasks $t_1^{7'}, t_2^{7'}, t_3^{7'}$ in the sub-group $SG1_{G5}$ finish, and the processing of the tasks $t_1^{8}, t_2^{8}, t_3^{8}$ become newly available to be processed from the query trees $P_1, P_2, P_3$ shown in FIG. 4-1(*a*),(*b*), FIG. 4-2(*a*). Although the tasks $t_1^{8}, t_2^{8}, t_3^{8}$ of the join operations use different virtual relations, the task $t_1^{8}$ uses the virtual TEMP_T7_1, which is the processing result of the task $t_1^{7'}$, to access the processing result TEMP_SG1_G5 of the task $t_{G5}^{SG1}$, and the task $t_2^{8}$ uses the virtual relation TEMP_T7_2, which is the processing result of the task $t_2^{7'}$, to access the processing result TEMP_SG1_G5 of the task $t_{G5}^{SG1}$, and the task $t_3^{8}$ uses the virtual relation TEMP_T7_3, which is the processing result of the task $t_3^{7'}$, to access the processing result TEMP_SG1_G5 of the task $t_{G5}^{SG1}$. Therefore the query processor creates a new group G8 for these tasks as tasks performing operations on the common relation TEMP_SG1_G5.

Furthermore, since the task $t_1^{9}$ performing operations on the processing result of the task $t_1^{8}$ of the join operation is a project operation, the query processor retrieves the task $t_1^{8}$ of the join operation and the task $t_1^{9}$ of the project operation simultaneously, and combines these tasks to create a task $t_1^{9'}$.

Since the task $t_2^{9}$ performing operations on the processing result of the task $t_2^{8}$ of the join operation is a project operation, the query processor retrieves the task $t_2^{8}$ of the join operation and the task $t_2^{9}$ of the project operation simultaneously, and combines these tasks to create a task $t_2^{9'}$ Since the task $t_3^{9}$ performing operations on the processing result of the task $t_3^{8}$ of the join operation is a project operation, the query processor retrieves the task $t_3^{8}$ of the join operation and the task $t_3^{9}$ of the project operation simultaneously, and combines these tasks to create a task $t_3^{9'}$.

Then the query processor adds these tasks $t_1^{9'}, t_2^{9'}, t_3^{9'}$ into the group G8.

Next, after processing the task $t_5^{7'}$, the processing of the task $t_5^{8}$ becomes newly available from the query tree $P_5$ of FIG. 4-3(*a*).

Since the task $t_5^{8}$ of the join operation is using the processing result TEMP_T7_5 of the task $t_5^{7'}$ as the relation of source search for its join operation, the query processor creates a new group G9 for the task $t_5^{8}$ as a task performing operations on the relation TEMP_T7_5.

Furthermore, since the task $t_5^{9}$ performing operations on the processing result of the task $t_5^{8}$ of the join operation is a project operation, the query processor retrieves the task $t_5^{8}$ of the join operation and the task $t_5^{9}$ of the project operation simultaneously, and combines these tasks to create a task $t_5^{9'}$, and adds the task $t_5^{9'}$ into the group G9.

Therefore the group G8 and the group G9 are the followings. In the group G8, the tasks performing operations on the relation TEMP_SG1_G5, which is the processing result of the task $t_{G5}^{SG1}$ that combined the synthetic join operation and the synthetic project operation, are collected. In the group G9, the task performing operations on the relation TEMP_T7_5, which is the processing result of the task $t_5^{7'}$, is collected.

TEMP_SG1_G5: Group G8 = {$t_1^{9'}, t_2^{9'}, t_3^{9'}$}
   ($t_1^{9'}$): RESULT_Q1 ← $\Pi_{FNAME,LNAME,BDATE,PNUMBER,PNAME}$
     (TEMP_T2_1|X|$_{PNUMBER=PNO}$TEMP_T7_1)
   ($t_2^{9'}$): RESULT_Q2 ← $\Pi_{FNAME,LNAME,BDATE,PNUMBER,PNAME}$
     (TEMP_T2_2|X|$_{PNUMBER=PNO}$TEMP_T7_2)
   ($t_3^{9'}$): RESULT_Q3 ← $\Pi_{FNAME,LNAME,BDATE,PNUMBER,PNAME}$
     (TEMP_T2_3|X|$_{PNUMBER=PNO}$TEMP_T7_3)
TEMP_T7_5: Group G9 = {$t_5^{9'}$}
   ($t_5^{9'}$): RESULT_Q5 ← $\Pi_{SSN,FNAME,LNAME,PNUMBER,PNAME}$
     (TEMP_T2_5|X|$_{PNUMBER=PNO}$TEMP_T7_5)

After processing the group G5, the group G6 is processed next.

[(f) Processing Group G6]

As described above, the task $t_4^{7'}$ that combined the join operation and the project operation performing operations on the relation TEMP_T5_4 is collected in the group G6.

TEMP_T5_4: Group G6 = {$t_4^{7'}$}
   ($t_4^{7'}$): TEMP_T7_4 ← $\Pi_{FNAME,LNAME,PHONE,PNO,HOURS}$
     (TEMP_T4_4|X|$_{SSN=ESSN}$TEMP_T5_4)

For the processing of the group G6, since there is only a single task in the group G6, the processing of the task $t_4^{7'}$ is performed directly. The method of processing the task $t_4^{7'}$ is to perform its project operation for each record being processed by its join operation, and the projected record is added into the processing result TEMP_T7_4 directly.

After processing the task $t_4^{7'}$, the processing of the task $t_4^8$ becomes newly available from the query tree $P_4$ of FIG. 4-2(b). Since the task $t_4^8$ performs operations on the processing result TEMP_T2_4 of the task $t_4^{2'}$ and the processing result TEMP_T7_4 of the task $t_4^{7'}$, and uses TEMP_T7_4 as a relation of source search for its join operation, the query processor creates a new group G10 for the task $t_4^8$ as a task performing operations on the relation TEMP_T7_4.

Furthermore, the task $t_4^9$ performing operations on the processing result of the task $t_4^8$ of the join operation, is a project operation, so the query processor retrieves the task $t_4^8$ of the join operation and the task $t_4^9$ of the project operation simultaneously, and creates a task $t_4^{9'}$ that combined the join operation and the project operation, and add the task $t_4^{9'}$ into the group G10 as follows.

TEMP_T7_4: Group G10 = {$t_4^{9'}$}
   ($t_4^{9'}$): RESULT_Q4 ← $\Pi_{FNAME, LNAME, PHONE, HOURS, PNUMBER, PNAME}$
     (TEMP_T2_4|X|$_{PNUMBER=PNO}$TEMP_T7_4)

After processing the group G6, the group G7 is processed next.

[(g) Processing Group G7]

As described above, the task $t_6^{5'}$ that combined a join operation and a project operation performing operations on the relation TEMP_T3_6 is collected in the group G7 as follows.

TEMP_T3_6: Group G7 = {$t_6^{5'}$}
   ($t_6^{5'}$): RESULT_Q6 ← $\Pi_{SSN, FNAME, LNAME, DNUMBER, DNAME}$
     (TEMP_T1_6|X|$_{DNUMBER=DNUM}$
     TEMP_T3_6)

For the processing of the group G7, since there is only a single task in the group G7, the processing of the task $t_6^{5'}$ is performed directly. The method of processing the task $t_6^{5'}$ is to perform its project operation for each record processed by its join operation, and the projected record is added into the processing result RESULT_Q6 directly.

After processing the task $t_6^{5'}$, the processing of all tasks in the query tree $P_6$ finishes. Therefore the processing of the query $Q_6$ is completed. After processing the group G7, the group G8 is processed next.

[(h) Processing Group G8 (Processing a Group Containing Multiple Tasks of a Join Operation Using Multi-Operation Processing)]

Next, using the improved method 4, the method of processing multiple tasks of join operation using multi-operation processing, the multi-operation processor performs the processing of the tasks $t_1^{9'}, t_2^{9'}, t_3^{9'}$ that combined a join operation and a project operation simultaneously.

As describe above, the tasks in the group G8 are the followings.

TEMP_SG1_G5: Group G8 = {$t_1^{9'}, t_2^{9'}, t_3^{9'}$}
   ($t_1^{9'}$): RESULT_Q1 ← $\Pi_{FNAME,LNAME, BDATE,PNUMBER,PNAME}$
     (TEMP_T2_1|X|$_{PNUMBER=PNO}$TEMP_T7_1)
   ($t_2^{9'}$): RESULT_Q2 ← $\Pi_{FNAME,LNAME,BDATE,PNUMBER,PNAME}$
     (TEMP_T2_2|X|$_{PNUMBER=PNO}$TEMP_T7_2)
   ($t_3^{9'}$): RESULT_Q3 ← $\Pi_{FNAME,LNAME,BDATE,PNUMBER,PNAME}$
     (TEMP_T2_3|X|$_{PNUMBER=PNO}$TEMP_T7_3)

Since the relation TEMP_SG1_G2, which is the processing result of the task $t_{G2}^{SG1}$ containing the virtual relations TEMP_T2_1, TEMP_T2_2, TEMP_T2_3 shown in FIG. 7, and the relation TEMP_SG1_G5, which is the processing result of the task $t_{G5}^{SG1}$ containing the virtual relations TEMP_T7_1, TEMP_T7_2, TEMP_T7_3 shown in FIG. 9, are used for the processing the tasks $t_1^{9'}, t_2^{9'}, t_3^{9'}$ that combined the join operation and the project operation, the relation TEMP_SG1_G2 and the relation TEMP_SG1_G5 are shown in FIG. 10 again.

[(h-1) Creating Access Plans]

The following access plans are created for the tasks $t_1^{9'}, t_2^{9'}, t_3^{9'}$ in the group G8.

plan($t_1^{9'}$): For each record in the virtual relation TEMP_T7_1 shown in FIG. 10, retrieve a record satisfying the join condition from the virtual relation TEMP_T2_1 using the index of the relation TEMP_SG1_G2, and then project the attributes FNAME, LNAME, BDATE, PNUMBER, PNAME from the record being joined, and add the result into RESULT_Q1.

plan($t_2^{9'}$): For each record in the virtual relation TEMP_T7_2 shown in FIG. 10, retrieve a record satisfying the join condition from the virtual relation TEMP_T2_2 using the index of the relation TEMP_SG1_G2, and then project the attributes FNAME, LNAME, BDATE, PNUMBER, PNAME from the record being joined, and add the result into RESULT_Q2.

plan($t_3^{9'}$): For each record in the virtual relation TEMP_T7_3 shown in FIG. 10, retrieve a record satisfying the join condition from the virtual relation TEMP_T2_3 using the index of the relation TEMP_SG1_G2, and then project the attributes FNAME, LNAME, BDATE, PNUMBER, PNAME from the record being joined, and add the result into RESULT_Q3.

Based on the access plans created for the tasks $t_1^{9'}$, $t_2^{9'}$, $t_3^{9'}$ in the group G8, the processing cost of each task is calculated as follows.

The processing cost for the task $t_1^{9'}$:

$$\mathrm{cost}(t_1^{9'}) =$$
$$b_{TEMP\_T7\_1} + (|TEMP\_T7\_1| * (x_{TEMP\_SG1\_G2} + 1)) = 2 + (6*(1+1)) =$$
$$14 (b_{TEMP\_T7\_1}: \text{the number of blocks in the virtual relation}$$
$$TEMP\_T7\_1, x_{TEMP\_SG1\_G2}: \text{a level of the}$$
$$\text{index of the relation TEMP\_SG1\_G2})$$

The processing cost for the task $t_2^{9'}$:

$$\mathrm{cost}(t_2^{9'}) = b_{TEMP\_T7\_2} + (|TEMP\_T7\_2| * (x_{TEMP\_SG1\_G2} + 1)) =$$
$$2 + (5*(1+1)) = 12 (b_{TEMP\_T7\_2}: \text{the number}$$
$$\text{of blocks in the virtual relation TEMP\_T7\_2})$$

The processing cost for the task $t_3^{9'}$:

$$\mathrm{cost}(t_3^{9'}) = b_{TEMP\_T7\_3} + (|TEMP\_T7\_3| * (x_{TEMP\_SG1\_G2} + 1)) =$$
$$3 + (11*(1+1)) = 25 (b_{TEMP\_T7\_3}: \text{the number}$$
$$\text{of blocks in the virtual relation TEMP\_T7\_3})$$

Figure 10:
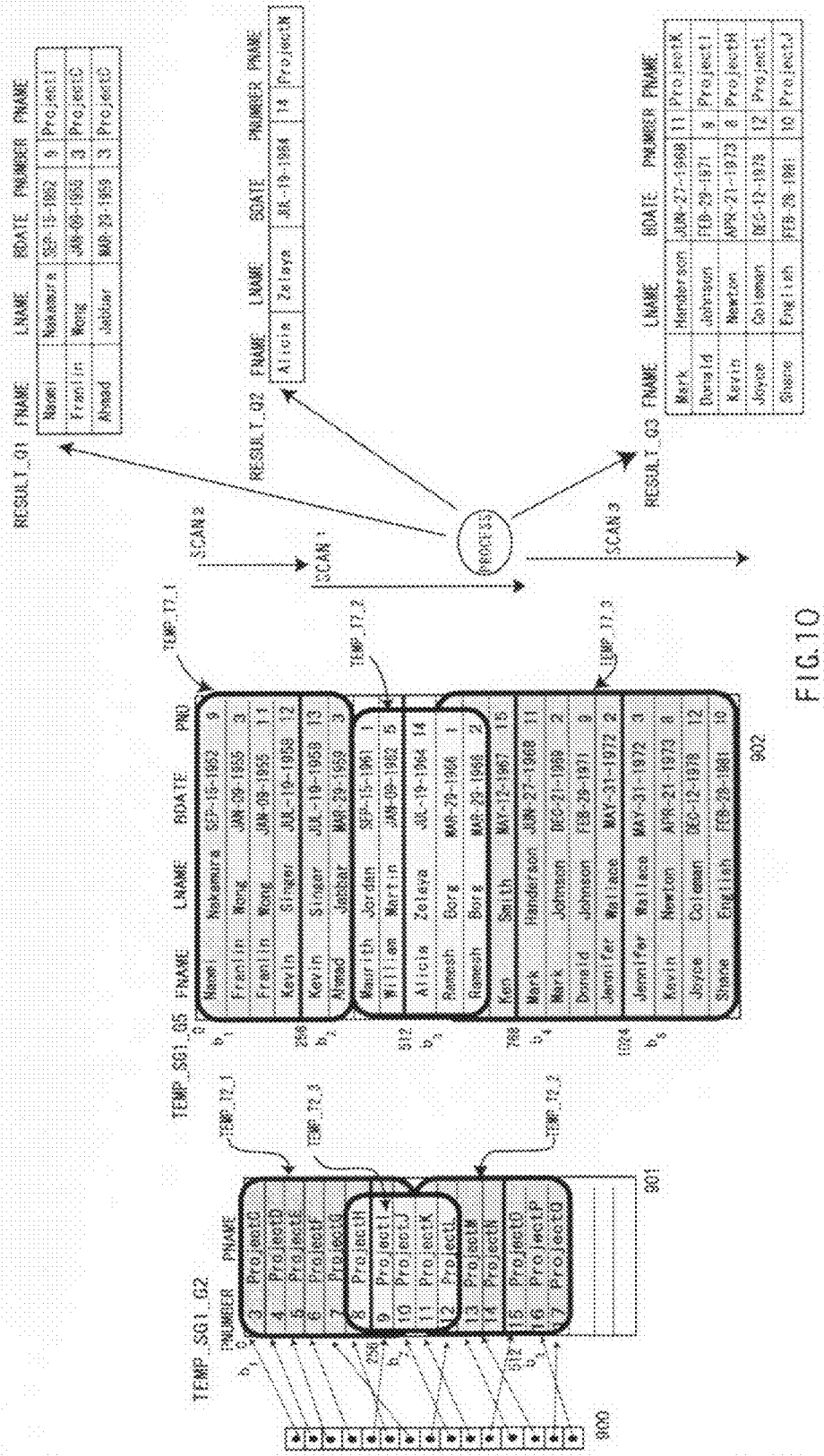
FIG. 10 is diagram showing the processing of multiple tasks of a join operation using multi-operation processing.

The processing cost of the task $t_1^{9'}$ is a total of the cost of scanning the virtual relation TEMP_T7_1, and the cost of finding a record from the virtual relation TEMP_T2_1 to be joined with each record in the virtual relation TEMP_T7_1 using the index (900) of the relation TEMP_SG1_G2. As shown in FIG. 10, the virtual relation TEMP_T7_1 shares two blocks in the relation TEMP_SG1_G5, so $b_{TEMP\_T7\_1}$ becomes 2. The level of the index (900) for the attribute PNUMBER in the relation TEMP_SG1_G2 is 1, so the processing cost of the task $t_1^{9'}$ becomes $$\mathrm{cost}(t_1^{9'})=2+(6*(1+1))=14.$$

The processing cost of the task $t_2^{9'}$ is a total of the cost of scanning the virtual relation TEMP_T7_2, and the cost of finding a record from the virtual relation TEMP_T2_2 to be joined with each record in the virtual relation TEMP_T7_2 using the index (900) of the relation TEMP_SG1_G2. As shown in FIG. 10, the virtual relation TEMP_T7_2 shares 2 blocks in the relation TEMP_SG1_G5, so $b_{TEMP\_T7\_2}$ becomes 2. The level of the index (900) for the attribute PNUMBER in the relation TEMP_SG1_G2 is 1, so the processing cost of the task $t_2^{9'}$ becomes $$\mathrm{cost}(t_2^{9'})=2+(5*(1+1))=12.$$

The processing cost of the task $t_3^{9'}$ is a total of the cost of scanning the virtual relation TEMP_T7_3, and the cost of finding a record from the relation TEMP_T2_3 to be joined with each record in the virtual relation TEMP_T7_3 using the index (900) of the relation TEMP_SG1_G2. As shown in FIG. 10, the virtual relation TEMP_T7_3 shares 3 blocks in the relation TEMP_SG1_G5, so $b_{TEMP\_T7\_3}$ becomes 3. The level of the index (900) for the attribute PNUMBER in the relation TEMP_SG1_G2 is 1, so the processing cost of the task $t_3^{9'}$ becomes $$\mathrm{cost}(t_3^{9'})=3+(11*(1+1))=25.$$

[(h-2) Obtaining Block Access Order]

After calculating the processing costs for the tasks $t_1^{9'}$, $t_2^{9'}$, $t_3^{9'}$ as above, the multi-operation processor sorts these tasks based on the processing costs of these tasks in the order from the task of smaller processing cost as follows.

$$\mathrm{sort}(t_1^{9'},t_2^{9'},t_3^{9'}) \rightarrow (t_2^{9'},t_1^{9'},t_3^{9'})$$

After sorting these tasks in the group, referring to the information stored in the virtual relations TEMP_T7_2, TEMP_T7_1, TEMP_T7_3 shown in FIG. 10, the multi-operation processor finds the blocks that tasks $t_2^{9'}$, $t_1^{9'}$, $t_3^{9'}$ need to access to the relation TEMP_SG1_G5, and collects them into the block sets $B_2^{9'}$, $B_1^{9'}$, $B_3^{9'}$ as follows.

For the task $t_2^{9'}$: $B_2^{9'} = \{b_2, b_3\}$
For the task $t_1^{9'}$: $B_1^{9'} = \{b_1, b_2\}$
For the task $t_3^{9'}$: $B_3^{9'} = \{b_3, b_4, b_5\}$ After obtaining the block sets for these tasks as above, the multi-operation processor obtains the union of these block sets based on the sorted order of the tasks (the order of $t_2^{9'}$, $t_1^{9'}$, $t_3^{9'}$).

First, the union of the empty set $TB_0 = \emptyset$ and the block set $B_2^{9'}$ corresponding to the task $t_2^{9'}$ is obtained, and the obtained union is represented as a set $TB_2^{9'}$.

Next, the union of the set $TB_2^{9'}$ and the block set $B_1^{9'}$ corresponding to the task $t_1^{9'}$ is obtained, and the obtained union is represented as a set $TB_1^{9'}$.

Next, the union of the sets $TB_1^{9'}$ and the block set $B_3^{9'}$ corresponding to the task $t_3^{9'}$ is obtained, and the obtained union is represented as a set $TB_3^{9'}$.

In obtaining the unions, the new sets to be added into the unions are inserted at the end of the unions as follows.

$$TB_0 = \emptyset$$

The union of the set $TB_0$ and the block set $B_2^{9'}$ corresponding to the task $t_2^{9'}$:

$$TB_2^{9'} = TB_0 \cup B_2^{9'} = \{b_2, b_3\}$$

The union of the set $TB_2^{9'}$ and the block set $B_1^{9'}$ corresponding to the task $t_1^{9'}$:

$$TB_1^{9'} = TB_2^{9'} \cup B_1^{9'} = \{b_2, b_3, b_1\}$$

The union of the set $TB_1^{9'}$ and the block set $B_3^{9'}$ corresponding to the task $t_3^{9'}$:

$$TB_3^{9'} = TB_1^{9'} \cup B_3^{9'} = \{b_2, b_3, b_1, b_4, b_5\}$$

As above, the unions of the block sets are obtained based on the sorted order of the tasks (in the order from the block set corresponding to the task of smaller processing cost to the block set corresponding to the task of larger processing cost). Then, in the last set $TB_3^{9'}$ obtained from the union of the set $TB_1^{9'}$ and the block set $B_3^{9'}$ corresponding to the last task $t_3^{9'}$ having the largest processing cost, the block access can begin at the block $b_2$ and end at the block $b_5$. Therefore the block access order in the relation TEMP_SG1_G5 is determined as $(b_2, b_3, b_1, b_4, b_5)$.

Looking at the blocks in the block sets $B_2^{9'}$, $B_1^{9'}$, $B_3^{9'}$ based on the block access order, the block $b_2$ is used for the processing of the tasks $t_2^{9'}$, $t_1^{9'}$, the block $b_3$ is used for the processing of the tasks $t_2^{9'}$, $t_3^{9'}$, the block $b_1$ is used for the processing of the task $t_1^{9'}$, and the blocks $b_4$, $b_5$ are used for the processing of the task $t_3^{9'}$. Using these blocks as common blocks, the tasks accessing these blocks are processed simultaneously. By summarizing the above explanations, the following table is obtained.

TABLE 4

| Common block | Tasks processed at common block | Finishing tasks |
| --- | --- | --- |
| $B_2$ | $t_2^{9'}, t_1^{9'}$ | |
| $B_3$ | $t_2^{9'}, t_3^{9'}$ | $t_2^{9'}$ |
| $B_1$ | $t_1^{9'}$ | $t_1^{9'}$ |
| $B_4$ | $t_3^{9'}$ | |
| $B_5$ | $t_3^{9'}$ | $t_3^{9'}$ |

As shown in the table above, in order to find which tasks to be processed at each common block, the following procedure is used based on the information of the block sets $B_2^{9'}$, $B_1^{9'}$, $B_3^{9'}$ created for the tasks $t_2^{9'}$, $t_1^{9'}$, $t_3^{9'}$.

(h-3) Processing the Tasks at Common Blocks]

Using the improved method 4, the method of processing multiple tasks of the join operation, the multi-operation processor performs the processing of the tasks $t_1^{9'}$, $t_2^{9'}$, $t_3^{9'}$ of the join operation in the group simultaneously.

First, the multi-operation processor accesses the block $b_2$ from disk at the relative address of 256 in the relation TEMP_SG1_G5, and reads the data of the block $b_2$ into main memory. In order to check if the tasks $t_2^{9'}$, $t_1^{9'}$, $t_3^{9'}$ in the group need to be processed at the block $b_2$, the block $b_2$ is represented as a block set $\{b_2\}$, and the intersections for the block sets $B_2^{9'}$, $B_1^{9'}$, $B_3^{9'}$ with the set $\{b_2\}$ are obtained as follows.

For the task $t_2^{9'}$: $B_2^{9'} \cap \{b_2\} = \{b_2\}$
For the task $t_1^{9'}$: $B_1^{9'} \cap \{b_2\} = \{b_2\}$
For the task $t_3^{9'}$: $B_3^{9'} \cap \{b_2\} = \emptyset$ The intersections for the tasks $t_2^{9'}$, $t_1^{9'}$ become $\{b_2\}$. Therefore the tasks $t_2^{9'}$, $t_1^{9'}$ of the join operation are processed at the common block $b_2$ being read into main memory as follows.

First, for the first record s1(Kevin, Singer, Jul. 19, 1958, 13)(attribute PNO=13) in the block $b_2$ of the relation TEMP_SG1_G5 shown in FIG. 10, the multi-operation processor retrieves the record r1(13, ProjectM) having a value of 13 for the attribute PNUMBER from the relation TEMP_SG1_G2 to be joined with the record s1 by using the index (900).

Then for the processing of the task $t_2^{9'}$ of the join operation, the multi-operation processor checks to see if the record r1 is in the virtual relation TEMP_T2_2 and the record s1 is in the virtual relation TEMP_T7_2 (because the processing of the task $t_2^{9'}$ includes the join operation of TEMP_T2_2 and TEMP_T7_2), but the record s1 is not in the virtual relation TEMP_T7_2, so the join condition is not satisfied. Therefore no record is added into the processing result RESULT_Q2 of the task $t_2^{9'}$.

Next, for the processing of the task $t_1^{9'}$, the multi-operation processor checks to see if the record r1 is in the virtual relation TEMP_T2_1 and the record s1 is in the virtual relation TEMP_T7_1 (because the processing of the task $t_1^{9'}$ includes the join operation of TEMP_T2_1 and TEMP_T7_1), but the record r1 is not in the virtual relation TEMP_T2_1. Therefore no record is added into the processing result RESULT_Q1 of the task $t_1^{9}$.

Next, for the second record s2 (Ahmad, Jabbar, Mar. 29, 1959, 3)(attribute PNO=3) in the block $b_2$ of the relation TEMP_SG1_G5, the multi-operation processor retrieves the record r2(3, ProjectC) having a value of 3 for the attribute PNUMBER from relation TEMP_SG1_G2 to be joined with the record s2 using the index (900).

Then for the processing of the task $t_2^{9'}$ of the join operation, the multi-operation processor checks to see if the record r2 is in the virtual relation TEMP_T2_2 and the record s2 is in the virtual relation TEMP_T7_2. But these records are not in these virtual relations, so no record is added into the processing result RESULT_Q2 of the task $t_2^{9'}$.

Next, for the processing of the task $t_1^{9'}$, the multi-operation processor checks to see if the record r2 is in the virtual relation TEMP_T2_1 and the record s2 is in the virtual relation TEMP_T7_1, and these records are in these virtual relations (satisfying the join relationship TEMP_T2_1|X|$_{PNUMBER=PNO}$ TEMP_T7_1), so the multi-operation processor joins the records r2 and the record s2 to create a record t2(Ahmad, Jabbar, Mar. 29, 1959, 3, 3, ProjectC), then projects the attributes FNAME, LNAME, BDATE, PNUMBER, PNAME from the record t2 to create a record v2(Ahmad, Jabbar, Mar. 29, 1959, 3, ProjectC), and adds the record v2 into the processing result RESULT_Q1 of the task $t_1^{9'}$.

Next, for the third record s3(Maurith, Jordan Sep. 15, 1961, 1)(attribute PNO=1) in the block $b_2$ of the relation TEMP_SG1_G5, the multi-operation processor retrieves a record having a value of 1 for the attribute PNUMBER from the relation TEMP_SG1_G2 to be joined with the record s3 using the index (900). However, such a record is not found, so no record is added into the processing result RESULT_Q2 of the task $t_2^{9'}$ and also the processing result RESULT_Q1 of the task $t_1^{9'}$.

Next, for the fourth record s4(William, Martin, Jan. 9, 1962, 5)(attribute PNO=5) in the block $b_2$ of the relation TEMP_SG1_G5, the multi-operation processor retrieves the record r4(5, ProjectE) having a value of 5 for the attribute PNUMBER from the relation TEMP_SG1_G2 to be joined with the record s4 using the index (900).

Then, for the processing of the task $t_2^{9'}$ of the join operation, the multi-operation processor checks to see if the record r4 is in the virtual relation TEMP_T7_2 and the record s4 is in the virtual relation TEMP_T7_2, but the record r4 is not in the virtual relation TEMP_T2_2, so no record is added into the processing result RESULT_Q2 of the task $t_2^{9'}$.

Then, for the processing of the task $t_1^{9'}$, the multi-operation processor check to see if the record r4 is in the virtual relation TEMP_T2_1 and the record s4 is in the virtual relation TEMP_T7_1, but the record s4 is not in the virtual relation TEMP_T7_1, so no record is added into the processing result RESULT_Q1 of the task $t_1^{9'}$.

Therefore by utilizing the records retrieved from the relation TEMP_SG1_G2, the same records are not retrieved multiple times from the relation TEMP_SG1_G2 for the processing of the tasks $t_2^{9'}$, $t_1^{9'}$ at the common block $b_2$ of the relation TEMP_SG1_G5.

After processing the tasks $t_2^{9'}$, $t_1^{9'}$ at the common block $b_2$, the block $b_2$ is no longer needed to accessed again, so the differences for the block sets $B_2^{9'}$, $B_1^{9'}$ with the set $\{b_2\}$ are obtained. Then the obtained differences are represented as the block sets $B_2^{9'(1)}$, $B_1^{9'(1)}$ as follows.

| For the task $t_2^{9'}$: | $B_2^{9'} - \{b_2\} = \{b_3\} = B_2^{9'(1)}$ |
| --- | --- |
| For the task $t_1^{9'}$: | $B_1^{9'} - \{b_2\} = \{b_1\} = B_1^{9'(1)}$ |

Next, the multi-operation processor accesses the block $b_3$ from disk at the relative address of 512 in the relation TEMP_SG1_G5, and reads the data of the block $b_3$ into main memory. In order to check if the tasks $t_2^{9'}$, $t_1^{9'}$, $t_3^{9'}$ in the group need to be processed at the block $b_3$, the block $b_3$ is represented as a block set $\{b_3\}$, and the intersections for the block sets $B_2^{9'(1)}$, $B_1^{9'(1)}$, $B_3^{9'}$ with the set $\{b_3\}$ are obtained as follows.

| | |
|---|---|
| For the task $t_2^{9'}$: | $B_2^{9'(1)} \cap \{b_3\} = \{b_3\}$ |
| For the task $t_1^{9'}$: | $B_1^{9'(1)} \cap \{b_3\} = \{\}$ |
| For the task $t_3^{9'}$: | $B_3^{9'} \cap \{b_3\} = \{b_3\}$ |

The intersections for the tasks $t_2^{9'}$, $t_3^{9'}$ become $\{b_3\}$. Therefore the tasks $t_2^{9'}$, $t_3^{9'}$ are processed at the common block $b_3$ being read into main memory as follows.

The processing of the tasks $t_2^{9'}$, $t_3^{9'}$ at the block $b_3$ of the relation TEMP_SG1_G5 shown in FIG. 10 is similar to the processing of the tasks performed at the block $b_2$.

First, the multi-operation processor accesses the block $b_3$ from disk at relative address of 512 in the relation TEMP_SG1_G5, and reads the data of the block $b_3$ into main memory. Then, for the first record s5(Alicia, Zelaya, Jul. 19, 1964, 14) in the block $b_3$ of the relation TEMP_SG1_G5, the multi-operation processor retrieved the record r5(14, ProjectN) having a value of 14 for the attribute PNUMBER from the relation TEMP_SG1_G2 using the index (900).

Then, for the processing of the task $t_2^{9'}$, the multi-operation processor checks to see if the record r5 is in the virtual relation TEMP_T2_2 and the record s5 is in the virtual relation TEMP_T7_2, and they exist in these virtual relations (satisfying the join relationship TEMP_T2_2|X|$_{PNUMBER=PNO}$ TEMP_T7_2), so the multi-operation processor joins the record r5 and the record s5 to create a record t5 (Alicia, Zelaya, Jul. 19, 1964, 14, 14, ProjectN), and projects the attributes FNAME, LNAME, BDATE, PNUMBER, PNAME from the record t5 to create a record u5(Alicia, Zelaya, Jul. 19, 1964, 14, ProjectN), and adds the record u5 into the processing result RESULT_Q2 of the task $t_2^{9'}$.

Continuously for the processing of the task $t_3^{9'}$, the multi-operation processor checks to see if the record r5 is in the virtual relation TEMP_T2_3 and the record s5 is in the virtual relation TEMP_T7_3, and they are not in these virtual relations, so no record is added into the processing result RESULT_Q3 of the task $t_3^{9'}$.

Next, for the second record s6(Ramesh, Borg, Mar. 29, 1966, 1) in the block $b_3$ of the relation TEMP_SG1_G5, the multi-operation processor retrieves a record having a value of 1 for the attribute PNUMBER from the relation TEMP_SG1_G2 using the index (900), but such a record is not found, so no record is added into the processing result RESULT_Q2 of the tasks $t_2^{9'}$ and also the processing result RESULT_Q3 of the task $t_3^{9'}$.

Likewise, for the rest of the records in the common block $b_3$ of the relation TEMP_SG1_G5, the multi-operation processor performs the processing of the tasks for these records in the same way as the processing of the tasks performed for the record 1 and the record 2 repeatedly. After processing the tasks $t_2^{9'}$, $t_3^{9'}$ at the common block $b_3$, the block $b_3$ is no longer needed to be accessed again, so the differences for the block sets $B_2^{9'(1)}$, $B_3^{9'}$ with the set $\{b_3\}$ are obtained. Then the obtained differences are represented as the block sets as $B_2^{9'(2)}$, $B_3^{9'(1)}$ as follows.

| | |
|---|---|
| For the task $t_2^{9'}$: | $B_2^{9'(1)} - \{b_3\} = \{\} = B_2^{9'(1)}$ |
| For the task $t_3^{9'}$: | $B_3^{9'} - \{b_3\} = \{b_4, b_5\} = B_3^{9'(1)}$ |

As a result, the block set $B_2^{9'(2)}$ becomes an empty set $\emptyset$, and the processing of the task $t_2^{9'}$ finishes, and all tasks in the query tree $P_2$ finish. Therefore the processing of the query $Q_2$ is completed.

Next, the multi-operation processor accesses the block $b_1$ from disk at a relative address of 0 in the relation TEMP_SG1_G5, and reads the data of block $b_1$ into main memory. In order to check if the tasks $t_1^{9'}$, $t_3^{9'}$ in the group, excluding the task $t_2^{9'}$ that already finished processing, need to be processed at the block $b_1$, the block $b_1$ is represented as a block set $\{b_1\}$, and the intersections for the block sets $B_1^{9'(2)}$, $B_3^{9'(1)}$ are obtained with the set $\{b_1\}$ as follows.

| | |
|---|---|
| For the task $t_1^{9'}$: | $B_1^{9'(1)} \cap \{b_1\} = \{b_1\}$ |
| For the task $t_3^{9'}$: | $B_3^{9'(1)} \cap \{b_1\} = \emptyset$ |

The intersection for the task $t_1^{9'}$ becomes $\{b_1\}$. Therefore the task $t_1^{9'}$ is processed at the common block $b_3$ being read into main memory. After processing the task $t_1^{9'}$ at the block $b_1$, the block $b_1$ is no longer needed to be accessed again, so the difference of the block set $B_1^{9'(1)}$ with the set $\{b_1\}$ is obtained. Then the obtained difference is represented as the block sets $B_1^{9'(2)}$ as follows.

| | |
|---|---|
| For the task $t_1^{9'}$: | $B_1^{9'(1)} - \{b_1\} = \emptyset = B_1^{9'(2)}$ |

As a result, the block set $B_1^{9'(2)}$ becomes empty set $\emptyset$, and the processing of the task $t_1^{9'}$ finishes, and the processing of all tasks in the query tree $P_1$ shown in FIG. 4-1(*a*) finishes. Therefore the processing of the query $Q_1$ is completed.

At this stage, the only task left in the group G8 is the task $t_3^{9'}$, so the multi-operation processor accesses the remaining blocks $b_4$, $b_5$ from the relation TEMP_SG1_G3 and processes the task $t_3^{9'}$ at these blocks. As a result, the processing of all tasks in the query tree $P_3$ finishes, and the processing of the query $Q_3$ is completed.

Therefore by accessing the blocks in the relation TEMP_SG1_G5 in the order of $b_2$, $b_3$, $b_1$, $b_4$, $b_5$, the processing of the tasks finishes in the order of $t_2^{9'}$, $t_1^{9'}$, $t_3^{9'}$ from the task of smaller processing cost.

FIG. 10 shows the processing of the multiple tasks that combined the join operation and the project operation in the group G8 using multi-operation processing. The blocks in the relation TEMP_SG1_G5 are accessed in the order of $b_2$, $b_3$, $b_1$, $b_4$, $b_5$, and the processing of the tasks $t_2^{9'}$, $t_1^{9'}$, $t_3^{9'}$ that combined the join operation and the project operation are performed simultaneously, and the processing results are written in the relations RESULT_Q1, RESULT_Q2, and RESULT_Q3.

[(i) Processing of Group G9]

As described above, the task $t_5^{9'}$ that combined the join operation and the project operation performing operations on the relation TEMP_T7_5 is collected in the group G9.

| |
|---|
| TEMP_T7_5: Group G9 = $\{t_5^{9'}\}$ |
| ($t_5^{9'}$): RESULT_Q5 ← $\Pi_{SSN,FNAME,LNAME,PNUMBER,PNAME}$ |
| (TEMP_T2_5\|X\|$_{PNUMBER=PNO}$TEMP_T7_5) |

Since there is only a single task in the group G9, the processing of the task $t_5^{9'}$ is performed directly. The method of processing the task $t_5^{9'}$ is to perform its project operation for each record processed by its join operation, and add the projected record into the processing result RESULT_Q5 of the task $t_5^{9'}$ directly.

After processing the task $t_5^{9'}$, all tasks in the query tree $P_5$ of FIG. 4-3(a) finish and the processing of the query $Q_5$ is completed. Thus, by continuously processing the groups repeatedly, the tasks in the query trees shown in FIG. 4-1~FIG. 4-3 gradually finish. Therefore when all tasks in the query trees finish, the given all queries are completed.

[5. Implementation Results]

In order to show that the query processor applying the multi-operation processing utilizing a synthetic relational operation of the present invention can execute a large number of queries faster than the query processor applying the multi-operation processing utilizing a synthetic relational operation of the previous version (JP2007-075670) that does not use 4 improved methods, the software implementation of the multi-operation processing utilizing a synthetic relational operation of the present invention was added into the database management system software MOP-DB that the inventors of the present invention originally designed.

MOP-DB was designed to process a large number of queries faster than the database management system software widely used on the market such as MySQL, and it has functionalities of SQL interpreter, query optimizer, concurrency control for transactions, storage system for storing data, etc.

By adding the multi-operation processing utilizing a synthetic relational operation of the present invention into MOP-DB, MOP-DB became able to perform the query processing of the multi-operation processing utilizing a synthetic relational operation of the present invention, the query processing of the multi-operation processing utilizing a synthetic relational operation of the previous version (JP2007-075670), and the query processing of the multi-operation processing (JP2006-356406). As a result, MOP-DB is able to select any method from these query processing methods.

Next, by using MOP-DB, the query processing speed of each query processing method was examined. Furthermore the performance of each method in MOP-DB is also compared with MySQL version 3 by running same queries.

Figures 1, 11:
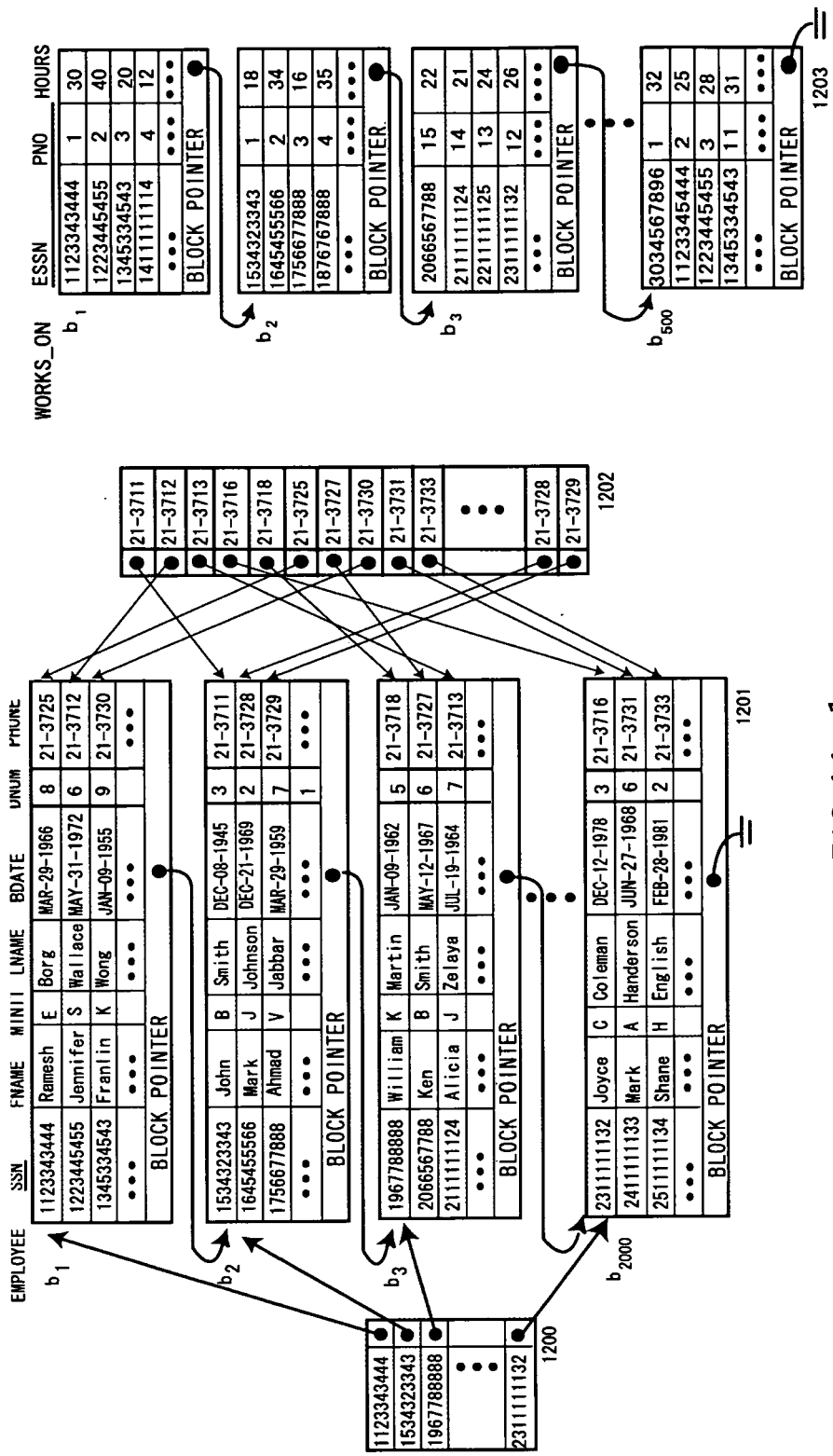
Figures 2, 11:
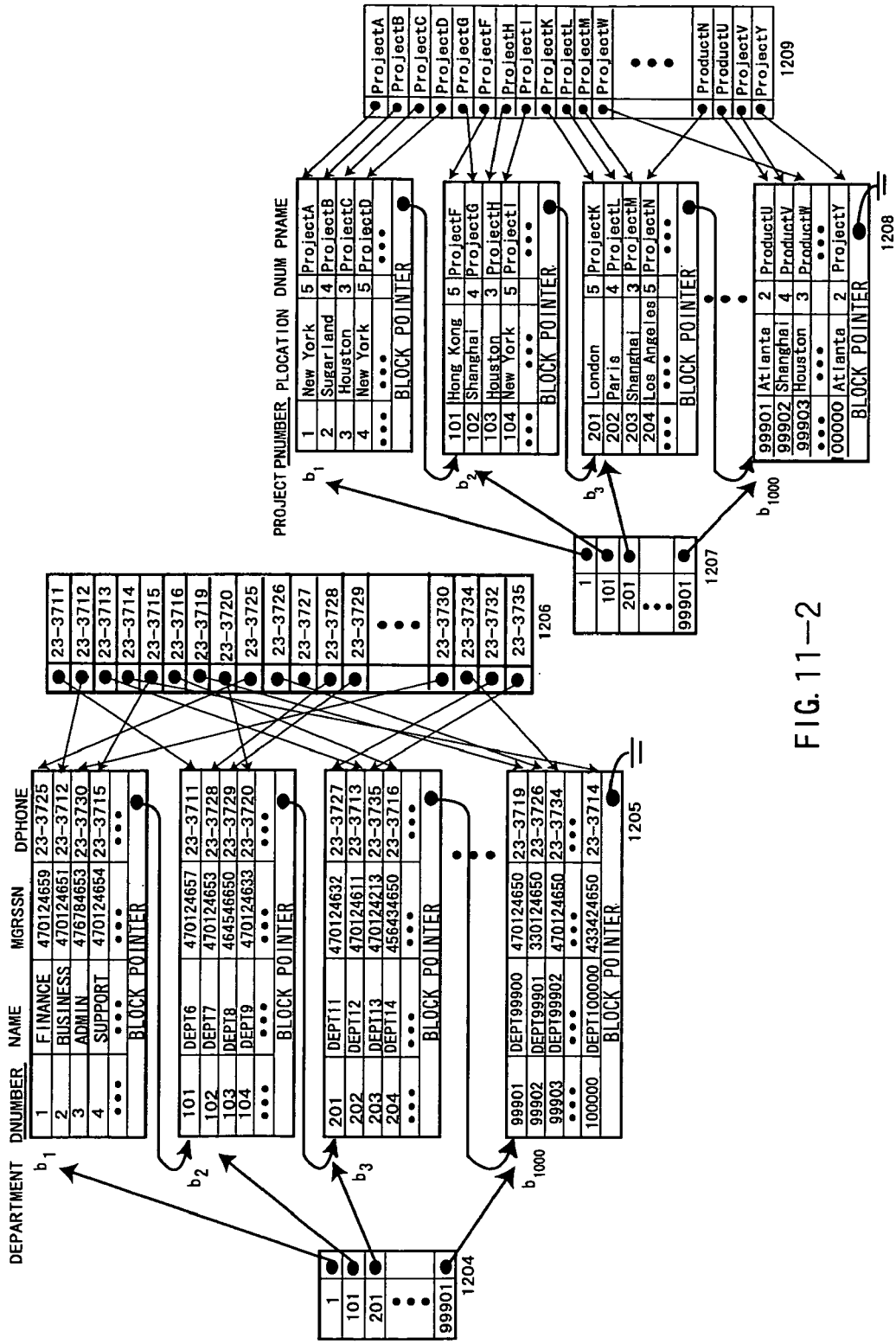

In order to examine the query processing speed of each method in MOP-DB, a large database containing many records is needed, so a database consisting of 4 relations EMPLOYEE, DEPARTMENT, WORKS_ON, PROJECT shown in FIG. 11-1, FIG. 11-2 was created on a conventional personal computer (one Celeron CPU 2.53 GHz processor, 512 MB main memory, and one 145 GB disk) running Windows XP by using MOP-DB. Then for each relation in the database, 100000 records were added, so the totals of 400000 records were added into the database.

In order to process queries quickly, indices are created for these relations: the primary index (1200) was created for the primary attribute SSN of the relation EMPLOYEE; the secondary index (1202) was created for the secondary attribute PHONE of the relation EMPLOYEE; the primary index (1204) was created for the primary attribute DNUMBER of the relation DEPARTMENT; the secondary index (1206) was created for the secondary attribute DPHONE of the relation DEPARTMENT; the primary index (1207) was created for the primary attribute PNUMBER of the relation PROJECT; the secondary index (1209) was created for the secondary attribute PNAME of the relation PROJECT (1208).

Likewise, using MySQL version 3.0, a same database consisting of 4 relations with same indices was created on the same personal computer.

Next, in order to maximize the processing capability of each query processor, queries having complicated search written in SQL were created. These queries have the following conditions and characteristics.

(1) All queries have different search conditions, so that there is no same query included in these queries. Also a select condition comprising variables, attributes, and variables is combined with another select conditions by using BOOLEAN operators AND, OR to create a more complicated select condition for each query to perform narrowing search.

(2) Each query has more than 2 join operations in order to have enough join operations processed by the query processor. Also each query has a search condition that produces a non-empty result.

(3) Queries producing a processing result of less than 1000 (records) not including empty results, queries producing a processing result from 1000 to 10000, queries producing a processing result from 10000 to 50000, and queries producing a processing result from 50000 to 100000 are sent to the database server in enough numbers (25 percent each) to obtain various query processing results.

(4) Queries utilizing a primary index, queries utilizing a secondary index, and queries utilizing both a primary index and a secondary index are sent to the database server in order to have the query processor utilizing the indices for the processing of these queries. Also queries not utilizing any indices are sent to the database server in order to have the queries not utilizing any indices processed together with another queries utilizing indices.

In order to find the query processing time for the query processing using multi-operation processing utilizing a synthetic relational operation of the present invention, the query processing using multi-operation processing utilizing a synthetic relational operation of the previous version (JP2007-075670), the query processing using multi-operation processing (JP2006-356406), and the query processing using MySQL version 3.0, a client program that sends queries to a database server was designed.

Then we measured the time for sending a large number of queries to the database server from the client program, having these queries processed by the query processor of the database server, and receiving all query processing results back to the client program.

In order to avoid any communication delay between the client program and the database server, the client program was run directly on the database server to obtain query processing results.

The numbers of queries created for sending to the database server are 100, 200, 300, 400, 500, 600, 700, 800, 900 and 1000; thus gradually increased the number of queries to measure the query processing speed.

Likewise, using the same numbers of queries described above, the query processing speed of MySQL version 3.0 was measured, and compared the query processing speed of MySQL with the query processing speed of the multi-operation processing utilizing a synthetic relational operation of the present invention, the query processing speed of the multi-operation processing utilizing a synthetic relational operation of the previous version (JP2007-075670), and the query processing speed of the multi-operation processing (JP2006-356406).

FIG. 12 shows the results of comparing the relationships between the number of queries and the query processing speed in the table of FIG. 12(a) and in the graph of FIG. 12(b) when a large number of queries are sent to the query processing system using multi-operation processing utilizing a synthetic relational operation of the present invention, the query processing system using multi-operation processing utilizing a synthetic relational operation of the previous version (JP2007-075670), the query processing using multi-operation processing (JP2006-356406), and the query processing system using MySQL version 3.0

From this experiment result shown in FIG. 12, for the numbers of queries from 100 to 1000, the query processing speed of the multi-operation processing utilizing synthetic relational operation of the present invention is the fastest, followed by the query processing speed of the multi-operation processing utilizing synthetic relational operation of the previous version (JP2007-075670), followed by the query processing speed of the multi-operation processing (JP2006-356406), and the query processing speed of MySQL is the slowest.

For processing the number of queries from 100 to 500, the multi-operation processing utilizing a synthetic relational operation of the present invention run queries on average of 2.07 times faster than the multi-operation processing utilizing a synthetic relational operation of the previous version (JP2007-075670), on average of 3.65 times faster than the multi-operation processing (JP2006-356406), and on average of 13.11 times faster than MySQL version 3.

For processing the number of queries from 600 to 1000, the multi-operation processing utilizing a synthetic relational operation of the present invention run queries on average of 2.17 times faster than the multi-operation processing utilizing a synthetic relational operation of the previous version (JP2007-075670), on average of 3.88 times faster than the multi-operation processing (JP2006-356406), and on average of 14.04 times faster than MySQL version 3.

Therefore the query processing speed is more improved in the multi-operation processing utilizing a synthetic relational operation of the present invention. There is the improvement of processing speed 13.11~14.04 times faster than MySQL version 3, and the query processing speed tends to improve when the number of queries increases.

We claim:

1. A query processing system of a database using multi-operation processing utilizing a synthetic relational operation for improvement in processing capability of a join operation, said query processing system comprising:

query tree conversion means for converting a query to a query tree based on relational algebra, task retrieval means for retrieving relational algebra as tasks, which can be processed directly and are not dependent on other relational algebra, from the query tree in an order of topological sort, means for dividing the retrieved tasks into groups for each relation of the database, synthetic relational operation means for further collecting the tasks having common sub-expression for the grouped tasks into sub-groups, and creating tasks of a synthetic relational operation, multi-operation processing means performing multi-operation processing each of the grouped tasks for the created tasks of the synthetic relational operation and for tasks not collected into a sub-group, and virtual relation creating means for creating a virtual relation based on stored locations so as for each task included in the synthetic relational operation to share a part of records and/or attributes in a processing result of the task of the synthetic relational operation; wherein the task retrieval means retrieves either a task of the select operation or a task of the join operation with the task of the project operation simultaneously, and creates a task that combined either the select operation or the join operation with the project operation, when the task to be added into a group is either a select operation or a join operation, and the next task performing operation on a processing result of the task of either the select operation or the project operation is a project operation;

when there is a plurality of tasks of the join operation in the grouped tasks, the synthetic relational operation means further divides the grouped tasks into sub-groups for each common sub-expression of join operation, collects a plurality of tasks of the join operation into a sub-group, and creates a single task of a synthetic join operation by using logical union to concatenate each task of the join operation collected in the sub-group; and the virtual relation creating means creates a virtual relation for each task of the join operation in the sub-group.

2. The query processing system according to claim 1, wherein a process of executing the single task of the synthetic join operation by using the logical union in the synthetic relational operation means is realized by finding blocks that need to be accessed to a common relation of source search for each join operation contained in the single task of the synthetic join operation, and collects the blocks into a block set by obtaining a union of the blocks, accessing disk to read a block in the block set, and for each record in the block, retrieves a record from a common relation of destination search satisfying a join relationship with the record in the block, and joining the retrieved record and the record in the block to create a joined record and adds the joined record into a processing result of the task of the synthetic join operation, if the retrieved record is found and the retrieved record and the record in the block satisfy a join relationship of at least one join operation contained in the single task of the synthetic join operation.

3. The query processing system according to claims 1, wherein the synthetic relational operation means, when there is a plurality of tasks that combined a select operation and a project operation in a group, further divides the plurality of the tasks that combined the select operation and the project operation into subgroups for each common sub-expression of the select operation based on select operations of these tasks in the group, collects a plurality of tasks that combined the select operation and the project operation into a subgroup, creates a synthetic select operation satisfying all select conditions of the select operations of these tasks in the sub-group, creates a synthetic project operation including all attributes of project operations of these tasks in the sub-group, and creates a single task that combined the synthetic select operation and the synthetic project operation, or when there is a plurality of tasks that combined a join operation and a project operation in a group, divides the plurality of the tasks that combined the join operation and the project operation into sub-groups for each common sub-expressions of the join operation based on join operations of these tasks in the group, collects a plurality of tasks that combined the join operation and the project operation into a subgroup, creates a synthetic join operation satisfying all join conditions of the join operations of these tasks in the sub-group, creates a synthetic project operation including all attributes of project operations of these tasks in the sub-group, creates a single task that combined the synthetic join operation and the synthetic project operation; and the virtual relation creating means creates virtual relations for the tasks that combined the select operation and the project operation, and the tasks that combined the join operation and the project operation.

4. The query processing system according to claims 1, wherein the multi-operation processing means simultaneously performs process of retrieving records and process of joining records that a plurality of tasks of join operation in a group require, if the plurality of the tasks of the join operation in the group perform their join operations on their virtual relations of source search and their virtual relation of destination search using same attributes in their join condition, where these virtual relations of source search belong to a single common relation of source search and these virtual relations of destination search belong to a single common relation of destination search.

5. The query processing system according to claim 4, wherein multi-operation processing means, when simultaneously performing the process of retrieving the records and the process of joining records that the plurality of the tasks of the join operation in the group require, for each record in a common block, retrieves a record to a common relation of destination search satisfying a join relationship with the record in the common block, joins the retrieved record and the record of the common block to create a joined record and adds the joined record into a processing result of each task of the join operation in the group requiring to be processed at the common block, if each task of the join operation includes the retrieved record in its virtual relation of destination search and includes the record of the common block in its virtual relation of source search.

6. A program corresponding to respective fUnctions of the query processing system according to claims 1, which is executed by a computer system.

7. A storage medium stored with a program corresponding to respective functions of the query processing system according to claims 1, which is executed by a computer system.

* * * * *

UNITED STATES PATENT AND TRADEMARK OFFICE
CERTIFICATE OF CORRECTION

PATENT NO. : 7,680,784 B2  Page 1 of 3
APPLICATION NO. : 12/149059
DATED : March 16, 2010
INVENTOR(S) : Toru Furuya et al.

It is certified that error appears in the above-identified patent and that said Letters Patent is hereby corrected as shown below:

Column 23, line 33:
"Ri(I≦L≦n)" should read -- Ri(I≦i≦n) --.

Column 36, line 43:
"$T_{G1}^{SG1}$" should read -- $t_{G1}^{SG1}$ --.

Column 37, lines 60-66:
Please replace the "Common block" column as set forth below.
From:

| Common block |
|---|
| $B_2$ |
| $B_4$ |
| $B_5$ |
| $B_1$ |
| $B_3$ |

To:

| Common block |
|---|
| $b_2$ |
| $b_4$ |
| $b_5$ |
| $b_1$ |
| $b_3$ |

Column 39, line 21:
Please replace "For the task $t_{G1}^{SG1}$: $B_{G1}^{SG1(2)}$ - $\{b_5\}$ = $\{b_1, b_3\}$ = $_{BG1}^{SG1(3)}$" with
-- For the task $t_{G1}^{SG1}$: $B_{G1}^{SG1(2)}$ - $\{b_5\}$ = $\{b_1, b_3\}$ = $B_{G1}^{SG1(3)}$ --.

Column 39, line 61:
"TEMP_T4_$_5$" should read -- TEMP_T4_5 --.

Signed and Sealed this

Fifteenth Day of June, 2010

David J. Kappos
*Director of the United States Patent and Trademark Office*

Column 40, line 14:
"TEMP_T4_₅" should read -- TEMP_T4_5 --.

Column 42, line 33:
" $t_5^{2"}$ " should read -- $t_5^{2'}$ --.

Column 43, line 50:
" $t_4^{2"}$ " should read -- $t_4^{2'}$ --.

Column 44, lines 56-57:
" $B_{G2\ SG1(2)}$ " should read -- $B_{G2}^{SG1(2)}$ --.

Column 47, line 18:
" $t_3^5$ " should read -- $t_5^5$ --.

Column 50, line 54:
"{SG1$_{G5}$, {$t_5^7$}" should read -- {SG1$_{G5}$, $t_5^7$} --.

Column 51, line 44:
"t61" should read -- $t_6^1$ --.

Column 53, line 15:
"{$b_2$, $b_3$, $b_4$, $b_5$}" should read -- {$b_1$, $b_2$, $b_3$, $b_4$, $b_5$} --.

Column 56, line 24:
" _5 of the task t5" should read -- _5 of the task $t_5^7$ --.

Column 57, line 31:
"1~20" should read -- 10~20 --.

Column 61, line 52:
" _2 shares" should read -- _2 shares --.

Column 63, lines 5-11:
Please replace the "Common block" column as set forth below
From:

| Common block |
| --- |
| $B_2$ |
| $B_3$ |
| $B_1$ |
| $B_4$ |
| $B_5$ |

To:

| Common block |
|---|
| $b_2$ |
| $b_3$ |
| $b_1$ |
| $b_4$ |
| $b_5$ |

Column 65, line 64:
"$B_2^{9'(1)}$" should read -- $B_2^{9'(2)}$ --.